United States Patent
Priest

(10) Patent No.: US 11,436,929 B2
(45) Date of Patent: *Sep. 6, 2022

(54) PASSENGER DRONE SWITCHOVER BETWEEN WIRELESS NETWORKS

(71) Applicant: ETAK Systems, LLC, Huntersville, NC (US)

(72) Inventor: Lee Priest, Charlotte, NC (US)

(73) Assignee: Metal Raptor, LLC, Raleigh, NC (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/716,649

(22) Filed: Dec. 17, 2019

(65) Prior Publication Data

US 2020/0160734 A1 May 21, 2020

Related U.S. Application Data

(63) Continuation-in-part of application No. 16/590,516, filed on Oct. 2, 2019, and a continuation-in-part of
(Continued)

(51) Int. Cl.
*G08G 5/00* (2006.01)
*H04W 4/90* (2018.01)
(Continued)

(52) U.S. Cl.
CPC ......... *G08G 5/0069* (2013.01); *B64C 39/024* (2013.01); *G05D 1/0077* (2013.01);
(Continued)

(58) Field of Classification Search
CPC .. G08G 5/0069; G08G 5/0013; G08G 5/0039; G08G 5/0056; G08G 5/0043;
(Continued)

(56) References Cited

U.S. PATENT DOCUMENTS 6,584,382 B2 6/2003 Karem
7,437,225 B1 10/2008 Rathinam
(Continued)

OTHER PUBLICATIONS

Technology and the Future Evolution of the ATC System, Chapter 5, Airport and Air Traffic Control System, pp. 67-98.
(Continued)

*Primary Examiner* — Russell Frejd
(74) *Attorney, Agent, or Firm* — Clements Bernard Baratta; Lawrence A. Baratta, Jr.

(57) ABSTRACT

A method configured for implementation by a passenger drone include communicating with an Air Traffic Control (ATC) system via a primary wireless network, the primary wireless network being associated with a first cell tower; receiving emergency instructions from the ATC system; storing the emergency instructions in memory, the emergency instructions configured to be implemented during an emergency situation; detecting when communication with the ATC system via the primary wireless network is disrupted; responsive to detecting when the communication with the ATC system via the primary wireless network is disrupted, implementing a network switchover procedure to attempt to reestablish communication to the ATC system via a backup wireless network; and, responsive to a failed attempt to reestablish communication to the ATC system via the backup wireless network, implementing the emergency instructions.

20 Claims, 25 Drawing Sheets

Related U.S. Application Data application No. 16/545,051, filed on Aug. 20, 2019, and a continuation-in-part of application No. 16/511,262, filed on Jul. 15, 2019, and a continuation-in-part of application No. 16/511,228, filed on Jul. 15, 2019, and a continuation-in-part of application No. 16/442,597, filed on Jun. 17, 2019, and a continuation-in-part of application No. 16/417,805, filed on May 21, 2019, and a continuation-in-part of application No. 16/193,053, filed on Nov. 16, 2018, and a continuation-in-part of application No. 16/155,354, filed on Oct. 9, 2018, and a continuation-in-part of application No. 16/100,571, filed on Aug. 10, 2018, and a continuation-in-part of application No. 16/000,950, filed on Jun. 6, 2018, now Pat. No. 10,720,066, and a continuation-in-part of application No. 15/985,996, filed on May 22, 2018, now Pat. No. 10,789,853, and a continuation-in-part of application No. 15/800,574, filed on Nov. 1, 2017, now Pat. No. 10,723,483, and a continuation-in-part of application No. 15/338,559, filed on Oct. 31, 2016, now Pat. No. 10,157,548, and a continuation-in-part of application No. 15/292,782, filed on Oct. 13, 2016, now Pat. No. 10,713,961, and a continuation-in-part of application No. 15/268,831, filed on Sep. 19, 2016, now Pat. No. 10,089,888, and a continuation-in-part of application No. 15/255,672, filed on Sep. 2, 2016, now Pat. No. 10,198,953, and a continuation-in-part of application No. 15/217,135, filed on Jul. 22, 2016, now Pat. No. 9,959,772, and a continuation-in-part of application No. 15/244,023, filed on Aug. 23, 2016, now Pat. No. 10,109,205, and a continuation-in-part of application No. 15/193,488, filed on Jun. 27, 2016, now Pat. No. 10,510,260, and a continuation-in-part of application No. 15/185,598, filed on Jun. 17, 2016, now Pat. No. 10,019,906, and a continuation-in-part of application No. 15/179,188, filed on Jun. 10, 2016, now Pat. No. 9,928,750.

(51) Int. Cl.
```
G05D 1/10      (2006.01)
G05D 1/00      (2006.01)
B64C 39/02     (2006.01)
H04W 4/02      (2018.01)
H04B 7/185     (2006.01)
```

(52) U.S. Cl.
CPC .......... *G05D 1/106* (2019.05); *G08G 5/0013* (2013.01); *G08G 5/0039* (2013.01); *G08G 5/0043* (2013.01); *G08G 5/0056* (2013.01); *H04B 7/18506* (2013.01); *H04W 4/027* (2013.01); *H04W 4/90* (2018.02)

(58) Field of Classification Search
CPC ........ G08G 5/025; H04W 4/90; H04W 4/027; H04W 4/02; G05D 1/106; G05D 1/0077; B64C 39/024; B64C 2201/14; B64C 2201/128; H04B 7/18506
See application file for complete search history.

(56) References Cited

U.S. PATENT DOCUMENTS

| | | | |
|---|---|---|---|
| 7,580,776 B1 | 8/2009 | Mccusker et al. | |
| 7,606,115 B1 | 10/2009 | Cline et al. | |
| 7,991,516 B2 | 8/2011 | Matos | |
| 8,798,922 B2 | 8/2014 | Tillotson et al. | |
| 9,026,272 B2 | 5/2015 | Kokkeby et al. | |
| 9,257,048 B1 | 2/2016 | Offer et al. | |
| 9,412,278 B1 | 8/2016 | Gong et al. | |
| 9,487,356 B1 | 11/2016 | Aggarwal | |
| 9,488,979 B1 | 11/2016 | Chambers et al. | |
| 9,545,995 B1 | 1/2017 | Chau et al. | |
| 9,650,136 B1 | 5/2017 | Haskin et al. | |
| 9,671,791 B1 | 6/2017 | Paczan et al. | |
| 9,701,408 B1 | 7/2017 | Willison | |
| 9,714,089 B1 | 7/2017 | Louw et al. | |
| 9,734,723 B1 | 8/2017 | Bruno et al. | |
| 9,792,613 B2 | 10/2017 | Gong et al. | |
| 9,997,080 B1 | 6/2018 | Chambers et al. | |
| 10,312,994 B2 * | 6/2019 | Priest | G08G 5/0039 |
| 2004/0249519 A1 | 12/2004 | Frink | |
| 2005/0187677 A1 | 8/2005 | Walker | |
| 2005/0258942 A1 | 11/2005 | Manasseh et al. | |
| 2006/0025900 A1 | 2/2006 | Arnouse | |
| 2006/0106506 A1 | 5/2006 | Nichols et al. | |
| 2007/0129855 A1 | 6/2007 | Coulmeau et al. | |
| 2007/0284474 A1 | 12/2007 | Olson et al. | |
| 2008/0033604 A1 | 2/2008 | Margolin | |
| 2009/0037091 A1 | 2/2009 | Bolt, Jr. et al. | |
| 2009/0040307 A1 | 2/2009 | Rubin | |
| 2009/0157233 A1 | 6/2009 | Kokkeby et al. | |
| 2010/0017046 A1 | 1/2010 | Cheung et al. | |
| 2010/0145552 A1 | 6/2010 | Herman et al. | |
| 2010/0286859 A1 | 11/2010 | Feigh et al. | |
| 2012/0078585 A1 | 3/2012 | Ilies et al. | |
| 2013/0062457 A1 | 3/2013 | Deakin | |
| 2013/0124089 A1 | 5/2013 | Herman et al. | |
| 2014/0018979 A1 | 1/2014 | Goossen et al. | |
| 2014/0032034 A1 | 1/2014 | Raptopoulos et al. | |
| 2014/0207365 A1 | 7/2014 | Pereira | |
| 2014/0240313 A1 | 8/2014 | Varga | |
| 2014/0249738 A1 | 9/2014 | Euteneuer et al. | |
| 2014/0316616 A1 | 10/2014 | Kugelmass | |
| 2015/0219498 A1 | 8/2015 | Tillotson et al. | |
| 2015/0276353 A1 | 10/2015 | Ueno et al. | |
| 2015/0336667 A1 | 11/2015 | Srivastava et al. | |
| 2015/0365159 A1 | 12/2015 | Bosworth | |
| 2015/0379874 A1 | 12/2015 | Ubhi et al. | |
| 2016/0005318 A1 | 1/2016 | Wang et al. | |
| 2016/0046374 A1 | 2/2016 | Kugelmass | |
| 2016/0140851 A1 | 5/2016 | Levy et al. | |
| 2016/0163203 A1 | 6/2016 | Wang et al. | |
| 2016/0163204 A1 | 6/2016 | Raptopoulos et al. | |
| 2016/0180717 A1 | 6/2016 | Ubhi et al. | |
| 2016/0189549 A1 | 6/2016 | Marcus | |
| 2016/0225264 A1 | 8/2016 | Taveira | |
| 2016/0244187 A1 | 8/2016 | Byers et al. | |
| 2016/0253907 A1 | 9/2016 | Taveira | |
| 2016/0253908 A1 | 9/2016 | Chambers et al. | |
| 2016/0261989 A1 | 9/2016 | Pitcher | |
| 2016/0275801 A1 | 9/2016 | Chambers et al. | |
| 2016/0300495 A1 | 10/2016 | Kantor et al. | |
| 2016/0363929 A1 | 12/2016 | Clark et al. | |
| 2016/0371985 A1 | 12/2016 | Kotecha et al. | |
| 2017/0032315 A1 | 2/2017 | Gupta et al. | |
| 2017/0045894 A1 | 2/2017 | Canoy et al. | |
| 2017/0069214 A1 | 3/2017 | Dupray et al. | |
| 2017/0134963 A1 | 5/2017 | Priest | |
| 2017/0142595 A1 | 5/2017 | Ljung et al. | |
| 2017/0269611 A1 | 9/2017 | Rangarajan et al. | |
| 2017/0336805 A1 | 11/2017 | Luo et al. | |
| 2017/0350959 A1 | 12/2017 | Yaqub et al. | |

OTHER PUBLICATIONS

Operator Benefits of Future Air Navigation System, The Boeing Company, pp. 1-4.

What are the essential elements of a control tower?, Aviation Stack Exchange is a question and answer site for aircraft pilots, mechanics, and enthusiasts, pp. 1-2.

* cited by examiner

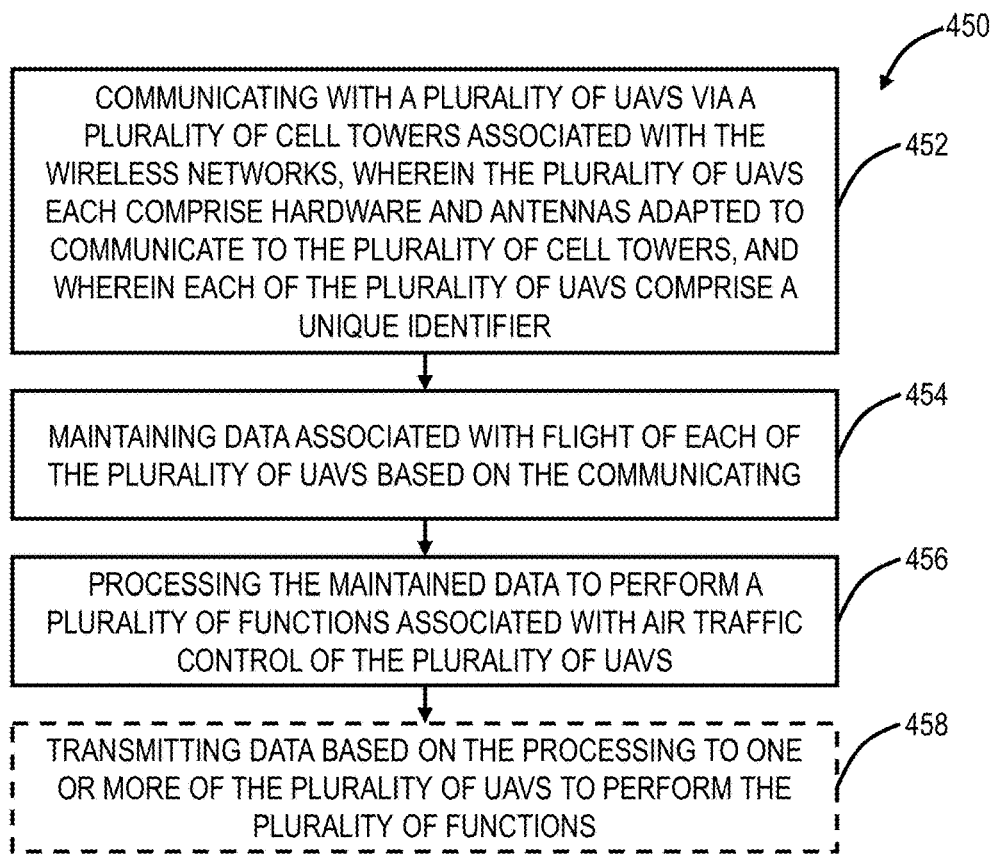
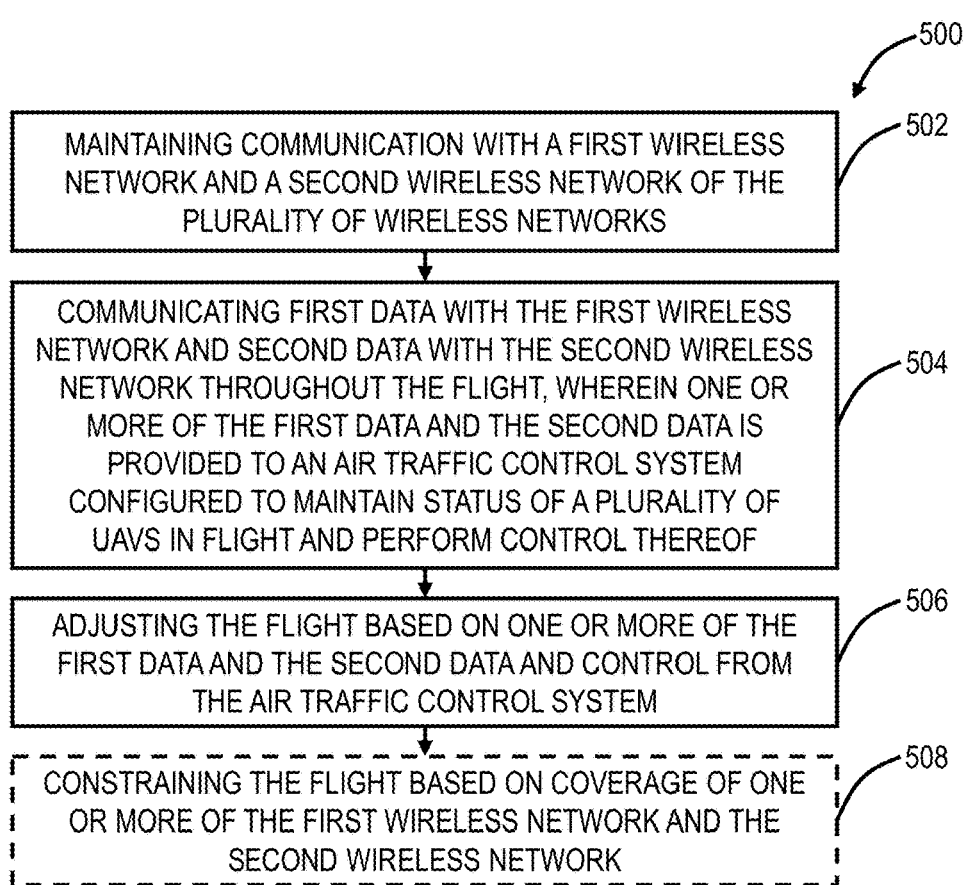

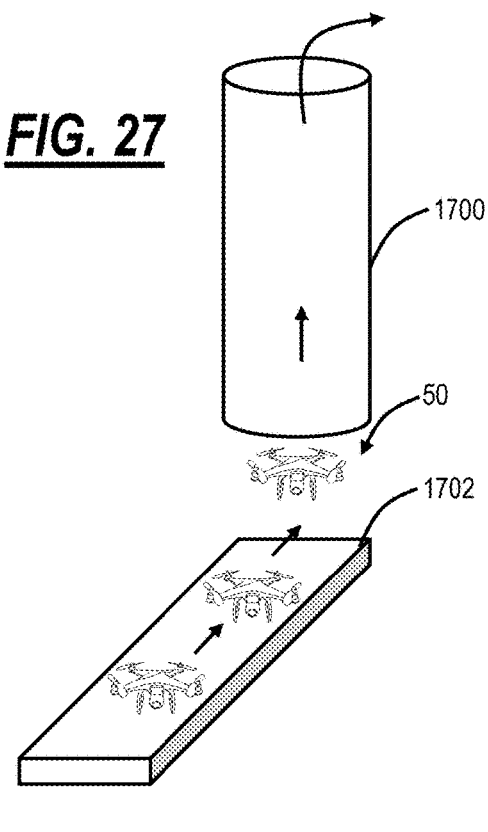
FIG. 27
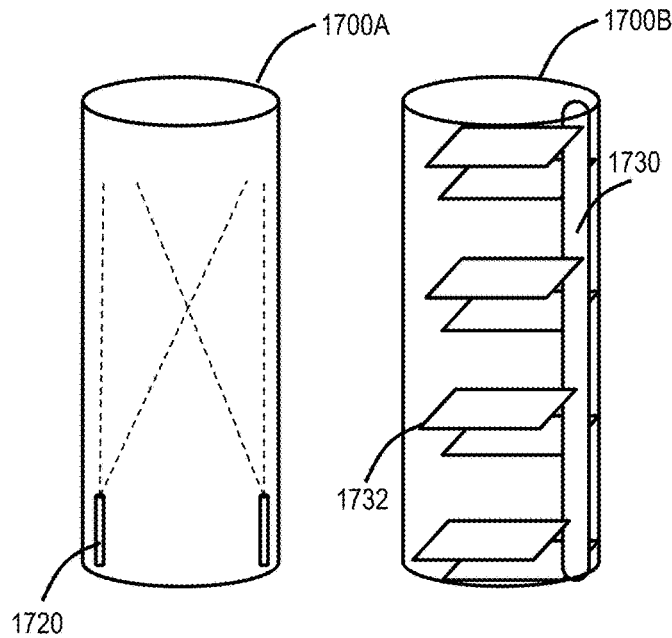
FIG. 29    FIG. 30
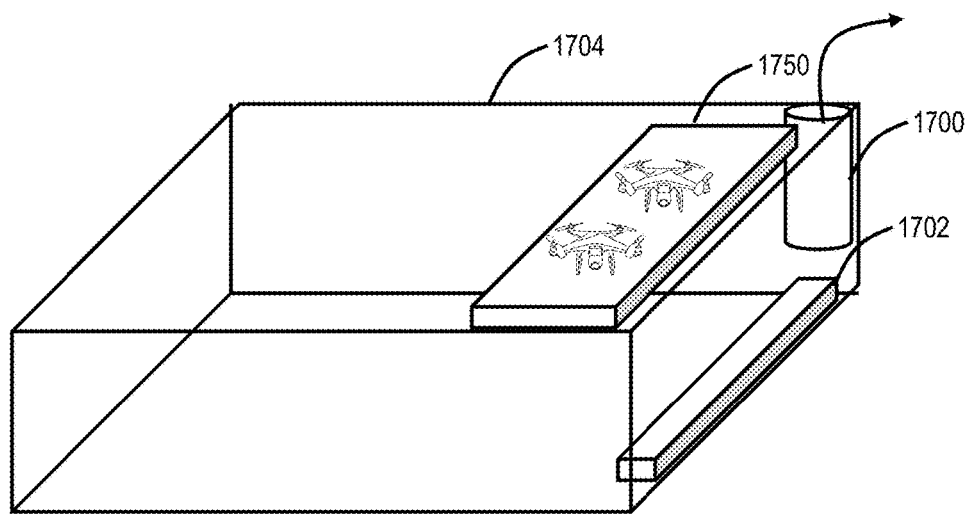
FIG. 28

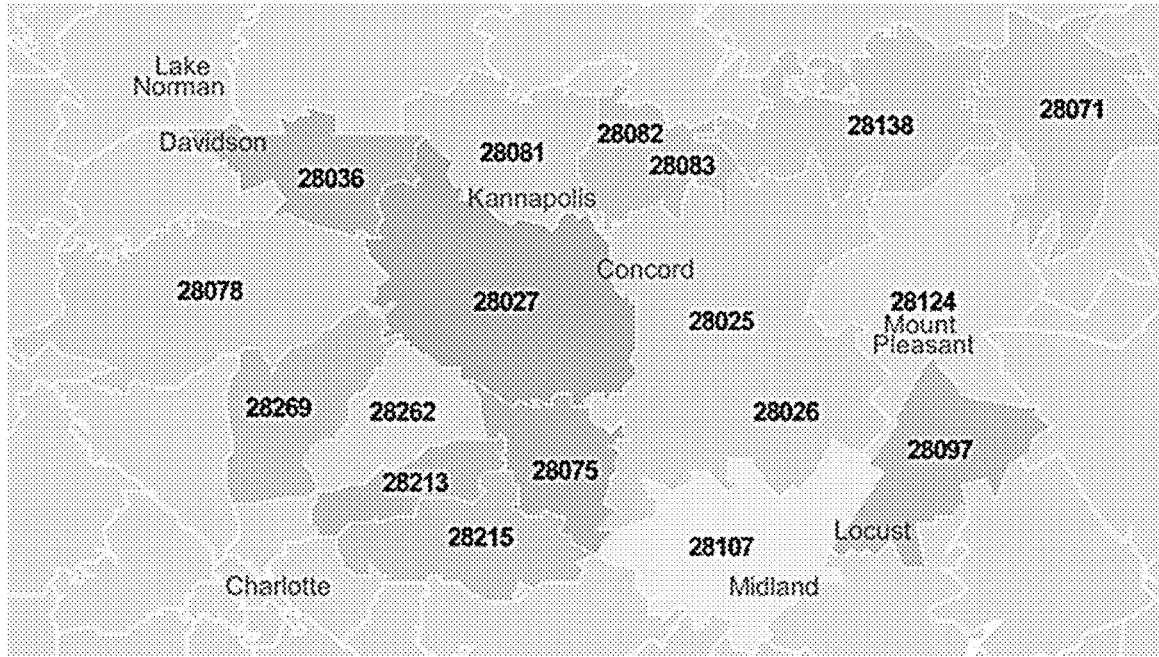

| | |
|---|---|
| IN AN AIR TRAFFIC CONTROL SYSTEM CONFIGURED TO MANAGE UNMANNED AERIAL VEHICLE (UAV) FLIGHT IN A PLURALITY OF GEOGRAPHIC REGIONS, WHEREIN THE AIR TRAFFIC CONTROL SYSTEM HAS ONE OR MORE SERVERS CONFIGURED TO MANAGE EACH GEOGRAPHIC REGION WHICH IS PREDETERMINED BASED ON A GEOGRAPHIC BOUNDARY, COMMUNICATING TO ONE OR MORE UAVS VIA ONE OR MORE WIRELESS NETWORKS, WHEREIN THE ONE OR MORE UAVS ARE CONFIGURED TO MAINTAIN THEIR FLIGHT IN THE PLURALITY OF GEOGRAPHIC REGIONS BASED ON COVERAGE OF OR CONNECTIVITY TO THE ONE OR MORE WIRELESS NETWORKS | 2300, 2302 |
| OBTAINING DATA RELATED TO THE ONE OR MORE UAVS, WHEREIN THE DATA INCLUDES FLIGHT OPERATIONAL DATA, FLIGHT PLAN DATA, AND SENSOR DATA RELATED TO OBSTRUCTIONS AND OTHER UAVS | 2304 |
| ANALYZING AND STORING THE DATA FOR EACH GEOGRAPHIC REGION | 2306 |
| MANAGING FLIGHT OF THE ONE OR MORE UAVS IN CORRESPONDING GEOGRAPHIC REGIONS BASED ON THE DATA | 2308 |

PASSENGER DRONE SWITCHOVER BETWEEN WIRELESS NETWORKS

CROSS-REFERENCE TO RELATED APPLICATION(S)

The present patent/application is continuation-in-part of, and the content of each is incorporated by reference herein

| Filing Date | Ser. No. | Title |
| --- | --- | --- |
| Oct. 2, 2019 | 16/590,516 | Emergency shutdown and landing for passenger drones and unmanned aerial vehicles with air traffic control systems |
| Aug. 20, 2019 | 16/545,051 | Managing detected obstructions in air traffic control systems for passenger drones |
| Jul. 15, 2019 | 16/511,262 | Obstruction detection in air traffic control systems for passenger drones |
| Jul. 15, 2019 | 16/511,228 | Air traffic control monitoring systems and methods for passenger drones |
| Jun. 17, 2019 | 16/442,597 | Flying lane management systems and methods for passenger drones |
| May 21, 2019 | 16/417,805 | Air traffic control of passenger drones concurrently using a plurality of wireless networks |
| Nov. 16, 2018 | 16/193,053 | Systems and methods for air traffic control for passenger drones |
| Oct. 9, 2018 | 16/155,354 | Systems and methods for drone air traffic control utilizing geographic boundaries for management |
| Aug. 10, 2018 | 16/100,571 | Drone Air Traffic Control incorporating weather updates |
| Jun. 6, 2018 | 16/000,950 | Flying Lane Management with Lateral Separations between Drones |
| May 22, 2018 | 15/985,996 | Drone collision avoidance via Air Traffic Control over wireless networks |
| Nov. 1, 2017 | 15/800,574 | Elevator or tube lift for drone takeoff and control thereof via air traffic control systems |
| Oct. 31, 2016 | 15/338,559 | Waypoint directory in air traffic control systems for unmanned aerial vehicles |
| Oct. 13, 2016 | 15/292,782 | Managing dynamic obstructions in air traffic control systems for unmanned aerial vehicles |
| Sep. 19, 2016 | 15/268,831 | Managing detected obstructions in air traffic control systems for unmanned aerial vehicles |
| Sep. 2, 2016 | 15/255,672 | Obstruction detection in air traffic control systems for unmanned aerial vehicles |
| Jul. 22, 2016 | 15/217,135 | Flying lane management systems and methods for unmanned aerial vehicles |
| Aug. 23, 2016 | 15/244,023 | Air traffic control monitoring systems and methods for unmanned aerial vehicles |
| Jun. 27, 2016 | 15/193,488 | Air traffic control of unmanned aerial vehicles for delivery applications |
| Jun. 17, 2016 | 15/185,598 | Air traffic control of unmanned aerial vehicles concurrently using a plurality of wireless networks |
| Jun. 10, 2016 | 15/179,188 | Air traffic control of unmanned aerial vehicles via wireless networks |

FIELD OF THE DISCLOSURE

The present disclosure relates generally to drones and specifically air traffic control. More particularly, the present disclosure relates to passenger drone switchover between wireless networks.

BACKGROUND OF THE DISCLOSURE

Use of drones is proliferating. Drones are used for a variety of applications such as search and rescue, inspections, security, surveillance, scientific research, aerial photography and video, surveying, cargo delivery, and the like. Further, drones can be used for personal transportation, i.e., manned drones. With the proliferation, the Federal Aviation Administration (FAA) is providing regulations associated with the use of drones. Existing air traffic control in the United States is performed through a dedicated air traffic control network, i.e., the National Airspace System (NAS). However, it is impractical to use the existing air traffic control network for drones because of the sheer quantity of drones. Also, it is expected that some drones be autonomous, requiring communication for flight control as well. There will be a need for systems and methods to provide air traffic control and communication to drones.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a flowchart of a UAV air traffic control method utilizing wireless networks;

FIG. 9 is a flowchart of a UAV air traffic control method concurrently utilizing a plurality of wireless networks;

FIG. 27 is a diagram of a lift tube and a staging location;

FIG. 28 is a diagram of the lift tube in a location such as a factory, warehouse, distribution center, etc.;

FIG. 29 is a diagram of a pneumatic lift tube;

FIG. 30 is a diagram of an elevator lift tube;

FIG. 37 is a map of north Charlotte illustrating zip codes;

FIG. 38 is a flowchart of a process for drone air traffic control via multiple ATC system utilizing zip codes or the like as geographic boundaries;

DETAILED DESCRIPTION OF THE DISCLOSURE

Figure 1:
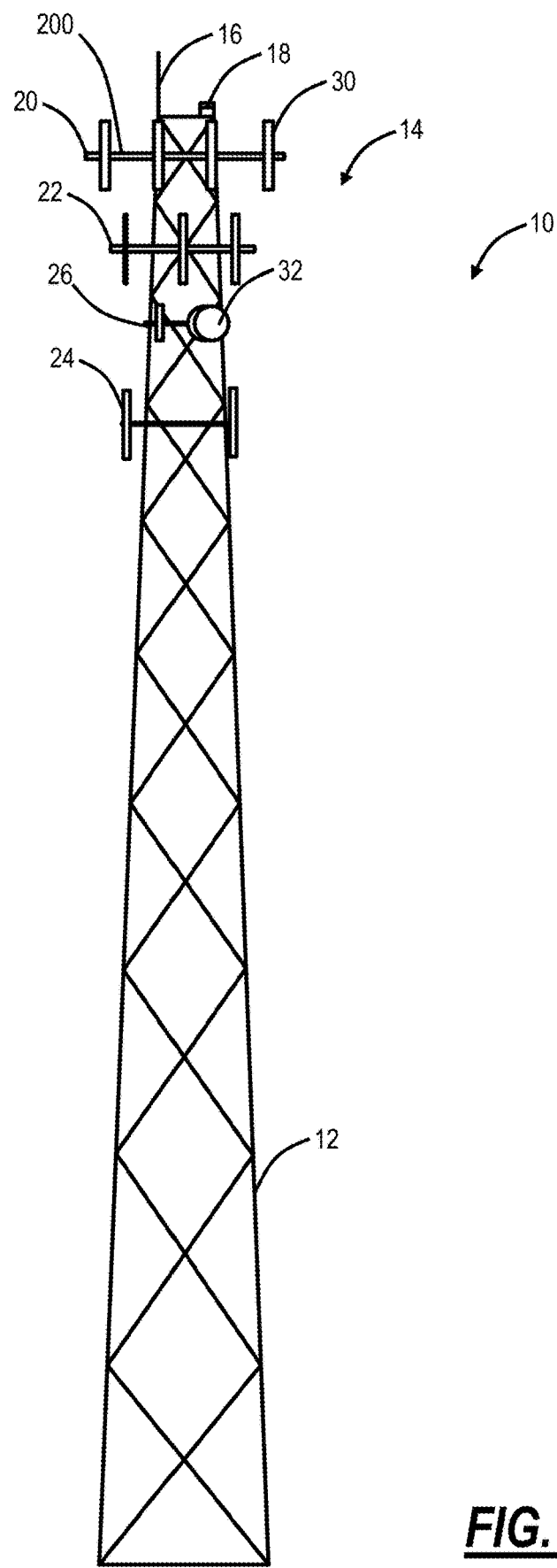
FIG. 1 is a diagram of a side view of an example cell site.

The present disclosure relates to systems and methods for air traffic control for passenger drones. Various techniques are described herein for drone Air Traffic Control (ATC) with respect to Unmanned Aerial Vehicles (UAVs). The present disclosure extends these techniques to manned aerial vehicles, passenger drones, pilotless helicopters, flying taxi, etc., collectively referred to herein as passenger drones. That is, the various descriptions herein relative to UAVs are equally applicable to passenger drones.

In another embodiment, the present disclosure relates to dynamic flying lane management systems and methods for drone air traffic control. Flying lanes are geographical paths for drone flight and are created, managed, and assigned by a Drone Air Traffic Control (ATC) system. In an embodiment, the flying lanes are based on Federal Aviation Administration (FAA) input, policies, and standards. The flying lanes are dynamically managed and modified based on the FAA input, other air traffic, weather, obstructions, and the like. An ATC system can be configured to route UAVs to and from flying lanes including based on dynamically changing flying lanes.

In another embodiment, multiple ATC systems can manage UAVs over a geographic region with existing wireless networks providing connectivity to the UAVs. For example, the boundaries can be based on Zip code boundaries or some other existing boundary. The multiple ATC systems can manage UAVs in their region based on these boundaries, coordinate UAV traffic between regions, provide redundant coverage for adjacent regions, etc. Also, with the boundaries, the ATC systems can develop, manage, and integrate flying lanes with the boundaries.

Further, the present disclosure relates to systems and methods for Drone Air Traffic Control (ATC) over wireless networks for package pickup and delivery. Embodiments describe drone service delivery using the ATC over wireless networks. A drone delivery service can manage delivery for a variety of providers enabling drone delivery for smaller providers. Further, the ATC system can be used to schedule, manage, and coordinate pickup, distribution, delivery, and returns.

Further, the present disclosure relates to systems and methods for flying lane management with lateral separation between drones. This disclosure relates to lateral separations between drones (UAV's) operating in the same flying lane or at the same altitude and in the same proximity or geography. Further, the present disclosure relates to systems and methods for drone collision avoidance via an Air Traffic Control System over wireless networks. Specifically, the systems and methods include a modified Inevitable Collision State (ICS) for UAV or drone Air Traffic Control (ATC). A traditional ICS states that no matter what the future trajectory is, a collision with an obstacle eventually occurs. The modified ICS described herein considers various variables to determine if there is a possibility for a future collision. This enables predictions of collision and an ability to react/ redirect drones away from areas and objects which could be the cause of a collision.

Further, the present disclosure relates to an elevator or tube lift for drone takeoff and for control thereof via an Air Traffic Control (ATC) system. Specifically, the elevator or tube lift contemplates location in a factory, warehouse, distribution center, etc. such that UAVs can be loaded with products or delivery items and then take off from an elevated position or rooftop without an individual carrying the UAV to the roof or outside.

Further, the present disclosure relates to systems and methods for drone network switchover between wireless networks such as during outages, failures, catastrophes, etc. As described herein, an Air Traffic Control (ATC) system can be used to control UAVs or drones with communication via existing wireless networks. The UAVs can be configured to communicate on multiple different wireless networks, such as a primary and a backup network. The systems and methods herein provide techniques for the switchover from one network to another under certain circumstances. Additionally, emergency instructions can be provided to the UAVs in case of network disturbances, e.g., in the event the UAV cannot reestablish communication with the ATC system.

Further, the present disclosure relates to systems and methods for with a waypoint directory in air traffic control systems for UAVs. A waypoint is a reference point in physical space used for purposes of navigation in the air traffic control systems for UAVs. Variously, the systems and methods describe managing waypoints by an air traffic control system which uses one or more wireless networks and by associated UAVs in communication with the air traffic control system. The waypoints can be defined based on the geography, e.g., different sizes for dense urban areas, suburban metro areas, and rural areas. The air traffic control system can maintain the status of each waypoint, e.g., clear, obstructed, or unknown. The status can be continually updated and managed with the UAVs and used for routing the UAVs.

Further, the present disclosure relates to systems and methods for managing detected obstructions with air traffic control systems for UAVs. Variously, the systems and methods provide a mechanism in the Air Traffic Control (ATC) System to characterize detected obstructions at or near the ground. In an embodiment, the detected obstructions are dynamic obstructions, i.e., moving at or near the ground. Examples of dynamic obstructions can include, without limitation, other UAVs, vehicles on the ground, cranes on the ground, and the like. Generally, dynamic obstruction management includes managing other UAVs at or near the ground and managing objects on the ground which are moving, which could either interfere with a landing or with low-flying UAVs. In various embodiment, the UAVs are equipped to locally detect and identify dynamic obstructions for avoidance thereof and to notify the ATC system for management thereof.

Further, the detected obstructions are static obstructions, i.e., not moving, which can be temporary or permanent. The ATC system can implement a mechanism to accurately define the location of the detected obstructions, for example, a virtual rectangle, cylinder, etc. defined by location coordinates and altitude. The defined location can be managed and determined between the ATC system and the UAVs as well as communicated to the UAVs for flight avoidance. That is, the defined location can be a "no-fly" zone for the UAVs. Importantly, the defined location can be precise since it is expected there are a significant number of obstructions at or near the ground, and the UAVs need to coordinate their flight to avoid these obstructions. In this manner, the systems and methods seek to minimize the no-fly zones.

Further, the present disclosure relates to obstruction detection systems and methods with air traffic control systems for UAVs. Specifically, the systems and methods use a framework of an air traffic control system which uses wireless (cell) networks to communicate with various UAVs. Through such communication, the air traffic control system receives continuous updates related to existing obstructions whether temporary or permanent, maintains a database of present obstructions, and updates the various UAVs with associated obstructions in their flight plan. The systems and methods can further direct UAVs to investigate, capture data, and provide such data for analysis to detect and identify obstructions for addition in the database. The systems and methods can make use of the vast data collection equipment on UAVs, such as cameras, radar, etc. to properly identify and classify obstructions.

Further, the present disclosure relates to air traffic control monitoring systems and methods for UAVs. Conventional FAA Air Traffic Control monitoring approaches are able to track and monitor all airplanes flying in the U.S. concurrently. Such approaches do not scale with UAVs, which can exceed airplanes in numbers by several orders of magnitude. The systems and methods provide a hierarchical monitoring approach where zones or geographic regions of coverage are aggregated into a consolidated view for monitoring and control. The zones or geographic regions can provide local monitoring and control while the consolidated view can provide national monitoring and control in addition to local monitoring and control through a drill-down process. A consolidated server can aggregate data from various sources of control for zones or geographic regions. From this consolidated server, monitoring and control can be performed for any UAV communicatively coupled to a wireless network.

Further, flying lane management systems and methods are described for UAVs such as through an air traffic control system that uses one or more wireless networks. As described herein, a flying lane for a UAV represents its path from takeoff to landing at a certain time. The objective of flying lane management is to prevent collisions, congestion, etc. with UAVs in flight. A flying lane can be modeled as a vector which includes coordinates and altitude (i.e., x, y, and z coordinates) at a specified time. The flying lane also can include speed and heading such that the future location can be determined. The flying lane management systems utilize one or more wireless networks to manage UAVs in various applications.

Note, flying lanes for UAVs have significant differences from conventional air traffic control flying lanes for aircraft (i.e., commercial airliners). First, there will be orders of magnitude more UAVs in flight than aircraft. This creates a management and scale issue. Second, air traffic control for UAVs is slightly different than aircraft in that collision avoidance is paramount in aircraft; while still important for UAVs, the objective does not have to be collision avoidance at all costs. It is further noted that this ties into the scale issue where the system for managing UAVs will have to manage so many more UAVs. Collision avoidance in UAVs is about avoiding property damage in the air (deliveries and the UAVs) and on the ground; collision avoidance in commercial aircraft is about safety. Third, UAVs are flying at different altitudes, much closer to the ground, i.e., there may be many more ground-based obstructions. Fourth, UAVs do not have designated takeoff/landing spots, i.e., airports, causing the different flight phases to be intertwined more, again adding to more management complexity.

To address these differences, the flying lane management systems and methods provide an autonomous/semi-autonomous management system, using one or more wireless networks, to control and manage UAVs in flight, in all phases of a flying plane and adaptable based on continuous feedback and ever-changing conditions. Additionally, the present disclosure relates to integrating real-time weather information into flying lane management.

Also, the present disclosure relates to air traffic control of UAVs in delivery applications, i.e., using the drones to deliver packages, etc. to end users. Specifically, an air traffic control system utilizes existing wireless networks, such as wireless networks including wireless provider networks, i.e., cell networks, using Long Term Evolution (LTE) or the like, to provide air traffic control of UAVs. Also, the cell networks can be used in combination with other networks such as the NAS network or the like. Advantageously, cell networks provide high-bandwidth connectivity, low-cost connectivity, and broad geographic coverage. The air traffic control of the UAVs can include, for example, separation assurance between UAVs; navigation assistance; weather and obstacle reporting; monitoring of speed, altitude, location, direction, etc.; traffic management; landing services; and real-time control. The UAV is equipped with a mobile device, such as an embedded mobile device or physical hardware, emulating a mobile device. In an embodiment, the UAV can be equipped with hardware to support plural cell networks, to allow for broad coverage support. In another embodiment, UAV flight plans can be constrained based on the availability of wireless cell coverage. In a further embodiment, the air traffic control can use plural wireless networks for different purposes such as using the NAS network for location and traffic management and using the cell network for the other functions.

The present disclosure leverages the existing wireless networks to address various issues associated with specific UAV applications such as delivery and to address the vast number of UAVs concurrently expected in flight relative to air traffic control. In an embodiment, in addition to air traffic control, the air traffic control system also supports package delivery authorization and management, landing authorization and management, separation assurance through altitude and flying lane coordination, and the like. Thus, the air traffic control system, leveraging existing wireless networks, can also provide application-specific support.

Cell Site

FIG. 1 is a diagram of a side view of a cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lightning rod 16 and a warning light 18. Of course, there may various additional components associated with the cell tower 12 and the cell site 10, which are omitted for illustration purposes. In this embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g., there can be three sectors for the cell site components—alpha, beta, and gamma. The antennas 30 are used to both transmit a radio signal to a mobile device and receive the signal from the mobile device. The antennas 30 are usually deployed as a single, groups of two, three, or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

FAA Regulations

The FAA is overwhelmed with applications from companies interested in flying drones, but the FAA is intent on keeping the skies safe. Currently, approved exemptions for flying drones include tight rules. Once approved, there is some level of certification for drone operators along with specific rules such as speed limit of 100 mph, height limitations such as 400 ft, no-fly zones, only day operation, documentation, and restrictions on aerial filming. It is expected that these regulations will loosen as UAV deployments evolve. However, it is expected that the UAV regulations will require flight which would accommodate wireless connectivity to cell towers 12, e.g., less than a few hundred feet.

Example Hardware

Figure 2:
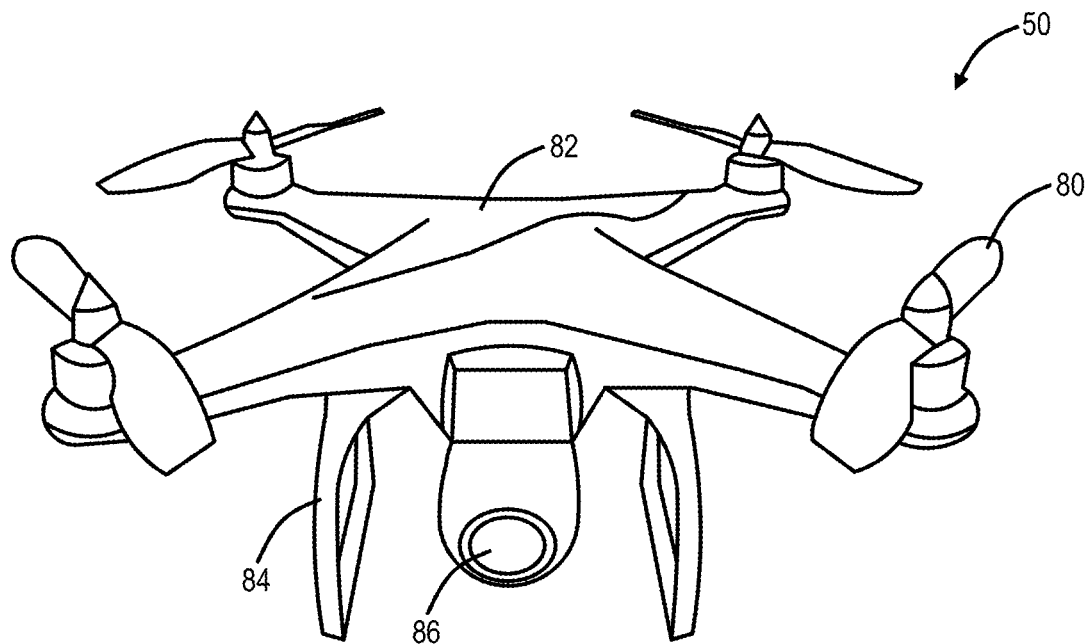
FIG. 2 is a perspective view of a UAV for use with the systems and methods described herein.

FIG. 2 is a perspective view of an example UAV 50 for use with the systems and methods described herein. Again, the UAV 50 may be referred to as a drone or the like. The UAV 50 may be a commercially available UAV platform that has been modified to carry specific electronic components as described herein to implement the various systems and methods. The UAV 50 includes rotors 80 attached to a body 82. A lower frame 84 is located on a bottom portion of the body 82, for landing the UAV 50 to rest on a flat surface and absorb impact during landing. The UAV 50 also includes a camera 86 which is used to take still photographs, video, and the like. Specifically, the camera 86 is used to provide a real-time display on the screen. The UAV 50 includes various electronic components inside the body 82 and/or the camera 86 such as, without limitation, a processor, a data store, memory, a wireless interface, and the like. Also, the UAV 50 can include additional hardware, such as robotic arms or the like that allow the UAV 50 to attach/detach components for the cell site components 14. Specifically, it is expected that the UAV 50 will get bigger and more advanced, capable of carrying significant loads, and not just a wireless camera.

These various components are now described with reference to a mobile device 100 or a processing device 100. Those of ordinary skill in the art will recognize the UAV 50 can include similar components to the mobile device 100. In an embodiment, the UAV 50 can include one or more mobile devices 100 embedded therein, such as for different cellular networks. In another embodiment, the UAV 50 can include hardware which emulates the mobile device 100, including support for multiple different cellular networks. For example, the hardware can include multiple different antennas and unique identifier configurations (e.g., Subscriber Identification Module (SIM) cards). For example, the UAV 50 can include circuitry to communicate with one or more LTE networks with an associated unique identifier, e.g., serial number.

Figure 3:
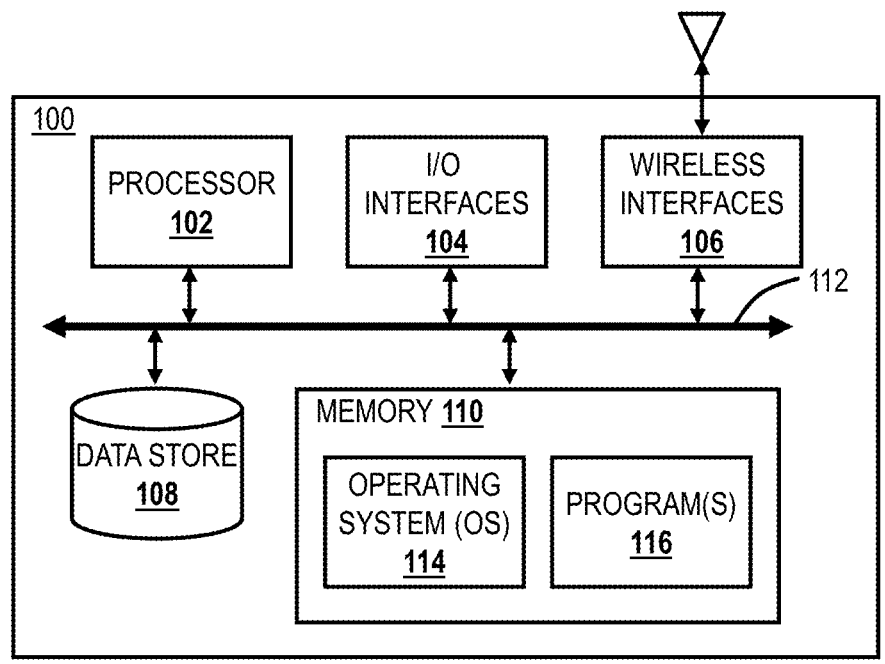
FIG. 3 is a block diagram of a mobile device, which may be embedded or associated with the UAV of FIG. 1.

FIG. 3 is a block diagram of mobile device 100 hardware, which may be embedded or associated with the UAV 50. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 3 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e., camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with the UAV 50 for command and control as well as to relay data. Again, the wireless interfaces 106 can be configured to communicate on a specific cell network or on a plurality of cellular networks. The wireless interfaces 106 include hardware, wireless antennas, etc. enabling the UAV 50 to communicate concurrently with a plurality of wireless networks, such as cellular networks, GPS, GLONASS, WLAN, WiMAX, or the like.

The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 3, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end-user functionality with the mobile device 100, including performing various aspects of the systems and methods described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example Server

Figure 4:
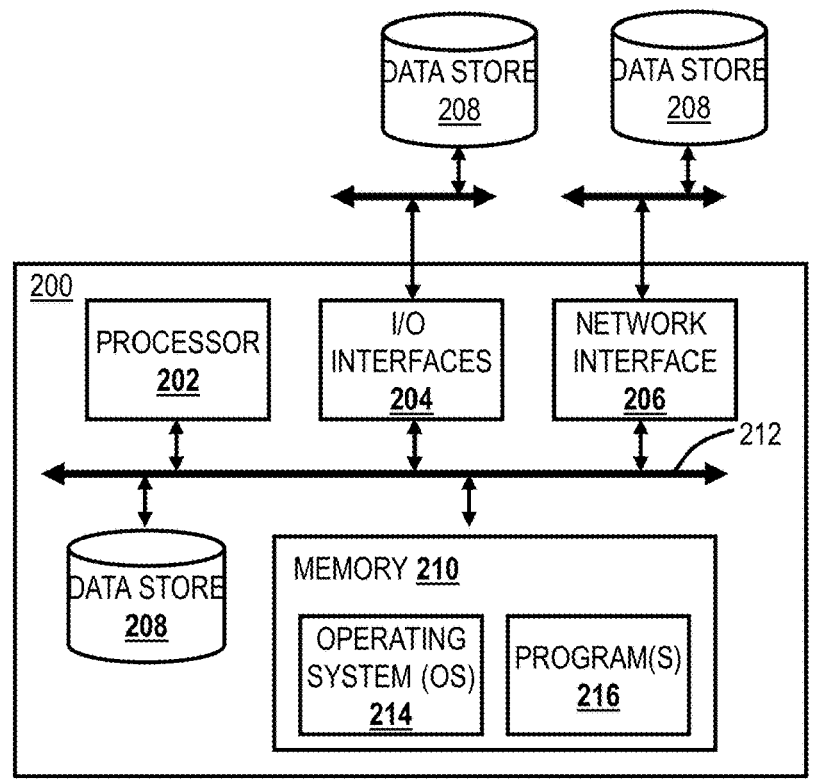
FIG. 4 is a network diagram of various cell sites deployed in a geographic region.

FIG. 4 is a block diagram of a server 200 which may be used for air traffic control of the UAVs 50. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as to a plurality of UAVs 50 over a cell network or the like. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

UAV Air Traffic Control System

Figure 5:
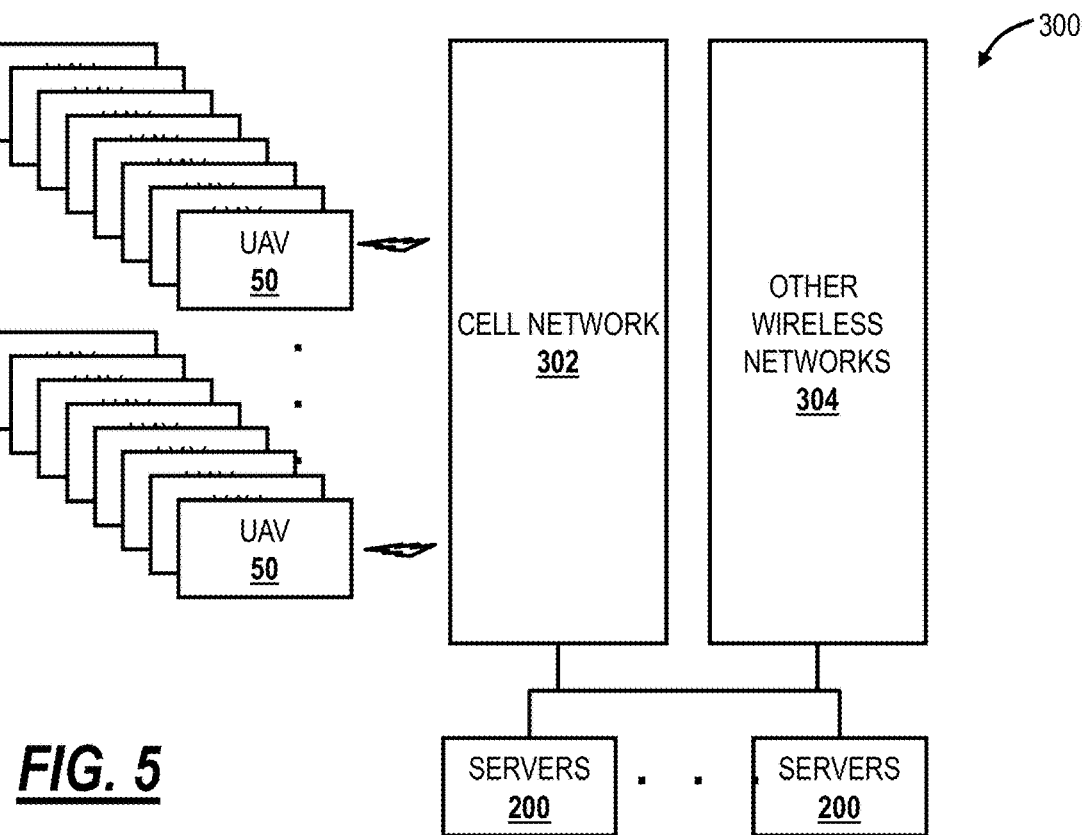
FIG. 5 is a block diagram of functional components of a UAV air traffic control system.

FIG. 5 is a block diagram of functional components of a UAV air traffic control system 300. The UAV air traffic control system 300 includes a cell network 302 and optionally other wireless networks 304 communicatively coupled to one or more servers 200 and to a plurality of UAVs 50. The cell network 302 can actually include a plurality of different provider networks, such as AT&T, Verizon, Sprint, etc. The cell network 302 is formed in part with a plurality of cell towers 12, geographically dispersed and covering the vast majority of the United States. The cell towers 12 are configured to backhaul communications from subscribers. In the UAV air traffic control system 300, the subscribers are the UAVs 50 (in addition to conventional mobile devices), and the communications are between the UAVs 50 and the servers 200. The other wireless networks 304 can include, for example, the NAS network, GPS and/or GLONASS, WLAN networks, private wireless networks, or any other wireless networks.

The servers 200 are configured to provide air traffic control and can be deployed in a control center, at a customer premises, in the cloud, or the like. Generally, the servers 200 are configured to receive communications from the UAVs 50 such as for continuous monitoring and of relevant details of each UAV 50 such as location, altitude, speed, direction, function, etc. The servers 200 are further configured to transmit communications to the UAVs 50 such as for control based on the details, such as to prevent collisions, to enforce policies, to provide navigational control, to actually fly the UAVs 50, to land the UAVs 50, and the like. That is, generally, communications from the UAV 50 to the server 200 are for detailed monitoring, and communications to the UAV 50 from the server 200 are for control thereof.

Data Management

Each UAV 50 is configured with a unique identifier, such as a SIM card or the like. Similar to standard mobile devices 100, each UAV 50 is configured to maintain an association with a plurality of cell towers 12 based on a current geographic location. Using triangulation or other location identification techniques (GPS, GLONASS, etc.), the location, altitude, speed, and direction of each UAV 50 can be continuously monitored and reported back to the servers 200. The servers 200 can implement techniques to manage this data in real-time in an automated fashion to track and control all UAVs 50 in a geographic region. For example, the servers 200 can manage and store the data in the data store 208.

Air Traffic Control Functions

The servers 200 are configured to perform air traffic control functionality of the UAV air traffic control system 300. Specifically, the servers 200 are configured to perform separation assurance, navigation, traffic management, landing, and general control of the UAVs 50. The separation assurance includes tracking all of the UAVs 50 in flight, based on the monitored data, to ensure adequate separation. The navigation includes maintaining defined airways. The traffic management includes comparing flights plan of UAVs 50 to avoid conflicts and to ensure the smooth and efficient flow of UAVs 50 in flight. The landing includes assisting and control of UAVs 50 at the end of their flight. The general control includes providing real-time data including video and other monitored data and allowing control of the UAV 50 in flight. The general control can also include automated flight of the UAVs 50 through the UAV air traffic control system 300, such as for autonomous UAVs. Generally, the UAV air traffic control system 300 can include routing and algorithms for autonomous operation of the UAVs 50 based on initial flight parameters. The UAV air traffic control system 300 can control speed, flight path, and altitude for a vast number of UAVs 50 simultaneously.

UAV Flight Plans

Figure 6:
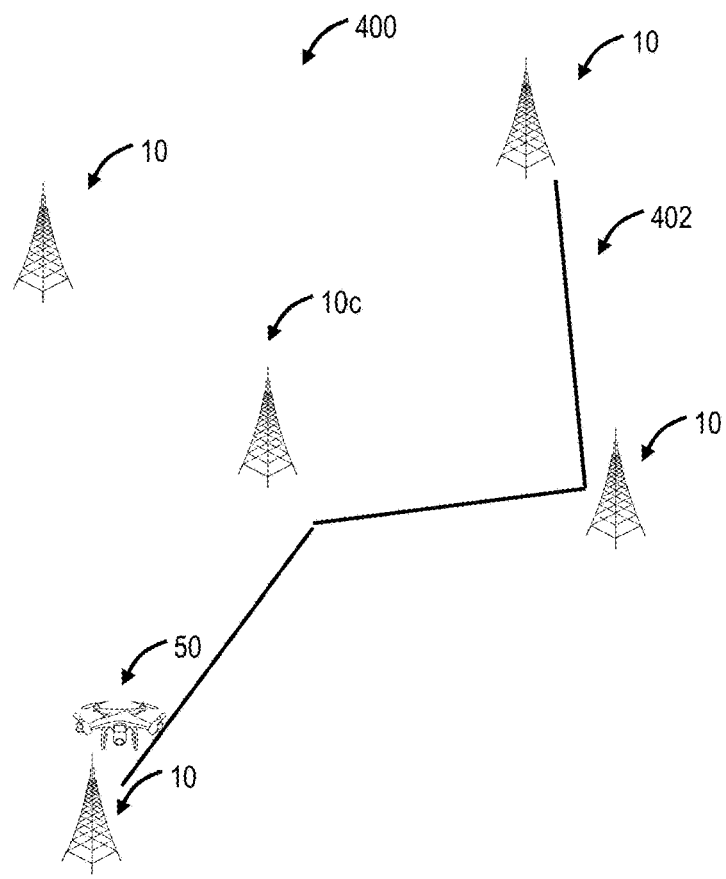
FIG. 6 is a diagram of various cell sites deployed in a geographic region.

FIG. 6 is a network diagram of various cell sites 10a-10e deployed in a geographic region 400. In an embodiment, the UAV 50 is configured to fly a flight plan 402 in the geographic region 400 while maintaining associations with multiple cell sites 10a-10e during the flight plan 402. In an embodiment, the UAV 50 is constrained only to fly in the geographic region 400 where it has cell coverage. This constraint can be preprogrammed based on predetermining cell coverage. Alternatively, the constraint can be dynamically managed by the UAV 50 based on monitoring its cell signal level in the mobile device 100 hardware. Here, the UAV 50 will alter its path whenever it loses or detects signal degradation to ensure it is always active on the cell network 302. During the flight plan 402, the cell sites 10a-10e are configured to report monitored data to the servers 200 periodically to enable real-time air traffic control. Thus, the communication between the UAVs 50 is bidirectional with the servers 200, through the associated cell sites 10.

In an embodiment, the UAV 50 maintains an association with at least three of the cell sites 10 which perform triangulation to determine the location of the UAV 50. In addition to the cell sites 10 on the cell network 302, the UAV 50 can also communicate to the other wireless networks 304. In an embodiment, the UAV 50 can maintain its GPS and/or GLONASS location and report that over the cell network 302. In another embodiment, the other wireless networks 304 can include satellite networks or the like.

Triangulation

Figure 7:
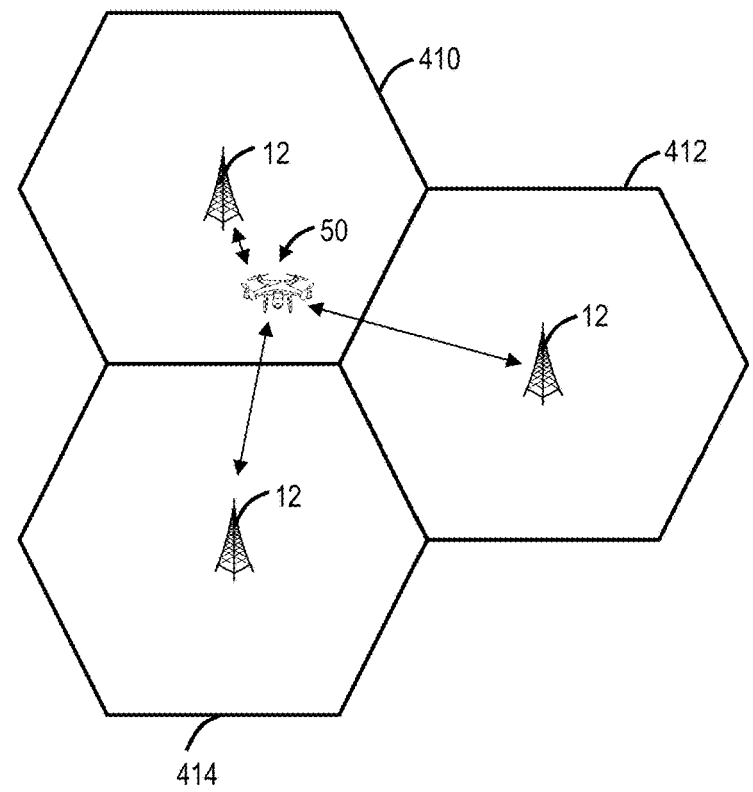
FIG. 7 is a map of three cell towers and associated coverage areas for describing location determination of the UAV.

FIG. 7 is a map of three cell towers 12 and associated coverage areas 410, 412, 414 for describing location determination of the UAV 50. Typically, for a cell site 10, in rural locations, the coverage areas 410, 412, 414 can be about 5 miles in radius whereas, in urban locations, the coverage areas 410, 412, 414 can be about 0.5 to 2 miles in radius. One aspect of the UAV air traffic control system 300 is to maintain a precise location at all time of the UAVs 50. This can be accomplished in a plurality of ways, including a combination. The UAV air traffic control system 300 can use triangulation based on the multiple cell towers 12, location identifiers from GPS/GLONASS transmitted over the cell network by the UAVs 50, sensors in the UAV 50 for determining altitude, speed, etc., and the like.

UAV Air Traffic Control Method Utilizing Wireless Networks

FIG. 8 is a flowchart of a UAV air traffic control method 450 utilizing wireless networks. The UAV air traffic control method 450 includes communicating with a plurality of UAVs via a plurality of cell towers associated with the wireless networks, wherein the plurality of UAVs each include hardware and antennas adapted to communicate to the plurality of cell towers, and wherein each of the plurality of UAVs include a unique identifier (step 452); maintaining data associated with flight of each of the plurality of UAVs based on the communicating (step 454); and processing the maintained data to perform a plurality of functions associated with air traffic control of the plurality of UAVs (step 456). The UAV-based method 450 can further include transmitting data based on the processing to one or more of the plurality of UAVs to perform the plurality of functions (step 458). The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

The maintaining data can include the plurality of UAVs and/or the plurality of cell towers providing location, speed, direction, and altitude. The location can be determined based on a combination of triangulation by the plurality of cell towers and a determination by the UAV based on a location identification network. The plurality of function can include one or more of separation assurance between UAVs; navigation assistance; weather and obstacle reporting; monitoring of speed, altitude, location, and direction; traffic management; landing services; and real-time control. One or more of the plurality of UAVs can be configured for autonomous operation through the air traffic control. The plurality of UAVs can be configured with mobile device hardware configured to operate on a plurality of different cellular networks.

UAV Air Traffic Control Method Concurrently Utilizing a Plurality of Wireless Networks FIG. 9 is a flowchart of an Unmanned Aerial Vehicle (UAV) air traffic control method 500 implemented in the UAV 50 during a flight, for concurrently utilizing a plurality wireless networks for air traffic control. The UAV air traffic control method 500 includes maintaining communication with a first wireless network and a second wireless network of the plurality of wireless networks (step 502); communicating first data with the first wireless network and second data with the second wireless network throughout the flight, wherein one or more of the first data and the second data is provided to an air traffic control system configured to maintain status of a plurality of UAVs in flight and perform control thereof (step 504); and adjusting the flight based on one or more of the first data and the second data and control from the air traffic control system (step 506). The first wireless network can provide bi-directional communication between the UAV and the air traffic control system and the second wireless network can support unidirectional communication to the UAV for status indications. The first wireless network can include one or more cellular networks, and the second wireless network can include a location identification network. Both the first wireless network and the second wireless network can provide bi-directional communication between the UAV and the air traffic control system for redundancy with one of the first wireless network and the second wireless network operating as primary and another as a backup. The first wireless network can provide bi-directional communication between the UAV and the air traffic control system and the second wireless network can support unidirectional communication from the UAV for status indications.

The UAV air traffic control method can further include constraining the flight based on coverage of one or more of the first wireless network and the second wireless network (step 508). The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

In another embodiment, an Unmanned Aerial Vehicle (UAV) adapted for air traffic control via an air traffic control system and via communication to a plurality of wireless networks includes one or more rotors disposed to a body; wireless interfaces including hardware and antennas adapted to communicate with a first wireless network and a second wireless network of the plurality of wireless networks, and wherein the UAV comprises a unique identifier; a processor coupled to the wireless interfaces and the one or more rotors; and memory storing instructions that, when executed, cause the processor to: maintain communication with the first wireless network and the second wireless network via the wireless interfaces; communicate first data with the first wireless network and second data with the second wireless network throughout the flight, wherein one or more of the first data and the second data is provided to an air traffic control system configured to maintain status of a plurality of UAVs in flight and perform control thereof; and adjust the flight based on one or more of the first data and the second data and control from the air traffic control system. The first wireless network can provide bi-directional communication between the UAV and the air traffic control system and the second wireless network can support unidirectional communication to the UAV for status indications. The first wireless network can include one or more cellular networks, and the second wireless network can include a location identification network. Both the first wireless network and the second wireless network can provide bi-directional communication between the UAV and the air traffic control system for redundancy with one of the first wireless network and the second wireless network operating as primary and another as a backup.

The first wireless network can provide bi-directional communication between the UAV and the air traffic control system and the second wireless network can support unidirectional communication from the UAV for status indications. The UAV can be configured to constrain the flight based on coverage of one or more of the first wireless network and the second wireless network. The constrained flight can include one or more of pre-configuring the UAV to operate only where the coverage exists, monitoring cell signal strength by the UAV and adjusting flight based therein, and a combination thereof. The first data can include location, speed, direction, and altitude for reporting to the air traffic control system. The control from the air traffic control system can include a plurality of functions comprising one or more of separation assurance between UAVs; navigation assistance; weather and obstacle reporting; monitoring of speed, altitude, location, and direction; traffic management; landing services; and real-time control. The UAV can be configured for autonomous operation through the air traffic control system.

Package Delivery Authorization and Management

Figure 10:
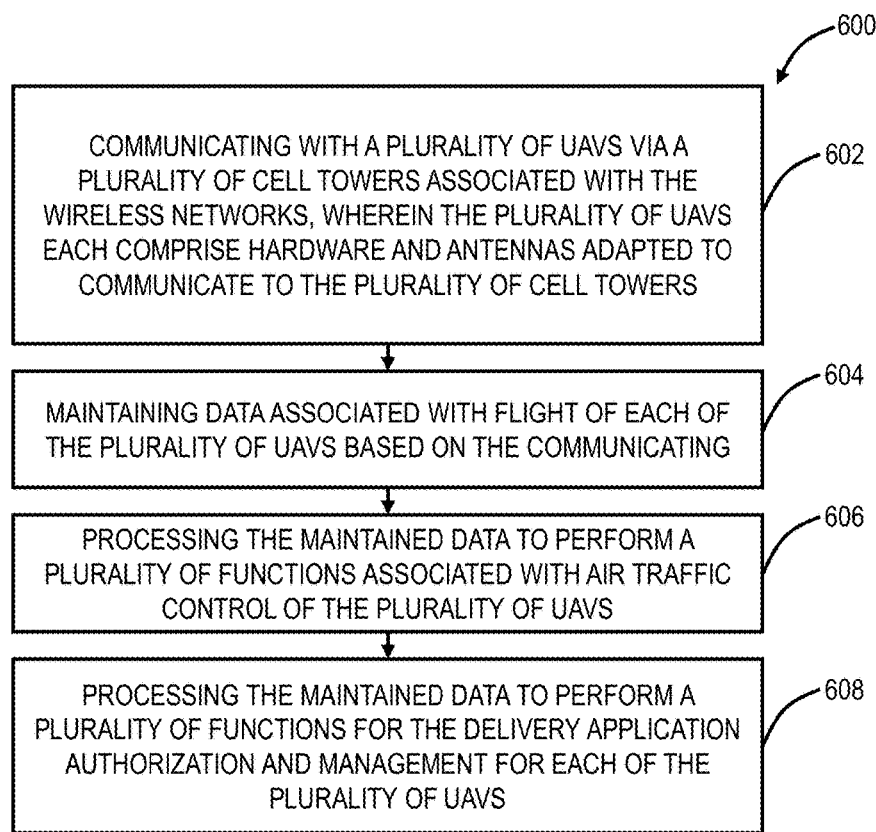
FIG. 10 is a flowchart of a package delivery authorization and management method utilizing the UAV air traffic control system of FIG. 5.

FIG. 10 is a flowchart of a package delivery authorization and management method 600 utilizing the UAV air traffic control system 300. The method 600 includes communicating with a plurality of UAVs via a plurality of cell towers associated with the wireless networks, wherein the plurality of UAVs each comprise hardware and antennas adapted to communicate to the plurality of cell towers (step 602); maintaining data associated with flight of each of the plurality of UAVs based on the communicating (step 604); processing the maintained data to perform a plurality of functions associated with air traffic control of the plurality of UAVs (step 606); and processing the maintained data to perform a plurality of functions for the delivery application authorization and management for each of the plurality of UAVs (step 608). The maintained data can include location information received and updated periodically from each of the plurality of UAVs, and wherein the location information is correlated to coordinates and altitude. The location information can be determined based on a combination of triangulation by the plurality of cell towers and a determination by the UAV based on a location identification network. The processing for the delivery application authorization and management can include checking the coordinates and the altitude based on a flight plan, for each of the plurality of UAVs. The checking the coordinates and the altitude can further include assuring each of the plurality of UAVs is in a specified flying lane.

The maintained data can include current battery and/or fuel status for each of the plurality of UAVs, and wherein the processing for the delivery application authorization and management can include checking the current battery and/or fuel status to ensure sufficiency to provide a current delivery, for each of the plurality of UAVs. The maintained data can include photographs and/or video of a delivery location, and wherein the processing for the delivery application authorization and management can include checking the delivery location is clear for landing and/or dropping a package, for each of the plurality of UAVs. The maintained data can include photographs and/or video of a delivery location, and wherein the processing for the delivery application authorization and management comprises, for each of the plurality of UAVs, checking the delivery location for a delivery technique including one of landing, dropping via a tether, dropping to a doorstep, dropping to a mailbox, dropping to a porch, and dropping to a garage. The plurality of UAVs can be configured to constrain flight based on coverage of the plurality of cell towers. The constrained flight can include one or more of pre-configuring the plurality of UAVs to operate only where the coverage exists, monitoring cell signal strength by the plurality of UAVs and adjusting flight based therein, and a combination thereof.

Package Delivery Authorization and Management Via the Air Traffic Control System In another embodiment, the air traffic control system 300 utilizing wireless networks and concurrently supporting delivery application authorization and management includes the processor and the network interface communicatively coupled to one another; and the memory storing instructions that, when executed, cause the processor to: communicate, via the network interface, with a plurality of UAVs via a plurality of cell towers associated with the wireless networks, wherein the plurality of UAVs each include hardware and antennas adapted to communicate to the plurality of cell towers; maintain data associated with flight of each of the plurality of UAVs based on the communicating; process the maintained data to perform a plurality of functions associated with air traffic control of the plurality of UAVs; and process the maintained data to perform a plurality of functions for the delivery application authorization and management for each of the plurality of UAVs.

Landing Authorization and Management

In another aspect, the air traffic control system 300 can be configured to provide landing authorization and management in addition to the aforementioned air traffic control functions and package delivery authorization and management. The landing authorization and management can be at the home base of the UAV, at a delivery location, and/or at a pickup location. The air traffic control system 300 can control and approve the landing. For example, the air traffic control system 300 can receive photographs and/or video from the UAV 50 of the location (home base, delivery location, pickup location). The air traffic control system 300 can make a determination based on the photographs and/or video, as well as other parameters such as wind speed, temperature, etc. to approve the landing.

Separation Assurance Via the Air Traffic Control System

In another aspect, the air traffic control system 300 can be used to for separation assurance through altitude and flying lane coordination in addition to the aforementioned air traffic control functions, package delivery authorization, and management, landing authorization and management, etc. As the air traffic control system 300 has monitored data from various UAVs 50, the air traffic control system 300 can keep track of specific flight plans as well as cause changes in real time to ensure specific altitude and vector headings, i.e., a flight lane. For example, the air traffic control system 300 can include specific geography of interest, and there can be adjacent air traffic control systems 300 that communicate to one another and share some overlap in the geography for handoffs. The air traffic control systems 300 can make assumptions on future flight behavior based on the current data and then direct UAVs 50 based thereon. The air traffic control system 300 can also communicate with commercial aviation air traffic control systems for limited data exchange to ensure the UAVs 50 does not interfere with commercial aircraft or fly in no-fly zones.

Flying Lane Management

Figure 11:
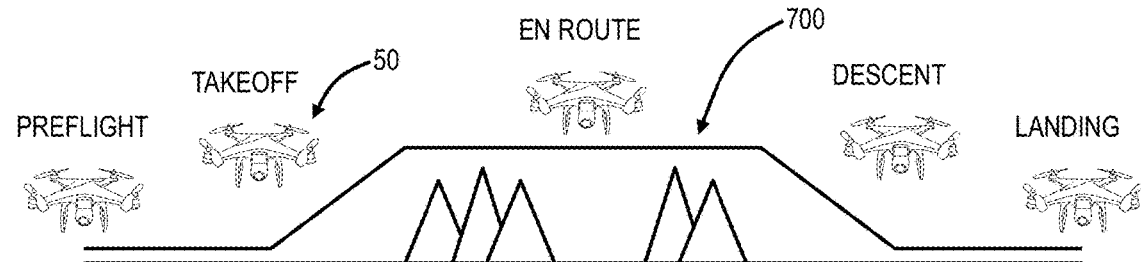
FIG. 11 is a diagram of a flight path of an associated flying lane of a UAV from takeoff to landing.

FIG. 11 is a diagram of a flight path of an associated flying lane 700 of a UAV 50 from takeoff to landing. The flying lane 700 covers all flight phases, which include preflight, takeoff, en route, descent, and landing. Again, the flying lane 700 includes coordinates (e.g., GPS, etc.), altitude, speed, and heading at a specified time. As described herein, the UAV 50 is configured to communicate to the air traffic control system 300, during all of the flight phases, such as via the networks 302, 304. The air traffic control system 300 is configured to monitor and manage/control the flying lane 700 as described herein. The objective of this management is to avoid collisions, avoid obstructions, avoid flight in restricted areas or areas with no network 302, 304 coverage, etc.

During preflight, the UAV 50 is configured to communicate with the air traffic control system 300 for approvals (e.g., flight plan, destination, the flying lane 700, etc.) and notification thereof, for verification (e.g., weather, delivery authorization, etc.), and the like. The key aspect of the communication during the preflight is for the air traffic control system 300 to become aware of the flying lane 700, to ensure it is open, and to approve the UAV 50 for takeoff. Other aspects of the preflight can include the air traffic control system 300 coordinating the delivery, coordinating with other systems, etc. Based on the communication from the UAV 50 (as well as an operator, scheduler, etc.), the air traffic control system 300 can perform processing to make sure the flying lane 700 is available and if not, to adjust accordingly.

During takeoff, the UAV 50 is configured to communicate with the air traffic control system 300 for providing feedback from the UAV 50 to the air traffic control system 300. Here, the air traffic control system 300 can store and process the feedback to keep up to date with the current situation in airspace under control, for planning other flying lanes 700, etc. The feedback can include speed, altitude, heading, etc. as well as other pertinent data such as location (e.g., GPS, etc.), temperature, humidity, the wind, and any detected obstructions during takeoff. The detected obstructions can be managed by the air traffic control system 300 as described herein, i.e., temporary obstructions, permanent obstructions, etc.

Once airborne, the UAV is en route to the destination and the air traffic control system 300 is configured to communicate with the air traffic control system 300 for providing feedback from the UAV 50 to the air traffic control system 300. Similar to takeoff, the communication can include the same feedback. Also, the communication can include an update to the flying lane 700 based on current conditions, changes, etc. A key aspect is the UAV 50 is continually in data communication with the air traffic control system 300 via the networks 302, 304.

As the destination is approached, the air traffic control system 300 can authorize/instruct the UAV 50 to begin the descent. Alternatively, the air traffic control system 300 can pre-authorize based on reaching a set point. Similar to takeoff and en route, the communication in the descent can include the same feedback. The feedback can also include information about the landing spot as well as processing by the air traffic control system 300 to change any aspects of the landing based on the feedback. Note, the landing can include a physical landing or hovering and releasing cargo.

In various embodiments, the air traffic control system 300 is expected to operate autonomously or semi-autonomously, i.e., there is not a live human operator monitoring each UAV 50 flight. This is an important distinction between conventional air traffic control for aircraft and the air traffic control system 300 for UAVs 50. Specifically, it would not be feasible to manage UAVs 50 with live operators. Accordingly, the air traffic control system 300 is configured to communicate and manage during all flight phases with a large quantity of UAVs 50 concurrently in an automated manner.

In an embodiment, the objective of the flying lane management through the air traffic control system 300 is to manage deliveries efficiently while secondarily to ensure collision avoidance. Again, this aspect is different from conventional air traffic control, which focuses first and foremost of collision avoidance. This is not to say that collision avoidance is minimized, but rather it is less important since the UAVs 50 can themselves maintain a buffer from one another based on the in-flight detection. To achieve the management, the air traffic control system 300 can implement various routing techniques to allows the UAVs 50 to use associated flying lanes 700 to arrive and deliver packages. Thus, one aspect of flying lane management, especially for delivery applications, is efficiency since efficient routing can save time, fuel, etc. which is key for deliveries.

Figure 12:
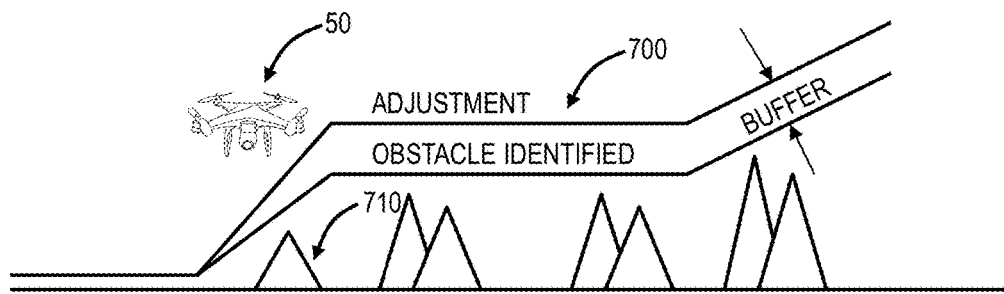
FIG. 12 is a diagram of obstruction detection by the UAV and associated changes to the flying lane.

FIG. 12 is a diagram of obstruction detection by the UAV 50 and associated changes to the flying lane 700. One aspect of flying lane management is detected by obstruction management. Here, the UAV 50 has taken off, have the flying lane 700, and is in communication with the air traffic control system 300. During the flight, either the UAV 50 detects an obstacle 710 or the air traffic control system 300 is notified from another source of the obstacle 710 and alerts the UAV 50. Again, the UAVs 50 are flying at lower altitudes, and the obstacle 710 can be virtually anything that is temporary such as a crane, a vehicle, etc. or that is permanent such as a building, tree, etc. The UAV 50 is configured, with assistance and control from the air traffic control system 300 to adjust the flying lane 700 to overcome the obstacle 710 as well as add a buffer amount, such as 35 feet or any other amount for safety.

Figure 13:
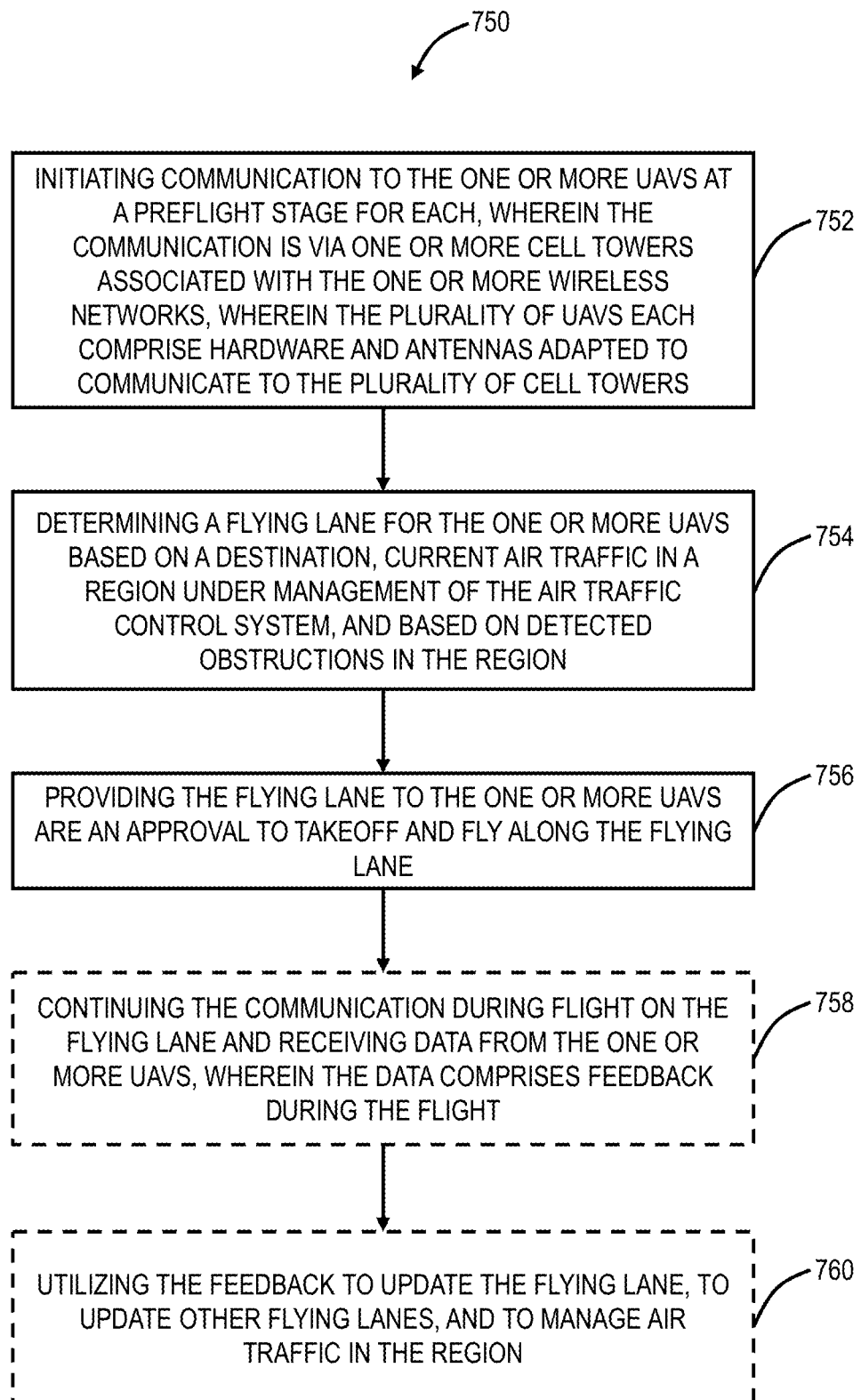
FIG. 13 is a flowchart of a flying lane management method via an air traffic control system communicatively coupled to a UAV via one or more wireless networks.

FIG. 13 is a flowchart of a flying lane management method 750 via an air traffic control system communicatively coupled to a UAV via one or more wireless networks. In an embodiment, the flying lane management method 750 includes initiating communication to the one or more UAVs at a preflight stage for each, wherein the communication is via one or more cell towers associated with the one or more wireless networks, wherein the plurality of UAVs each include hardware and antennas adapted to communicate to the plurality of cell towers (step 752); determining a flying lane for the one or more UAVs based on a destination, current air traffic in a region under management of the air traffic control system, and based on detected obstructions in the region (step 754); and providing the flying lane to the one or more UAVs are an approval to take off and fly along the flying lane (step 756). The flying lane management method 750 can further include continuing the communication during flight on the flying lane and receiving data from the one or more UAVs, wherein the data includes feedback during the flight (step 758); and utilizing the feedback to update the flying lane, to update other flying lanes, and to manage air traffic in the region (step 760). During the flight, the feedback includes speed, altitude, and heading, and the feedback can further include one or more of temperature, humidity, wind, and detected obstructions.

The flying lane management method 750 can further include providing updates to the flying lane based on the feedback and based on feedback from other devices. The flying lane management method 750 can further include, based on the feedback, determining the one or more UAVs at ready to descend or fly to the destination and providing authorization to the one or more UAVs for a descent. The flying lane management method 750 can further include, based on the feedback, detecting a new obstruction; and one of updating the flying lane based on adjustments made by the one or more UAVs due to the new obstruction and providing an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

In another embodiment, an air traffic control system communicatively coupled to one or more Unmanned Aerial Vehicles (UAVs) via one or more wireless networks adapted to perform flying lane management includes a network interface and one or more processors communicatively coupled to one another; and memory storing instructions that, when executed, cause the one or more processors to: initiate communication to the one or more UAVs at a preflight stage for each, wherein the communication is via one or more cell towers associated with the one or more wireless networks, wherein the plurality of UAVs each include hardware and antennas adapted to communicate to the plurality of cell towers; determine a flying lane for the one or more UAVs based on a destination, current air traffic in a region under management of the air traffic control system, and based on detected obstructions in the region; and provide the flying lane to the one or more UAVs are an approval to take off and fly along the flying lane. The instructions, when executed, can further cause the one or more processors to: continue the communication during flight on the flying lane and receiving data from the one or more UAVs, wherein the data include feedback during the flight; and utilize the feedback to update the flying lane, to update other flying lanes, and to manage air traffic in the region.

During the flight, the feedback includes speed, altitude, and heading, and the feedback can further include one or more of temperature, humidity, wind, and detected obstructions. The instructions, when executed, can further cause the one or more processors to: provide updates to the flying lane based on the feedback and based on feedback from other devices. The instructions, when executed, can further cause the one or more processors to based on the feedback, determine the one or more UAVs at ready to descend or fly to the destination and providing authorization to the one or more UAVs for a descent. The instructions, when executed, can further cause the one or more processors to based on the feedback, detect a new obstruction; and one of update the flying lane based on adjustments made by the one or more UAVs due to the new obstruction and provide an updated flying lane due to the new obstruction. The adjustments and/or the updated flying lane can include a buffer distance from the new obstruction. The new obstruction can be detected by the one or more UAVs based on hardware thereon and communicated to the air traffic control system. The air traffic control system can be adapted to operate autonomously.

Air Traffic Control Monitoring Systems and Methods

Figure 14:
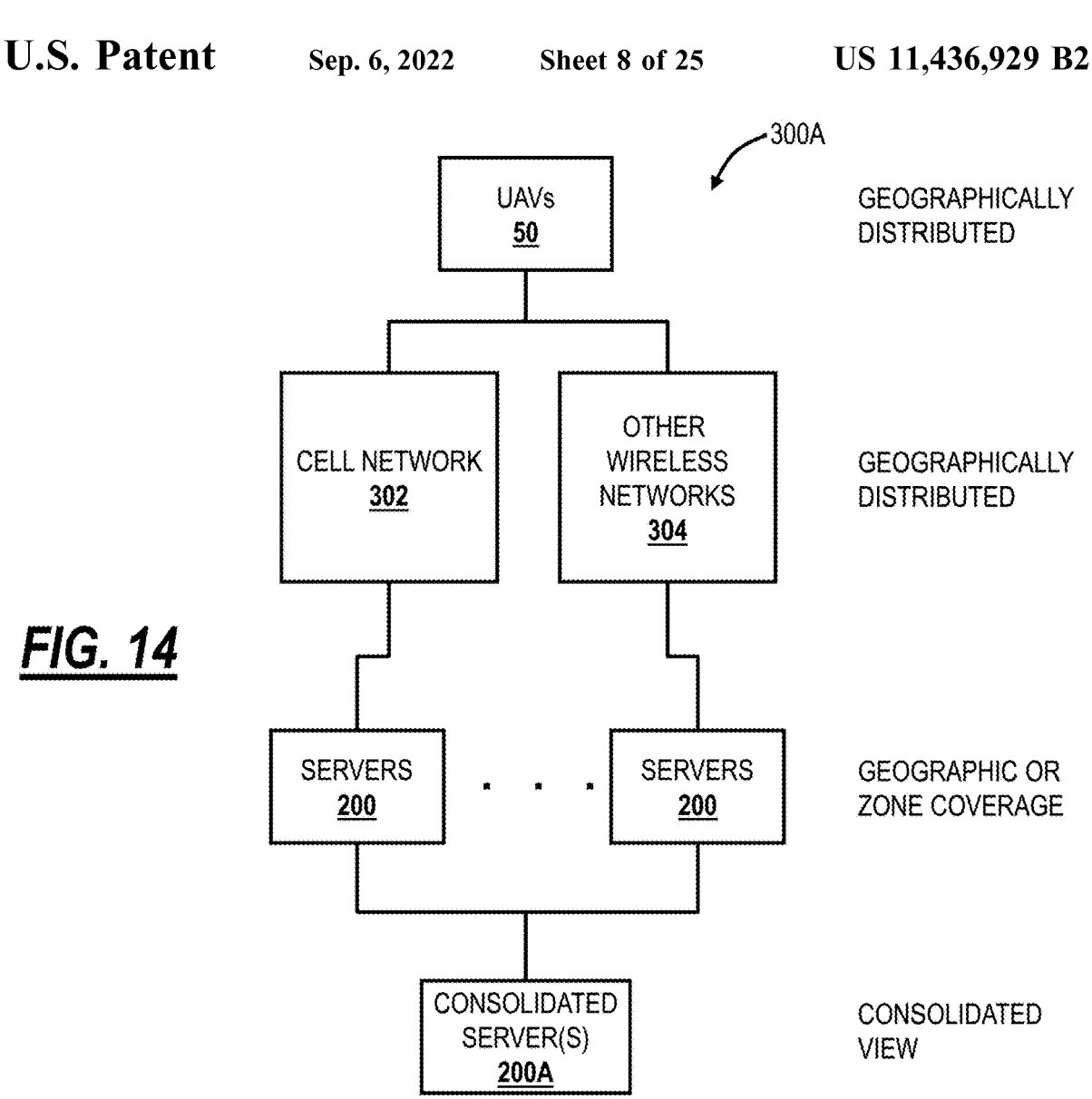
FIG. 14 is a block diagram of functional components of a consolidated UAV air traffic control monitoring system.

FIG. 14 is a block diagram of functional components of a consolidated UAV air traffic control monitoring system 300A. The monitoring system 300A is similar to the UAV air traffic control system 300 described herein. Specifically, the monitoring system 300A includes the cell network 302 (or multiple cell networks 302) as well as the other wireless networks 304. The one or more servers 200 are communicatively coupled to the networks 302, 304 in a similar manner as in the UAV air traffic control system 300 as well as the UAVs 50 communication with the servers 200. Additionally, the monitoring system 300A includes one or more consolidated servers 200A, which are communicatively coupled to the servers 200.

The consolidated servers 200A are configured to obtain a consolidated view of all of the UAVs 50. Specifically, the UAVs 50 are geographically distributed as are the networks 302, 304. The servers 200 provide geographic or zone coverage. For example, the servers 200 may be segmented along geographic boundaries, such as different cities, states, etc. The consolidated servers 200A are configured to provide a view of all of the servers 200 and their associated geographic or zone coverage. Specifically, the consolidated servers 200A can be located in a national Air Traffic Control center. From the consolidated servers 200A, any air traffic control functions can be accomplished for the UAVs 50. The consolidated servers 200A can aggregate data on all of the UAVs 50 based on multiple sources, i.e., the servers 200, and from multiple networks 302, 304.

Thus, from the consolidated servers 200A, UAV traffic can be managed from a single point. The consolidated servers 200A can perform any of the air traffic control functions that the servers 200 can perform. For example, the consolidated servers 200A can be used to eliminate accidents, minimize delay and congestion, etc. The consolidate servers 200A can handle connectivity with hundreds or thousands of the servers 200 to manage millions or multiple millions of UAVs 50. Additionally, the consolidated servers 200A can provide an efficient Graphical User Interface (GUI) for air traffic control.

Figure 15:
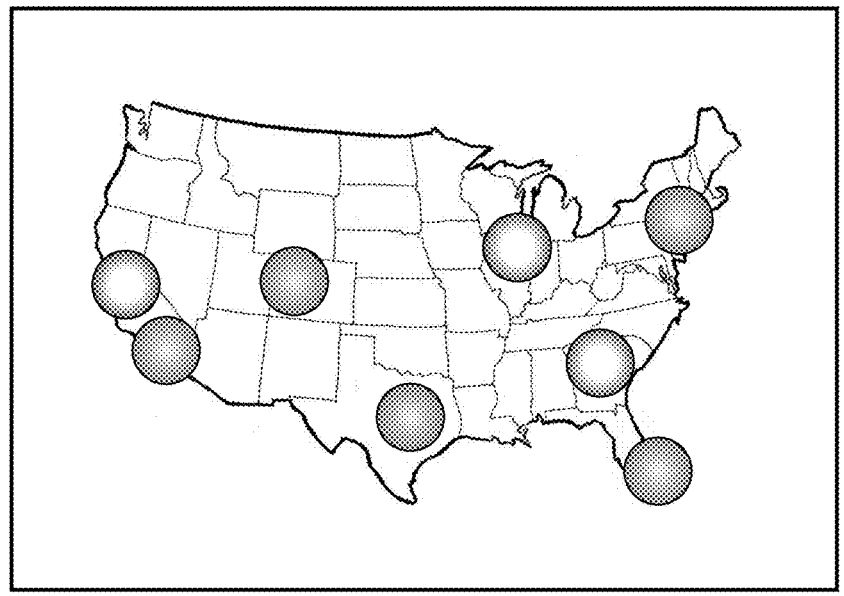
FIG. 15 is a screenshot of a Graphical User Interface (GUI) providing a view of the consolidated UAV air traffic control monitoring system.

FIG. 15 is a screenshot of a Graphical User Interface (GUI) providing a view of the consolidated UAV air traffic control monitoring system. Specifically, the GUI can be provided by the consolidated servers 200A to provide visualization, monitoring, and control of the UAVs 50 across a wide geography, e.g., state, region, or national. In FIG. 15, the GUI provides a map visualization at the national level, consolidating views from multiple servers 200. Various circles are illustrated with shading, gradients, etc. to convey information such as congestion in a local region.

A user can drill-down such as by clicking any of the circles or selecting any geographic region to zoom in. The present disclosure contemplates zooming between the national level down to local or even street levels to view individual UAVs 50. The key aspect of the GUI is the information display is catered to the level of UAV 50 traffic. For example, at the national level, it is not possible to display every UAV 50 since there are orders of magnitude more UAVs 50 than airplanes. Thus, at higher geographic levels, the GUI can provide a heat map or the like to convey levels of UAV 50 congestion. As the user drills-down to local geographies, individual UAVs 50 can be displayed.

Using the GUI, the consolidated servers 200A, and the servers 200, various air traffic control functions can be performed. One aspect is that control can be high-level (coarse) through individual-level (fine) as well as in-between. That is, control can be at a large geographic level (e.g., city or state), at a local level (city or smaller), and at an individual UAV 50 level. The high-level control can be performed via single commands through the consolidated server 200A that is propagated down to the servers 200 and to the UAVs 50. Examples of high-level control include no-fly zones, congestion control, traffic management, holding patterns, and the like. Examples of individual-level control include flight plan management; separation assurance; real-time control; monitoring of speed, altitude, location, and direction; weather and obstacle reporting; landing services; and the like.

In addition to the communication from the consolidated servers 200A to the UAVs 50, such as through the servers 200, for air traffic control functions, there can be two-way communication as well. In an embodiment, the UAVs 50 are configured to provide a first set of data to the servers 200, such as speed, altitude, location, direction, weather, and obstacle reporting. The servers 200 are configured to provide a second set of data to the consolidated servers 200A, such as a summary or digest of the first data. This hierarchical data handling enables the consolidated servers 200A to handle nationwide control of millions of UAVs 50.

For example, when there is a view at the national level, the consolidated servers 200A can provide summary information for regions, such as illustrated in FIG. 15. This is based on the second set of data which can provide a summary view of the GUI, such as how many UAVs 50 are in a region. When there is a drill-down to a local level, the consolidated servers 200A can obtain more information from the servers, i.e., the first set of data, allowing the consolidated servers 200A to act in a similar manner as the servers 200 for local control.

Figure 16:
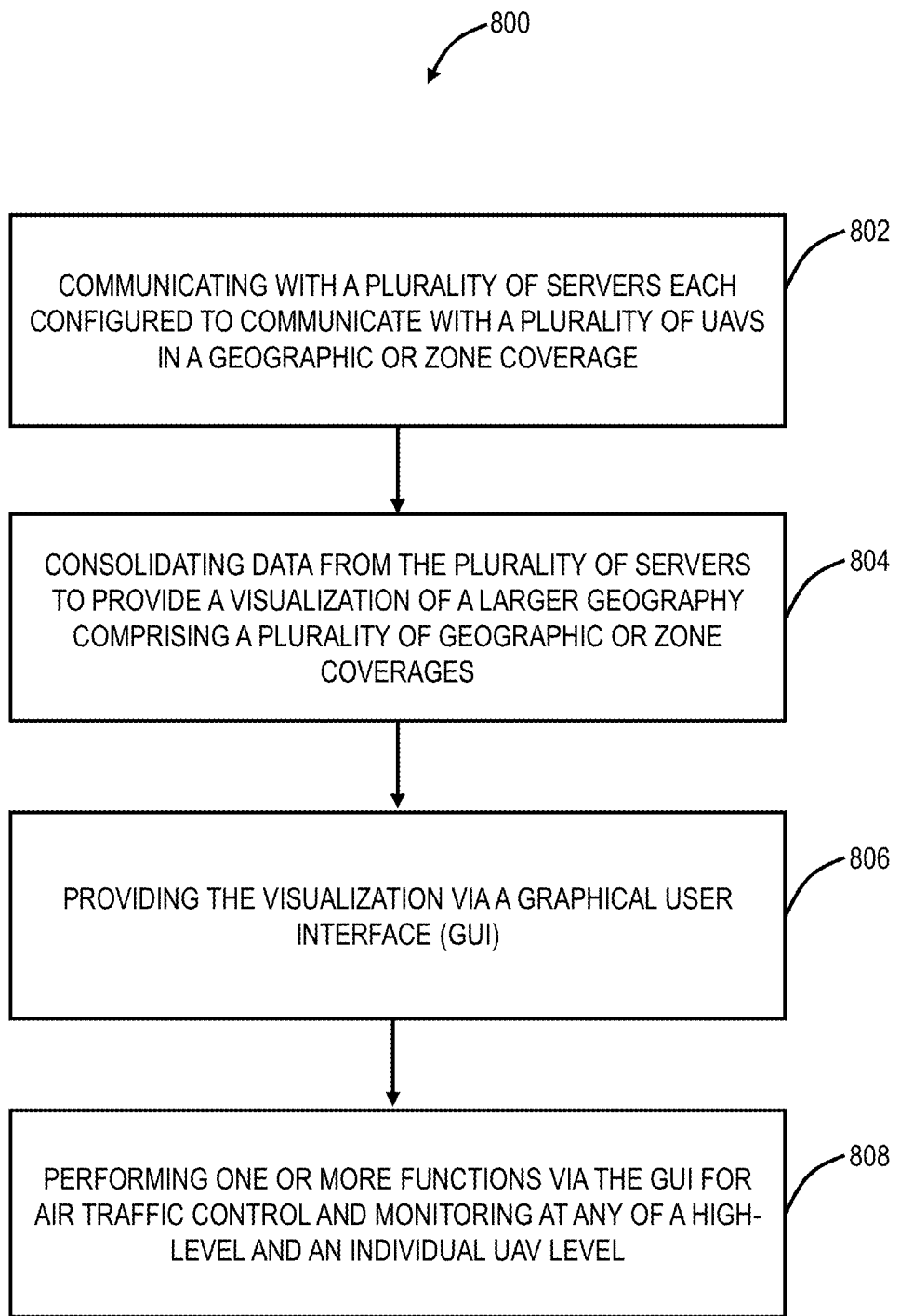
FIG. 16 is a flowchart of a UAV air traffic control and monitor method.

FIG. 16 is a flowchart of a UAV air traffic control and monitor method 800. The method 800 includes communicating with a plurality of servers each configured to communicate with a plurality of UAVs in a geographic or zone coverage (step 802); consolidating data from the plurality of servers to provide a visualization of a larger geography comprising a plurality of geographic or zone coverages (step 804); providing the visualization via a Graphical User Interface (GUI) (step 806); and performing one or more functions via the GUI for air traffic control and monitoring at any of a high-level and an individual UAV level (step 808). The visualization can include a heat map of congestion at the larger geography and a view of individual UAVs via a drill-down. For the individual UAV level, the consolidating the data can include obtaining a first set of data and, for the high-level, the consolidating the data can include obtaining a second set of data which is a summary or digest of the first set of data. The first set of data can include speed, altitude, location, direction, weather, and obstacle reporting from individual UAVs.

For the individual UAV level, the air traffic control and monitoring can include any of flight plan management; separation assurance; real-time control; monitoring of speed, altitude, location, and direction; weather and obstacle reporting; landing services, and wherein, for the high-level, the air traffic control and monitoring can include any of no-fly zones, congestion control, traffic management, and hold patterns. The plurality of UAVs can be configured to constrain flight based on coverage of a plurality of cell towers, wherein the constrained flight can include one or more of pre-configuring the plurality of UAVs to operate only where the coverage exists, monitoring cell signal strength by the plurality of UAVs and adjusting flight based therein, and a combination thereof. One or more of the plurality of UAVs are configured for autonomous operation through the air traffic control. The plurality of UAVs each can include circuitry adapted to communicate via a plurality of cellular networks to the plurality of servers. The plurality of cellular networks can include a first wireless network and a second wireless network each provide bi-directional communication between the UAV and the plurality of servers for redundancy with one of the first wireless network and the second wireless network operating as primary and another as a backup.

In another embodiment, an Unmanned Aerial Vehicle (UAV) air traffic control and monitoring system includes a network interface and one or more processors communicatively coupled to one another; and memory storing instructions that, when executed, cause the one or more processors to: communicate with a plurality of servers each configured to communicate with a plurality of UAVs in a geographic or zone coverage; consolidate data from the plurality of servers to provide a visualization of a larger geography comprising a plurality of geographic or zone coverages; provide the visualization via a Graphical User Interface (GUI); and perform one or more functions via the GUI for air traffic control and monitoring at any of a high-level and an individual UAV level.

In a further embodiment, a non-transitory computer-readable medium includes instructions that, when executed, cause one or more processors to perform steps of: communicating with a plurality of servers each configured to communicate with a plurality of UAVs in a geographic or zone coverage; consolidating data from the plurality of servers to provide a visualization of a larger geography comprising a plurality of geographic or zone coverages; providing the visualization via a Graphical User Interface (GUI); and performing one or more functions via the GUI for air traffic control and monitoring at any of a high-level and an individual UAV level.

Obstruction Detection, Identification, and Management Systems and Methods

Figure 17:
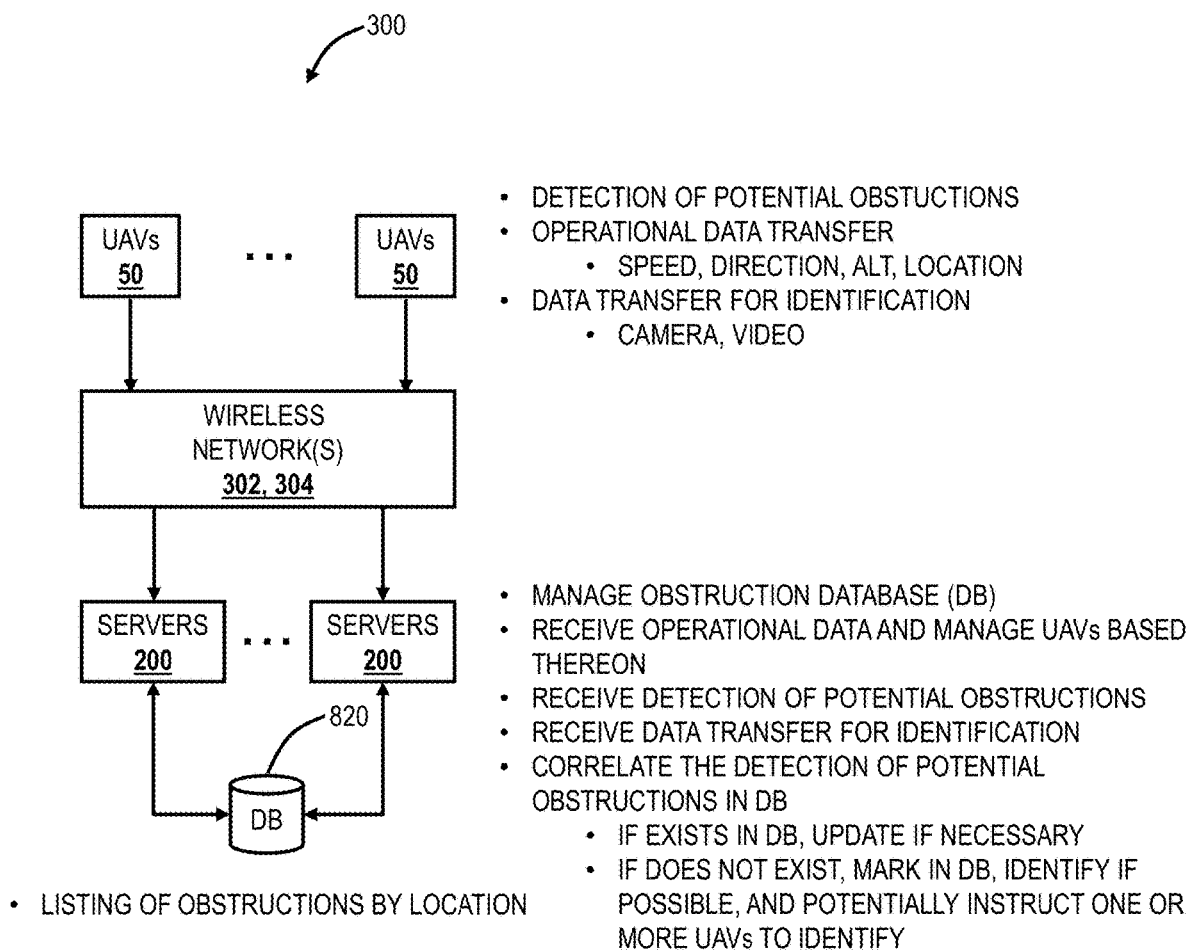
FIGS. 17 and 18 are block diagrams of the UAV air traffic control system describing functionality associated with obstruction detection, identification, and management with FIG. 17 describing data transfer from the UAVs to the servers and FIG. 18 describing data transfer to the UAVs from the servers.
Figure 18:
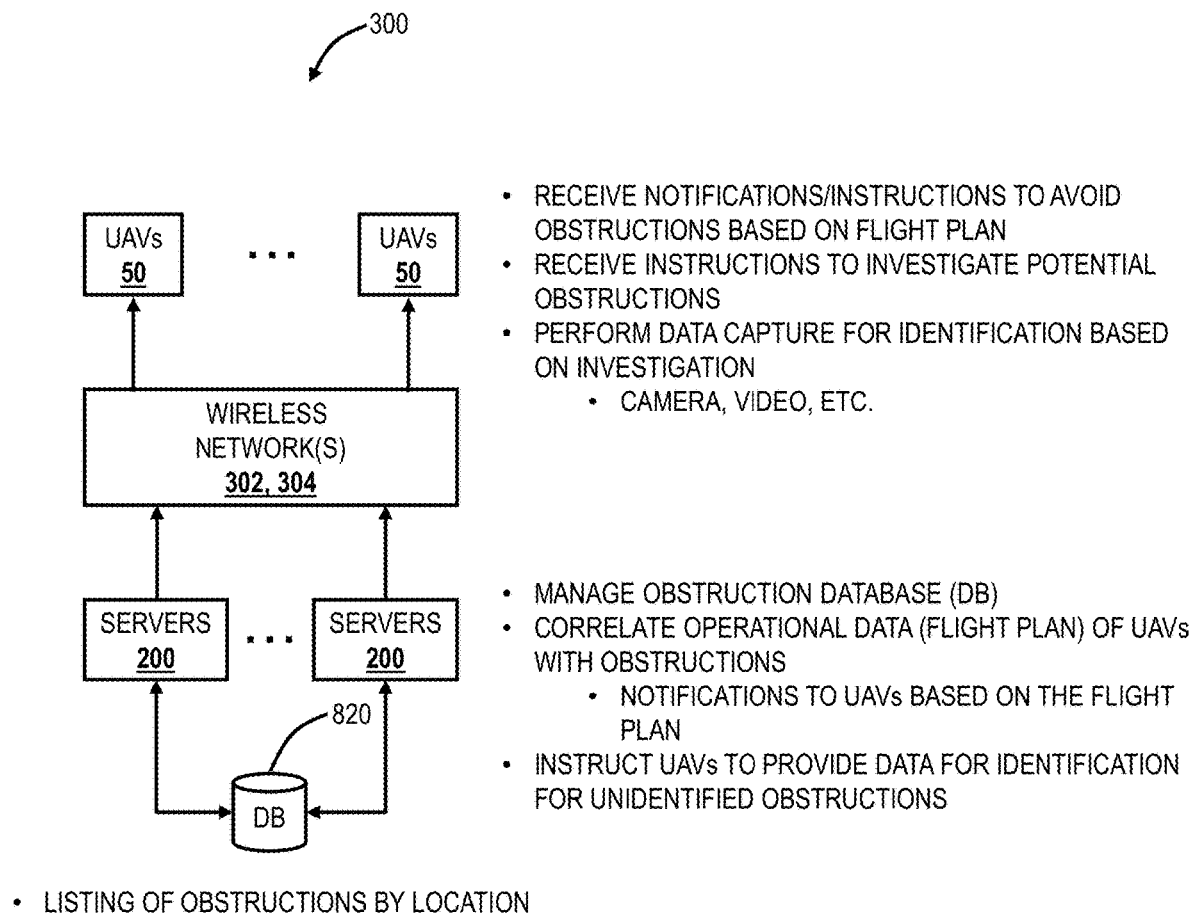

FIGS. 17 and 18 are block diagrams of the UAV air traffic control system 300 describing functionality associated with obstruction detection, identification, and management with FIG. 17 describing data transfer from the UAVs 50 to the servers 200 and FIG. 18 describing data transfer to the UAVs 50 from the servers 200. As described herein, obstructions include, without limitation, other UAVs 50 based on their flight plan and objects at or near the ground at a height above ground of several hundred feet. Again, the UAVs 50 typically fly at low altitudes such as 100'-500' and obstruction management is important based on this low level of flight.

The obstructions can be stored and managed in an obstruction database (DB) 820 communicatively coupled to the servers 200 and part of the UAV air traffic control system 300. Obstructions can be temporary or permanent and managed accordingly. Thus, the DB 820 can include an entry for each obstruction with location (e.g., GPS coordinates), size (height), and permanence. Temporary obstructions can be ones that are transient in nature, such as a scaffold, construction equipment, other UAVs 50 in flight, etc. Permanent obstructions can be buildings, power lines, cell towers, geographic (mountains), etc. For the permanence, each entry in the DB 820 can either be marked as permanent or temporary with a Time to Remove (TTR). The TTR can be how long the entry remains in the DB 820. The permanence is determined by the servers 200 as described herein.

The obstruction detection, identification, and management are performed in the context of the UAV air traffic control system 300 described herein with communication between the UAVs 50 and the servers 200 via the wireless networks 302, 304. FIGS. 17 and 18 illustrate functionality in the UAV air traffic control system 300 with FIGS. 17 and 18 separate to show different data flow and processing.

In FIG. 17, the UAVs 50 communicates to the servers 200 through the wireless networks 302, 304. Again, as described herein, the UAVs 50 have advanced data capture capabilities, such as video, photos, location coordinates, altitude, speed, wind, temperature, etc. Additionally, some UAVs 50 can be equipped with radar to provide radar data surveying proximate landscape. Collectively, the data capture is performed by data capture equipment associated with the UAVs 50.

Through the data capture equipment, the UAVs 50 are adapted to detect potential obstructions and detect operational data (speed, direction, altitude, heading, location, etc.). Based on one or more connections to the wireless networks 302, 304, the UAVs 50 are adapted to transfer the operational data to the servers 200. Note, the UAV 50 can be configured to do some local processing and transmit summaries of the operational data to reduce the transmission load on the wireless networks 302, 304. For example, for speed, heading, etc., the UAVs 50 can transmit delta information such that the servers 200 can track the flight plan. Note, the transmission of the operational data is performed throughout the flight such that the servers 200 can manage and control the UAVs 50.

For obstructions, the UAVs 50 can capture identification data, photos, video, etc. In an embodiment, the UAVs 50 are provided advanced notification of obstructions (in FIG. 18) and capable of local data processing of the identification data to verify the obstructions. If the local data processing determines an obstruction is already known, i.e., provided in a notification from the servers 200, the UAV 50 does not require any further processing or data transfer of the identification data, i.e., this obstruction is already detected. On the other hand, if the UAV 50 detects a potential obstruction, i.e., one that it has not been notified of, based on the local data processing, the UAV 50 can perform data transfer of the identification data to the servers 200.

The servers 200 are configured to manage the obstruction DB 820, namely to update the entries therein. The servers 200 are configured to receive operational data from the UAVs 50 under control for management thereof. Specifically, the servers 200 are configured to manage the flight plans of the UAVs 50, and, in particular with respect to obstructions, for advanced notification of future obstructions in the flight plan.

The servers 200 are configured to receive the detection of potential obstructions. The UAVs 50 can either simply notify the servers 200 of a potential obstruction as well as provide the identification data for the servers 200 to perform identification and analysis. Upon receipt of any data from the UAVs 50 related to obstructions (a mere notification, actual photos, etc.), the servers 200 are configured to correlate this data with the DB 820. If the data correlates to an entry that exists in the DB 820, the servers 200 can update the entry if necessary, e.g., update any information related to the obstruction such as last seen date.

If the servers 200 detect the potential obstruction does not exist in the DB 820, the servers 200 are configured to add an entry in the DB 820, perform identification if possible from the identification data, and potentially instruct a UAV 50 to identify in the future. For example, if the servers 200 can identify the potential obstruction from the identification data, the servers 200 can create the DB 820 entry and populate it with the identified data. The servers 200 can analyze the identification data, as well as request human review, using pattern recognition to identify what the obstruction is, what its characteristics are (height, size, permanency, etc.).

If the servers 200 do not have enough identification data, the servers 200 can instruct the identifying UAV 50 or another UAV 50 in proximity in the future to obtain specific identification data for the purposes of identification.

In FIG. 18, the servers 200 continue to manage the DB 820, both for populating/managing entries as well as to provide notifications of obstructions in the flight plans of each of the UAVs 50. Specifically, the servers 200 are configured to keep track of the flight plans of all of the UAVs 50 under its control. As part of this tracking, the servers 200 are configured to correlate the operational data to derive the flight plan and to determine any obstructions from the DB 820 in the flight plan. The servers 200 are configured to provide notifications and/or instructions to the UAVs 50 based on upcoming obstructions.

Additionally, the servers 200 are configured to provide instructions to UAVs 50 to capture identification data for potential obstructions that are not yet identified. Specifically, the servers 200 can instruct the UAVs 50 on what exact data to obtain, e.g., pictures, video, etc., and from what angle, elevation, direction, location, etc. With the identification data, the servers 200 can perform various processes to pattern match the pictures with known objects for identification. In case an obstruction is not matched, it can be flagged for human review. Also, the human review can be performed based on successful matches to grade the performance and to improve pattern matching techniques further. Identification of the obstruction is important for permanency determinations. For example, a new high-rise building is permanent, whereas a construction crane is temporary.

For the TTR, temporary obstructions are automatically removed in the DB 820 based on this entry. In an embodiment, the TTR can be a flag with a specified time. In another embodiment, the TTR can be a flag which requires removal if the next UAV 50 passing near the obstruction fails to detect and report it.

Figure 19:
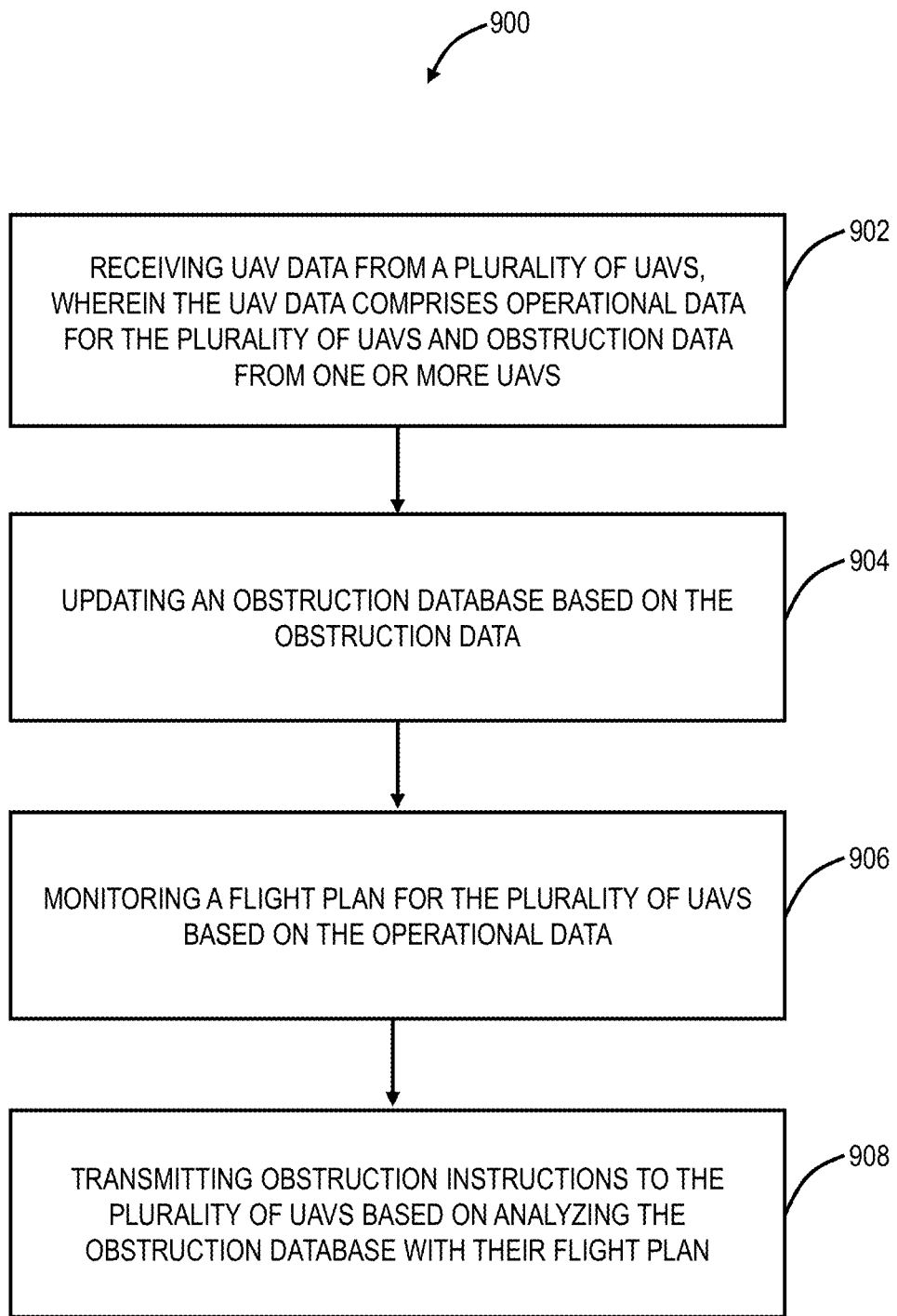
FIG. 19 is a flowchart of an obstruction detection and management method implemented through the UAV air traffic control system for the UAVs.

FIG. 19 is a flowchart of an obstruction detection and management method 900 implemented through the UAV air traffic control system 300 for the UAVs 50. The obstruction detection and management method 900 includes receiving UAV data from a plurality of UAVs, wherein the UAV data comprises operational data for the plurality of UAVs and obstruction data from one or more UAVs (step 902); updating an obstruction database based on the obstruction data (step 904); monitoring a flight plan for the plurality of UAVs based on the operational data (step 906); and transmitting obstruction instructions to the plurality of UAVs based on analyzing the obstruction database with their flight plan (step 908).

The obstruction data can include an indication of a potential obstruction which was not provided to a UAV in the obstruction instructions. The obstruction data can include a confirmation of an obstruction based on the obstruction instructions, and wherein the updating can include noting any changes in the obstruction based on the confirmation. The obstruction instructions can include a request to a UAV to perform data capture of a potential obstruction, wherein the obstruction data can include photos and/or video of the potential obstruction, and wherein the updating can include identifying the potential obstruction based on the obstruction data.

The obstruction database can include entries of obstructions with their height, size, location, and a permanency flag comprising either a temporary obstruction or a permanent obstruction. The permanency flag can include a Time To Remove (TTR) for the temporary obstruction which is a flag with a specified time or a flag which requires removal if the next UAV passing near the temporary obstruction fails to detect and report it. The operational data can include a plurality of speed, location, heading, and altitude, and wherein the flight plan is determined from the operational data. The plurality of UAVs fly under about 1000'.

In another embodiment, an Unmanned Aerial Vehicle (UAV) air traffic control and monitoring system for obstruction detection and management includes a network interface and one or more processors communicatively coupled to one another; and memory storing instructions that, when executed, cause the one or more processors to receive UAV data from a plurality of UAVs, wherein the UAV data includes operational data for the plurality of UAVs and obstruction data from one or more UAVs; update an obstruction database based on the obstruction data; monitor a flight plan for the plurality of UAVs based on the operational data; and transmit obstruction instructions to the plurality of UAVs based on analyzing the obstruction database with their flight plan.

A non-transitory computer-readable medium comprising instructions that, when executed, cause one or more processors to perform steps of: receiving Unmanned Aerial Vehicle (UAV) data from a plurality of UAVs, wherein the UAV data includes operational data for the plurality of UAVs and obstruction data from one or more UAVs; updating an obstruction database based on the obstruction data; monitoring a flight plan for the plurality of UAVs based on the operational data; and transmitting obstruction instructions to the plurality of UAVs based on analyzing the obstruction database with their flight plan.

Managing Detected Static Obstructions

Figure 20:
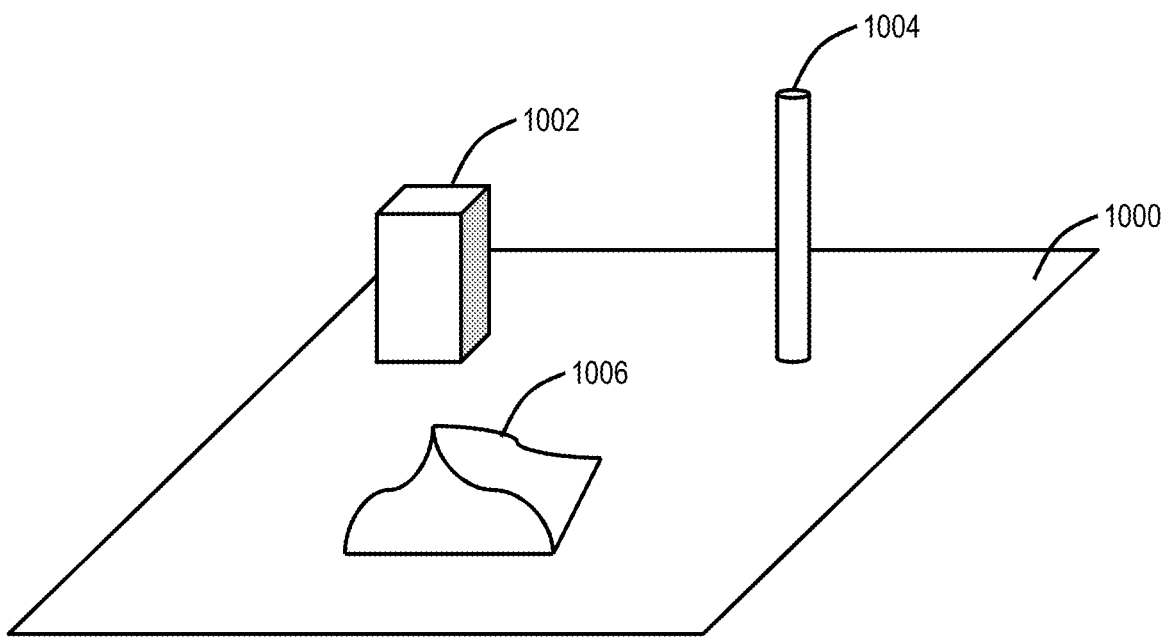
FIG. 20 is a diagram of geographical terrain with static obstructions.

FIG. 20 is a diagram of geographical terrain 1000 with static obstructions 1002, 1004, 1006. As described herein, static obstructions are at or near the ground and can be temporary or permanent. Again, since the UAVs 50 fly much lower than conventional aircraft, these obstructions need to be managed and communicated to the UAVs 50. A dynamic obstruction can include moving objects such as other UAVs 50, vehicles on the ground, etc. Management of dynamic obstructions besides other UAVs 50 is difficult in the UAV air traffic control system 300 due to their transient nature. In an embodiment, the UAVs 50 themselves can include local techniques to avoid detected dynamic obstructions. The UAV air traffic control system 300 can be used to ensure all controlled UAVs 50 know about and avoid other proximate UAVs 50. Static obstructions, on the other hand, can be efficiently managed and avoided through the UAV air traffic control system 300. The UAV air traffic control system 300 can be used to detect the static obstructions through a combination of crowd-sourcing data collection by the UAVs 50, use of external databases (mapping programs, satellite imagery, etc.), and the like. The UAV air traffic control system 300 can also be used to communicate the detected static obstructions to proximate UAVs 50 for avoidance thereof.

Non-limiting examples of static obstructions which are permanent include buildings, mountains, cell towers, utility lines, bridges, etc. Non-limiting examples of static obstructions which are temporary include tents, parked utility vehicles, etc. From the UAV air traffic control system 300, these temporary and permanent static obstructions can be managed the same with the temporary obstructions having a Time To Remove (TTR) parameter which can remove it from the database 820.

The static obstructions can take various forms with different sizes, heights, etc. The static obstruction 1002 is substantially rectangular, e.g., a building or the like. The static obstruction 1004 can be substantially cylindrical, e.g., a cell tower, pole, or the like. The static obstruction 1006 can be irregularly shaped, e.g., a mountain, building, or the like.

Figure 21:
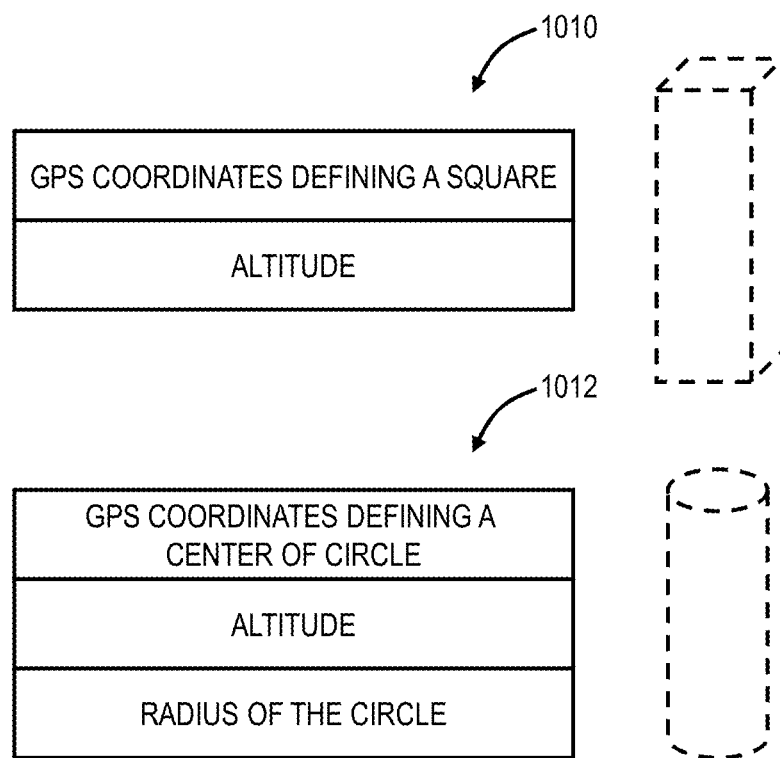
FIG. 21 is diagrams of data structures which can be used to define the exact location of any of the static obstructions.

FIG. 21 is a diagram of data structures 1010, 1012 which can be used to define the exact location of any of the static obstructions 1002, 1004, 1006. The UAV air traffic control system 300 can use these data structures 1010, 1012 to store information in the database 820 regarding the associated static obstructions 1002, 1004, 1006. In an embodiment, the UAV air traffic control system 300 can use one or both of these data structures 1010, 1012 to define a location of the static obstructions 1002, 1004, 1006. This location can be a no-fly zone, i.e., avoided by the UAVs 50. The UAV air traffic control system 300 can use the data structure 1010 for the static obstruction 1002, 1006 and the data structure 1012 for the static obstruction 1004. In this manner, the UAVs 50 can know exactly where the static obstructions 1002, 1004, 1006 are located and fly accordingly.

The data structures 1010, 1012 can be managed by the UAV air traffic control system 300 based on data collection by the UAVs 50 and/or other sources. The data structures 1010, 1012 can be stored in the database 820 along with the TTR parameter for temporary or permanent.

To populate and manage the data structures 1010, 1012, i.e., to identify, characterize, and verify, the UAV air traffic control system 300 communicates with the UAVs 50 and/or with external sources. For the UAVs 50, the UAVs 50 can be configured to detect the static obstructions 1002, 1004, 1006; collect relevant data such as locations, pictures, etc. for populating the data structures 1010, 1012; collect the relevant data at the direction of the UAV air traffic control system 300; provide verification the static obstructions 1002, 1004, 1006 subsequent to the UAV air traffic control system 300 notifying the UAVs 50 for avoidance/verification; and the like.

In an aspect, the UAVs 50, upon detecting an unidentified static obstruction 1002, 1004, 1006, the UAVs 50 can collect the relevant data and forward to the UAV air traffic control system 300. The UAV air traffic control system 300 can then analyze the relevant data to populate the data structures 1010, 1012. If additional data is required to fully populate the data structures 1010, 1012, the UAV air traffic control system 300 can instruct another UAV 50 at or near the detected static obstruction 1002, 1004, 1006 to collect additional data. For example, assume a first UAV 50 detects the static obstruction 1002, 1004, 1006 from the east, collects the relevant data, but this is not enough for the UAV air traffic control system 300 to fully populate the data structures 1010, 1012, the UAV air traffic control system 300 can instruct a second UAV 50 to approach and collect data from the west.

The UAVs 50 with communication between the UAV air traffic control system 300 can perform real-time detection of the static obstructions 1002, 1004, 1006. Additionally, the UAV air traffic control system 300 can utilize external sources for offline detection of the static obstructions 1002, 1004, 1006. For example, the external sources can include map data, public record data, satellite imagery, and the like. The UAV air traffic control system 300 can parse and analyze this external data offline to both populate the data structures 1010, 1012 as well as very the integrity of existing data in the data structures 1010, 1012.

Once the data structures 1010, 1012 are populated in the database 820, the UAV air traffic control system 300 can use this data to coordinate flights with the UAVs 50. The UAV air traffic control system 300 can provide relevant no-fly zone data to UAVs 50 based on their location. The UAV air traffic control system 300 can also manage UAV landing zones based on this data, keeping emergency landing zones in different locations based on the static obstructions 1002, 1004, 1006; managing recharging locations in different locations based on the static obstructions 1002, 1004, 1006; and managing landing locations based on the static obstructions 1002, 1004, 1006.

Figure 22:
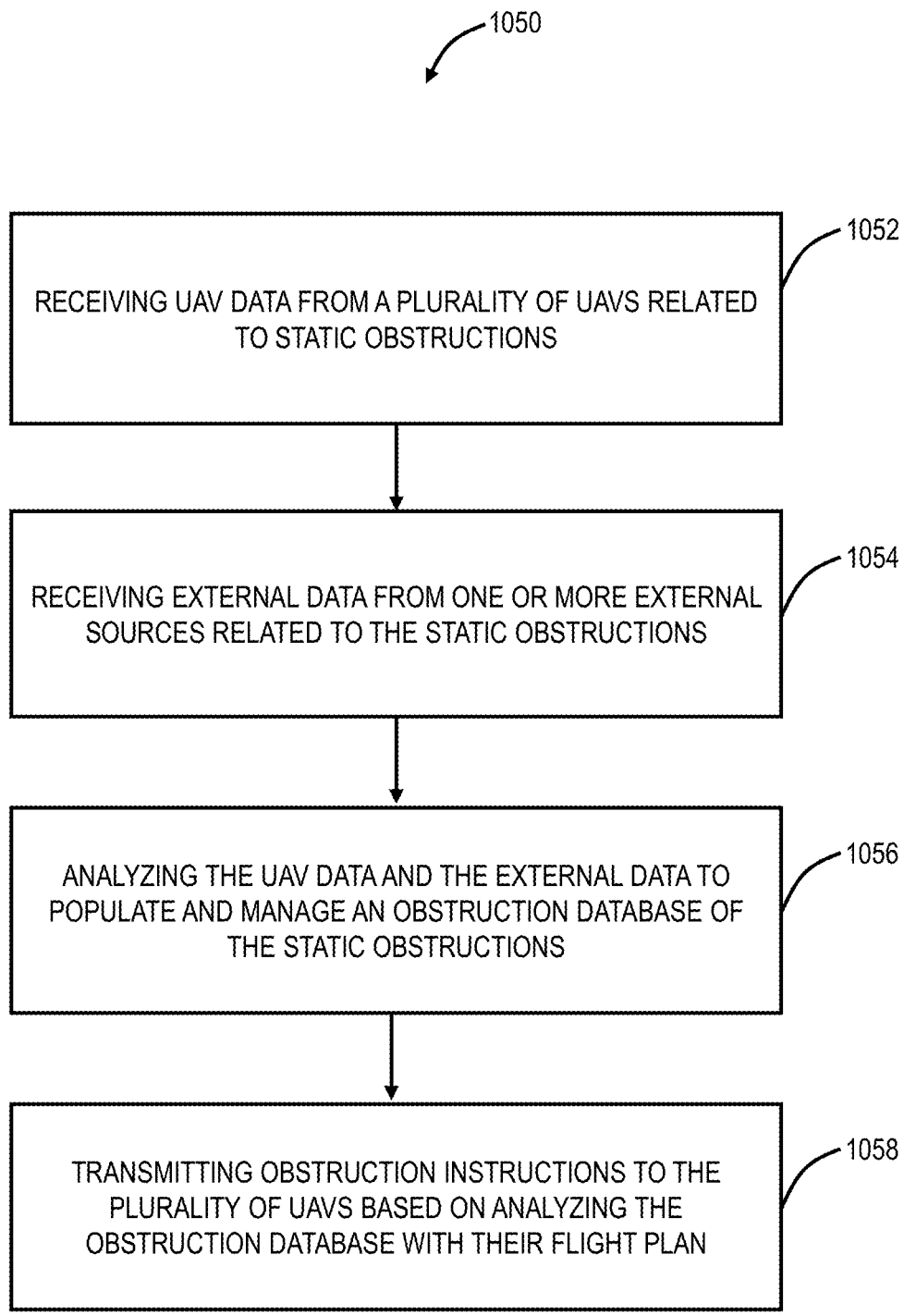
FIG. 22 is a flowchart of a static obstruction detection and management method through an Air Traffic Control (ATC) system for Unmanned Aerial Vehicles (UAVs)

FIG. 22 is a flowchart of a static obstruction detection and management method 1050 through an Air Traffic Control (ATC) system for Unmanned Aerial Vehicles (UAVs). The static obstruction detection and management method 1050 includes receiving UAV data from a plurality of UAVs related to static obstructions (step 1052); receiving external data from one or more external sources related to the static obstructions (step 1054); analyzing the UAV data and the external data to populate and manage an obstruction database of the static obstructions (step 1056); and transmitting obstruction instructions to the plurality of UAVs based on analyzing the obstruction database with their flight plan (step 1058).

The obstruction database can include a plurality of data structures, each defining a no-fly zone of location coordinates based on the analyzing. The data structures define one of a cylinder and a rectangle sized to cover an associated obstruction and with associated location coordinates. The data structures each can include a time to remove parameter defining either a temporary or a permanent obstruction. One of the UAV data and the external data can be used first to detect an obstruction and enter the obstruction in the obstruction database, and the other of the UAV data and the external data is used to verify the obstruction in the obstruction database. The static obstruction detection and management method 1050 can further include transmitting instructions to one or more UAVs to obtain additional information to populate and manage the obstruction database. The static obstruction detection and management method 1050 can further include managing one or more of emergency landing locations, recharging locations, and landing locations for the plurality of UAVs based on the obstruction database. The plurality of UAVs fly under about 1000' and the obstructions are based thereon.

UAV Configuration

Figure 23:
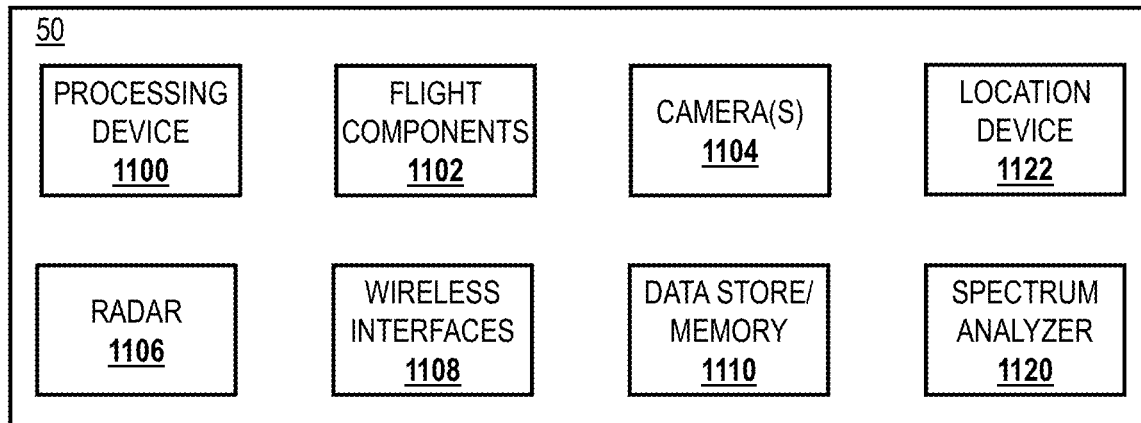
FIG. 23 is a block diagram of functional components implemented in physical components in the UAV for use with the air traffic control system, such as for dynamic and static obstruction detection.

FIG. 23 is a block diagram of functional components implemented in physical components in the UAV 50 for use with the air traffic control system 300, such as for dynamic and static obstruction detection. This embodiment in FIG. 23 can be used with any of the UAV 50 embodiments described herein. The UAV 50 can include a processing device 1100, flight components 1102, cameras 1104, radar 1106, wireless interfaces 1108, a data store/memory 1110, a spectrum analyzer 1120, and a location device 1122. These components can be integrated with, disposed on, associated with the body 82 of the UAV 50. The processing device 1100 can be similar to the mobile device 100 or the processor 102. Generally, the processing device 1100 can be configured to control operations of the flight components 1102, the cameras 1104, the radar 1106, the wireless interfaces 1108, and the data store/memory 1110.

The flight components 1102 can include the rotors 80 and the like. Generally, the flight components 1102 are configured to control the flight, i.e., speed, direction, altitude, heading, etc., of the UAV 50 responsive to control by the processing device 1100.

The cameras 1104 can be disposed on or about the body 82. The UAV 50 can include one or more cameras 1104, for example, facing different directions as well as supporting pan, tilt, zoom, etc. Generally, the cameras 1104 are configured to obtain images and video, including high definition. In an embodiment, the UAV 50 includes at least two cameras 1104 such as a front-facing and a rear-facing camera. The cameras 1104 are configured to provide the images or video to the processing device 1100 and/or the data store/memory 1110. The front-facing camera can be configured to detect obstructions in front of the UAV 50 as it flies and the rear-facing camera can be configured to obtain additional images for further characterization of the detected obstructions.

The radar 1106 can be configured to detect objects around the UAV 50 in addition to the cameras 1104, using standard radar techniques. The wireless interfaces 1108 can be similar to the wireless interfaces 106 with similar functionality. The data store/memory 1110 can be similar to the data store 108 and the memory 110. The wireless interfaces 1108 can be used to communicate with the air traffic control system 300 over one or more wireless networks as described herein.

Collectively, the components in the UAV 50 are configured to fly the UAV 50, and concurrent detect and identify obstructions during the flight. In an embodiment, the radar 1106 can detect an obstruction through the processing device 1100, the processing device 1100 can cause the cameras 1104 to obtain images or video, the processing device 1100 can cause adjustments to the flight plan accordingly, and the processing device 1100 can identify aspects of the obstruction from the images or video. In another embodiment, the camera 1104 can detect the obstruction, the processing device 1100 can cause adjustments to the flight plan accordingly, and the processing device 1100 can identify aspects of the obstruction from the images or video. In a further embodiment, the front-facing camera or the radar 1106 can detect the obstruction, the processing device 1100 can cause the rear-facing and/or the front-facing camera to obtain images or video, the processing device 1100 can cause adjustments to the flight plan accordingly, and the processing device 1100 can identify aspects of the obstruction from the images or video.

In all the embodiments, the wireless interfaces 1108 can be used to communicate information about the detected obstruction to the air traffic control system 300. This information can be based on the local processing by the processing device 1100, and the information can include, without limitation, size, location, shape, type, images, movement characteristics, etc.

For dynamic obstructions, the UAV 50 can determine movement characteristics such as from multiple images or video. The movement characteristics can include speed, direction, altitude, etc. and can be derived from analyzing the images of video over time. Based on these characteristics, the UAV 50 can locally determine how to avoid the detected dynamic obstructions.

Additionally, the air traffic control system 300 can keep track of all of the UAVs 50 under its control or management. Moving UAVs 50 are one example of dynamic obstructions. The air traffic control system 300 can notify the UAVs 50 of other UAVs 50 and the UAVs 50 can also communicate the detection of the UAVs 50 as well as other dynamic and static obstructions to the air traffic control system 300.

The spectrum analyzer 1120 is configured to measure wireless performance. The spectrum analyzer 1120 can be incorporated in the UAV 50, attached thereto, etc. The spectrum analyzer 1120 is communicatively coupled to the processing device 1100 and the location device 1122. The location device 1122 can be a Global Positioning Satellite (GPS) device or the like. Specifically, the location device 1122 is configured to determine a precise location of the UAV 50. The spectrum analyzer 1120 can be configured to detect signal bandwidth, frequency, and Radio Frequency (RF) strength. These can collectively be referred to as measurements, and they can be correlated to the location taken from the location device 1122.

Figure 24:
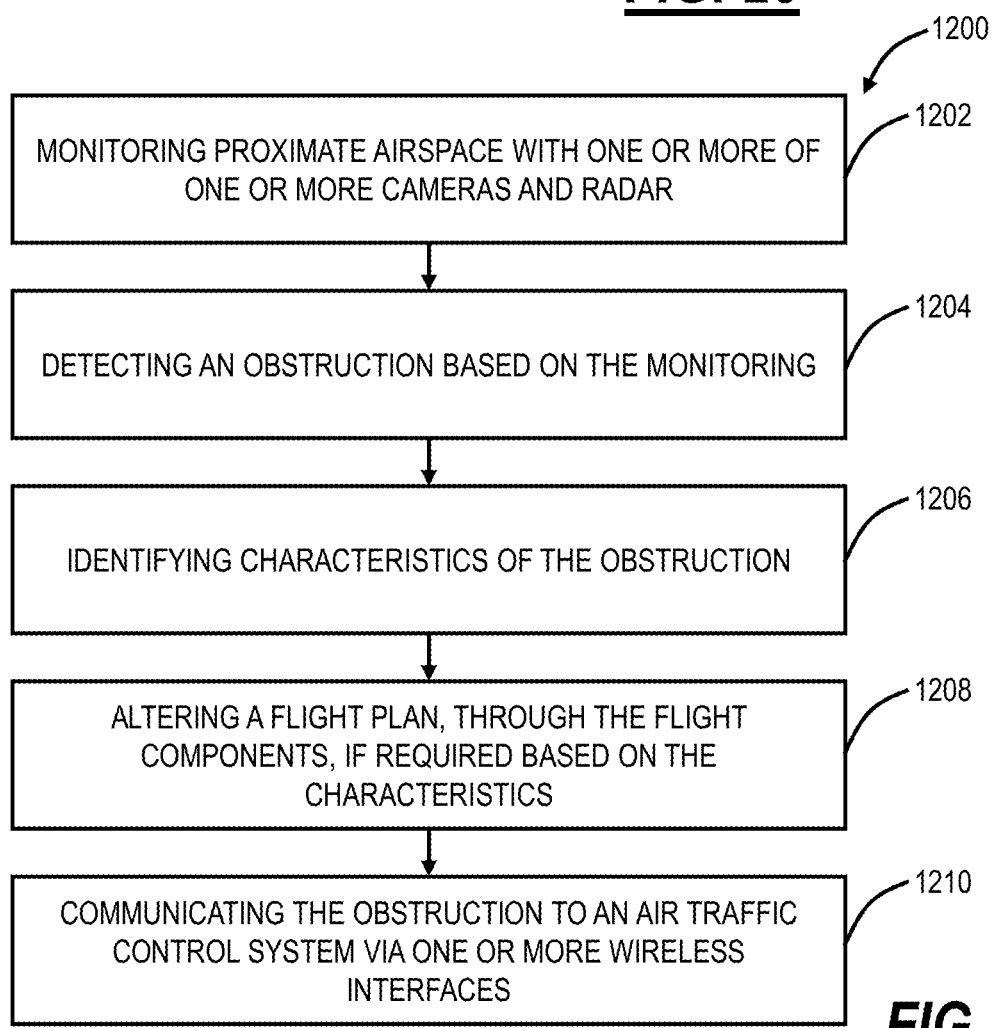
FIG. 24 is a flowchart of a UAV method for obstruction detection.

FIG. 24 is a flowchart of a UAV method 1200 for obstruction detection. The UAV includes flight components attached or disposed to a base; one or more cameras; radar; one or more wireless interfaces; and a processing device communicatively coupled to the flight components, the one or more cameras, the radar, and the wireless interfaces. The UAV method 1200 includes monitoring proximate airspace with one or more of one or more cameras and radar (step 1202); detecting an obstruction based on the monitoring (step 1204); identifying characteristics of the obstruction (step 1206); altering a flight plan, through the flight components, if required based on the characteristics (step 1208); and communicating the obstruction to an air traffic control system via one or more wireless interfaces (step 1210).

The detecting can be via the radar and the method 1200 can further include causing the one or more cameras to obtain images or video of the detected obstruction at a location based on the radar; and analyzing the images or video to identify the characteristics. The detecting can be via the one or more cameras, and the method 1200 can further include analyzing images or video from the one or more cameras to identify the characteristics. The one or more cameras can include a front-facing camera and a rear-facing camera and the method 1200 can further include causing one or more of the front-facing camera and the rear-facing camera to obtain additional images or video; and analyzing the images or video to identify the characteristics. The obstructions can include dynamic obstructions, and the characteristics comprise size, shape, speed, direction, altitude, and heading. The characteristics can be determined based on analyzing multiple images or video over time. The UAV method 1200 can further include receiving notifications from the air traffic control system related to previously detected obstructions; and updating the air traffic control system based on the detection of the previously detected obstructions. The characteristics are for an obstruction database maintained by the air traffic control system.

Waypoint Directory

In an embodiment, the UAV air traffic control system 300 uses a plurality of waypoints to manage air traffic in a geographic region. Again, waypoints are sets of coordinates that identify a point in physical space. The waypoints can include longitude and latitude as well as an altitude. For example, the waypoints can be defined over some area, for example, a square, rectangle, hexagon, or some other geometric shape, covering some amount of area. It is not practical to define a waypoint as a physical point as this would lead to an infinite number of waypoints for management by the UAV air traffic control system 300. Instead, the waypoints can cover a set area, such as every foot to hundred feet or some other distance. In an embodiment, the waypoints can be set between 1' to 50' in dense urban regions, between 1' to 100' in metropolitan or suburban regions, and between 1' to 1000' in rural regions. Setting such sized waypoints provides a manageable approach in the UAV air traffic control system 300 and for communication over the wireless networks with the UAVs 50. The waypoints can also include an altitude. However, since UAV 50 flight is generally constrained to several hundred feet, the waypoints can either altitude or segment the altitude in a similar manner as the area. For example, the altitude can be separated in 100' increments, etc. Accordingly, the defined waypoints can blanket an entire geographic region for management by the UAV air traffic control system 300.

The waypoints can be detected by the UAVs 50 using location identification components such as GPS. A typical GPS receiver can locate a waypoint with an accuracy of three meters or better when used with land-based assisting technologies such as the Wide Area Augmentation System (WAAS). Waypoints are managed by the UAV air traffic control system 300 and communicated to the UAVs 50, and used for a variety of purposes described herein. In an embodiment, the waypoints can be used to define a flight path for the UAVs 50 by defining a start and end waypoint as well as defining a plurality of intermediate waypoints.

The waypoints for a given geographic region (e.g., a city, region, state, etc.) can be managed in a waypoint directory which is stored and managed in the DB 820. The DB 820 can include the waypoint directory and actively manage a status of each waypoint. For example, the status can be either obstructed, clear, or unknown. With these classifications, the UAV air traffic control system 300 can actively manage UAV 50 flight paths. The UAVs 50 can also check and continually update the DB 820 through communication with the UAV air traffic control system 300. The use of the waypoints provides an efficient mechanism to define flight paths.

Use of Waypoints

The UAV air traffic control system 300 and the UAVs 50 can use the waypoints for various purposes including i) flight path definition, ii) start and end point definition, iii) tracking of UAVs 50 in flight, iv) measuring the reliability and accuracy of information from particular UAVs 50, v) visualizations of UAV 50 flight, and the like. For flight path definition, the waypoints can be a collection of points defining how a particular UAV 50 should fly. In an embodiment, the flight path can be defined with waypoints across the entire flight path. In another embodiment, the flight path can be defined by various marker waypoints allowing the particular UAV 50 the opportunity to determine flight paths between the marker waypoints locally. In a further embodiment, the flight path is defined solely by the start and end waypoints, and the UAV 50 locally determines the flight path based thereon.

In these embodiments, the intermediate waypoints are still monitored and used to manage the UAV 50 in flight. In an embodiment, the UAV 50 can provide updates to the UAV air traffic control system 300 based on obstruction detection as described herein. These updates can be used to update the status of the waypoint directory in the DB 820. The UAV air traffic control system 300 can use the waypoints as a mechanism to track the UAVs 50. This can include waypoint rules such as no UAV 50 can be in a certain proximity to another UAV 50 based on the waypoints, speed, and direction. This can include proactive notifications based on the current waypoint, speed, and direction, and the like.

In an embodiment, the waypoints can be used for measuring the reliability and accuracy of information from particular UAVs 50. Again, the waypoints provide a mechanism to define the geography. The UAV air traffic control system 300 is configured to receive updates from UAVs 50 about the waypoints. The UAV air traffic control system 300 can determine the reliability and accuracy of the updates based on crowd-sourcing the updates. Specifically, the UAV air traffic control system 300 can receive an update which either confirms the current status or changes the current status. For example, assume a waypoint is currently clear, and an update is provided which says the waypoint is clear, then this UAV 50 providing the update is likely accurate. Conversely, assume a waypoint is currently clear, and an update is provided which says the waypoint is now obstructed, but a short time later, another update from another UAV 50 says the waypoint is clear, this may reflect inaccurate information. Based on comparisons between UAVs 50 and their associated waypoint updates, scoring can occur for the UAVs 50 to determine reliability and accuracy. This is useful for the UAV air traffic control system 300 to implement status update changes—preference may be given to UAVs 50 with higher scoring.

The waypoints can also be used for visualization in the UAV air traffic control system 300. Specifically, waypoints on mapping programs provide a convenient mechanism to show location, start and end points, etc. The waypoints can be used to provide operators and pilots visual information related to one or more UAVs 50.

Figure 25:
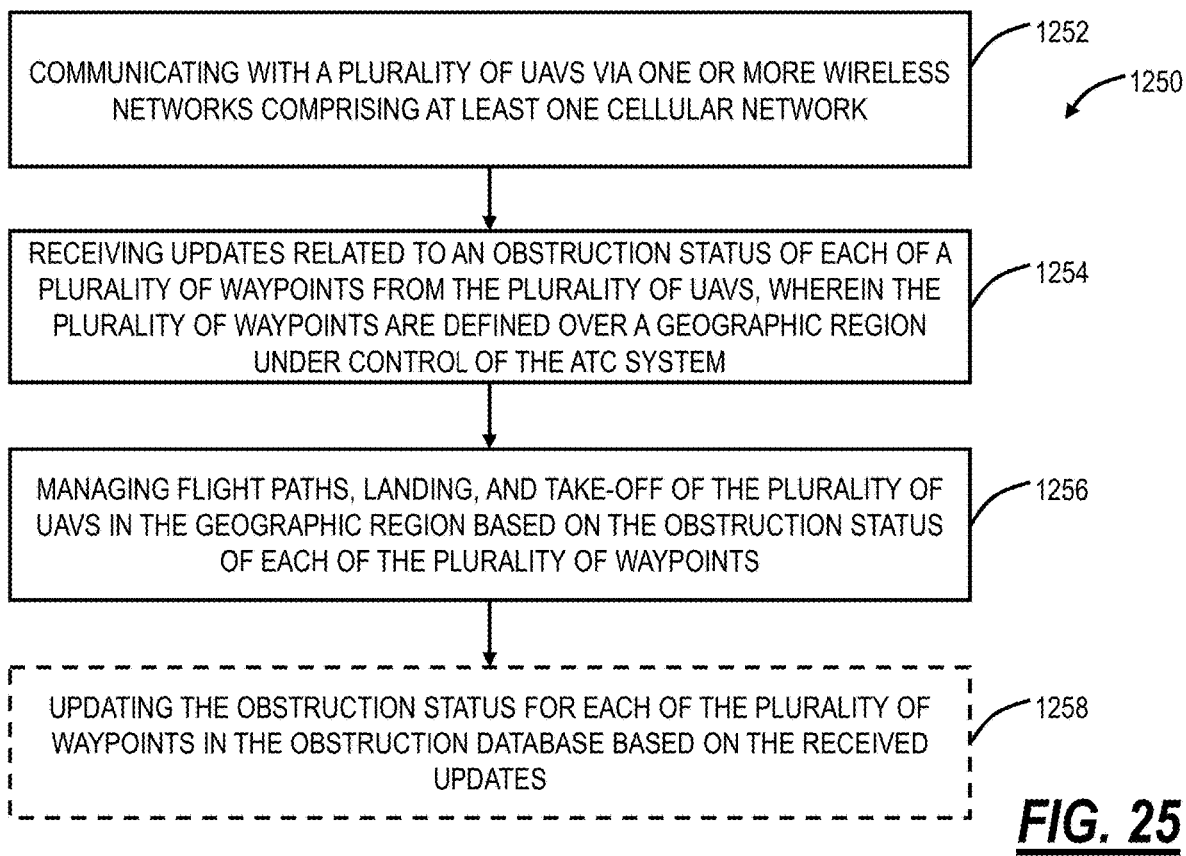
FIG. 25 is a flowchart of a waypoint management method for an Air Traffic Control (ATC) system for Unmanned Aerial Vehicles (UAVs)

FIG. 25 is a flowchart of a waypoint management method 1250 for an Air Traffic Control (ATC) system for Unmanned Aerial Vehicles (UAVs). The waypoint management method 1250 includes communicating with a plurality of UAVs via one or more wireless networks comprising at least one cellular network (step 1252); receiving updates related to an obstruction status of each of a plurality of waypoints from the plurality of UAVs, wherein the plurality of waypoints are defined over a geographic region under control of the ATC system (step 1254); and managing flight paths, landing, and take-off of the plurality of UAVs in the geographic region based on the obstruction status of each of the plurality of waypoints (step 1256). The plurality of waypoints each includes a latitude and longitude coordinate defining a point about which an area is defined for covering a portion of the geographic region. A size of the area can be based on whether the area covers an urban region, a suburban region, and a rural region in the geographic area, wherein the size is smaller for the urban region than for the suburban region and the rural region, and wherein the size is smaller for the suburban region than for the rural region. Each of the plurality of waypoints can include an altitude range set based on flight altitudes of the plurality of UAVs.

The ATC system can include an obstruction database comprising a data structure for each of the plurality of waypoints defining a unique identifier of a location and the obstruction status, and wherein the obstruction status comprises one of clear, obstructed, and unknown. The waypoint management method 1250 can further include updating the obstruction status for each of the plurality of waypoints in the obstruction database based on the received updates (step 1258). The waypoint management method 1250 can further include defining the flight paths based on specifying two or more waypoints of the plurality of waypoints. A flight path can be defined by one of specifying a start waypoint and an end waypoint and allowing a UAV to determine a path therebetween locally; and specifying a start waypoint and an end waypoint and a plurality of intermediate waypoints between the start waypoint and the end waypoint. The waypoint management method 1250 can further include scoring each UAV's updates for the plurality of waypoints to determine the reliability and accuracy of the updates.

In another embodiment, an Air Traffic Control (ATC) system for Unmanned Aerial Vehicles (UAVs) using waypoint management includes a network interface and one or more processors communicatively coupled to one another, wherein the network interface is communicatively coupled to a plurality of UAVs via one or more wireless networks; and memory storing instructions that, when executed, cause the one or more processors to communicate with a plurality of UAVs via one or more wireless networks comprising at least one cellular network; receive updates related to an obstruction status of each of a plurality of waypoints from the plurality of UAVs, wherein the plurality of waypoints are defined over a geographic region under control of the ATC system; and manage flight paths, landing, and take-off of the plurality of UAVs in the geographic region based on the obstruction status of each of the plurality of waypoints.

In a further embodiment, a non-transitory computer-readable medium comprising instructions that, when executed, cause one or more processors to perform steps of communicating with a plurality of UAVs via one or more wireless networks comprising at least one cellular network; receiving updates related to an obstruction status of each of a plurality of waypoints from the plurality of UAVs, wherein the plurality of waypoints are defined over a geographic region under control of the ATC system; and managing flight paths, landing, and take-off of the plurality of UAVs in the geographic region based on the obstruction status of each of the plurality of waypoints.

Network Switchover and Emergency Instructions

Figure 26:
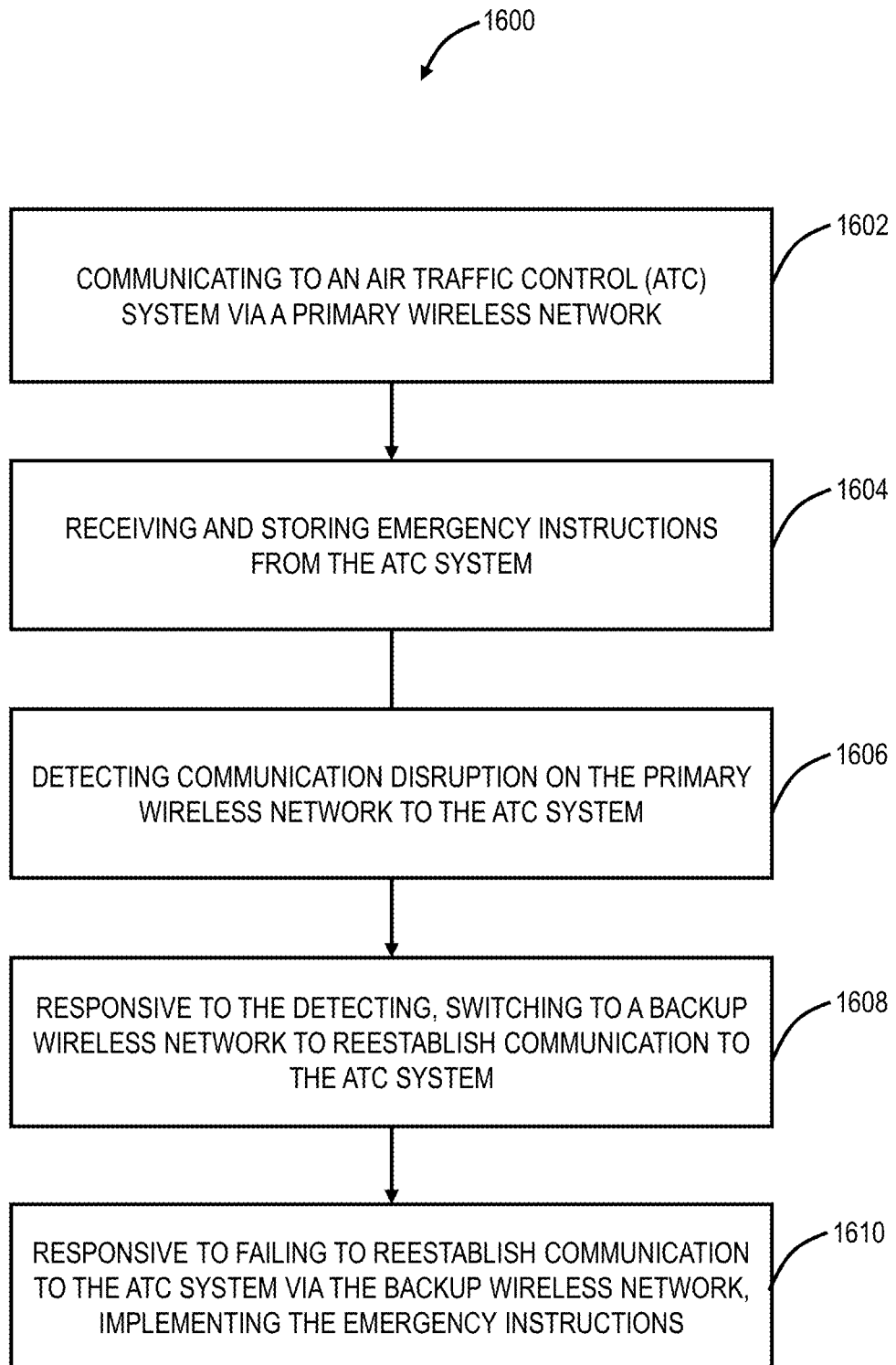
FIG. 26 is a flowchart of a UAV network switchover and emergency procedure method.

FIG. 26 is a flowchart of a UAV network switchover and emergency procedure method 1600. The method 1600 can be implemented by the UAV 50 in conjunction with the ATC system 300 and the wireless networks 302, 304. The method 1600 includes communicating to an Air Traffic Control (ATC) system via a primary wireless network (step 1602); receiving and storing emergency instructions from the ATC system (step 1604); detecting communication disruption on the primary wireless network to the ATC system (step 1606); responsive to the detecting, switching to a backup wireless network to reestablish communication to the ATC system (step 1608); and, responsive to failing to reestablish communication to the ATC system via the backup wireless network, implementing the emergency instructions (step 1610).

Thus, the method 1600 enables the UAV 50 to maintain connectivity to the ATC system 300 during an outage, catastrophe, etc. The ATC system 300 is configured to provide the emergency instructions from the ATC system 300 for use in case of a network disturbance or outage. The UAV 50 is configured to store the emergency instructions. The emergency instructions can include an altitude to maintain and a flight plan to maintain until communication is reestablished, nearby landing zones to proceed to, continuing to a destination as planned, immediate landing at one of a plurality of designated locations, flying lane information, hover in place, hover in place for a certain amount of time to regain communication, hover in place until a battery level is reached and then land or proceed to another location, and the like. Of note, the ATC system 300 can periodically update the emergency instructions. Further, the ATC system 300 can provide multiple different emergency instructions for a local decision by the UAV 50. The objective of the method 1600 is to ensure the UAV 50 operates with communication to the ATC system 300 and in the absence of communication to implement the emergency instructions.

The method 1600 can further include, during the emergency instructions, reestablishing communication to the ATC system via one of the primary wireless network and the backup wireless network; and receiving instructions from the ATC system. The primary wireless network can include a first wireless provider network, and the backup wireless network can include a second wireless provider network. The first wireless provider network and the second wireless provider network can include a cellular network, such as LTE. The UAV 50 can include a wireless interface configured to communicate to each of the first wireless provider network and the second wireless provider network. The communicating to the ATC system can include providing flight information to the ATC system, and receiving instructions and updates from the ATC system for real-time control. The flight information can include weather and obstacle reporting, speed, altitude, location, and direction, and the instructions and updates can relate to separation assurance, traffic management, landing, and flight plan.

In another embodiment, the UAV 50 is configured for network switchover to communicate with an Air Traffic Control (ATC) system. The UAV 50 includes one or more rotors disposed to a body and configured for flight; wireless interfaces including hardware and antennas adapted to communicate with a primary wireless network and a backup wireless network of a plurality of wireless networks; a processor coupled to the wireless interfaces and the one or more rotors; and memory storing instructions that, when executed, cause the processor to: communicate to ATC system via the primary wireless network; receive and store emergency instructions from the ATC system; detect communication disruption on the primary wireless network to the ATC system; responsive to detection of the communication disruption, switch to the backup wireless network to reestablish communication to the ATC system; and, responsive to failure to reestablish communication to the ATC system via the backup wireless network, implement the emergency instructions.

Elevator or Tube Lift

FIGS. 27-30 are diagrams of a lift tube 1700 for drone takeoff. FIG. 27 is a diagram of the lift tube 1700 and a staging location 1702 and FIG. 28 is a diagram of the lift tube 1700 in a location 1704 such as a factory, warehouse, distribution center, etc. FIG. 29 is a diagram of a pneumatic lift tube 1700A, and FIG. 30 is a diagram of an elevator lift tube 1700B. The present disclosure includes systems for the lift tube 1700 and methods for the use of the lift tube 1700 in conjunction with the UAV air traffic control system 300.

The lift tube 1700 is utilized for the UAVs 50 to take off from within the location 1704. Specifically, the lift tube 1700 is located in the location 1704, such as a factory, warehouse, distribution center, etc., such that the UAVs 50 can be launched from a floor or interior point in the location 1704. The lift tube 1700 provides an efficient flow and use of the UAV 50 in existing facilities, i.e., incorporating UAV 50 takeoff from within the facility as opposed to adding extra steps or moving the UAVs 50 outside or up to a roof. That is, the UAVs 50 can be loaded with products or delivery items and then take off via the lift tube 1700 to an elevated position or rooftop without an individual carrying the UAV 50 to the roof or outside.

The lift tube 1700 is a physical conduit or the like which extends from a lower portion of the location 1704 to outside the location 1704, such as on the roof. For example, the lift tube 1700 can be cylindrical or square and extend in a vertical direction. The size of the lift tube 1700 is such that it supports the UAV 50 in an upward direction along with any cargo carried by the UAV 50. Of note, the lift tube 1700 could support multiple UAVs 50 simultaneously at different elevations.

In an embodiment, the lift tube 1700 can be the pneumatic lift tube 1700A which includes compressed air 1720 to cause the UAVs 50 to move upwards from ingress of the pneumatic lift tube 1700A to an egress outside. For example, the UAVs 50 can be loaded in a closed cylinder which is moved in the pneumatic lift tube 1700A. Alternatively, the UAVs 50 can fly themselves in the pneumatic lift tube 1700A with the compressed air 1720 providing assistance.

In another embodiment, the lift tube 1700 can be the elevator lift tube 1700B which includes an elevator including a lift 1730 and multiple supports 1732. Each UAV 50 can be placed on one of the supports 1732, and the lift 1730 can move to raise the support 1732.

In operation, the staging location 1702 can be a conveyor belt or the like. For example, personnel can place the UAVs 50 and associated cargo on the staging location 1702, similar to an aircraft in line for taxi at the runway. The staging location 1702 can provide the UAVs 50 to the lift tube 1700 for launch thereof. Again, the lift tube 1700 can be the pneumatic lift tube 1700A, the elevator lift tube 1700B, or the like that raises the UAVs 50 that have been loaded with products or delivery items. This essentially creates a launching pad from an elevated position or rooftop without forcing employees to have to go onto the roof.

Further, the operation of the lift tube 1700 can be controlled by the UAV air traffic control system 300 which in addition to performing the various functions described herein can further include logistics management to coordinate the UAVs 50 in the location 1704.

In an embodiment, a method of using a lift tube with an Unmanned Aerial Vehicle (UAV) air traffic control system includes staging one or more UAVs and associated cargo for takeoff; moving the staged one or more UAVs to a lift tube; and controlling the lift tube by the UAV air traffic control system to provide the one or more UAVs for takeoff, wherein the lift tube is a vertical structure disposed in a facility to raise the one or more UAVs from an interior position in the facility for takeoff outside of the facility. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system 300 can be configured to provide logistics management to coordinate the staging, the moving, and the takeoff of the one or more UAVs via the controlled lift tube. The lift tube 1700 can be communicative coupled to a controller which has a wireless network connection to the UAV air traffic control system 300 for control thereof.

In another embodiment, a lift tube system controlled in part by an Unmanned Aerial Vehicle (UAV) air traffic control system includes a staging location for one or more UAVs and associated cargo for takeoff; a lift tube comprising a vertical structure disposed in a facility to raise the one or more UAVs from an interior position in the facility for takeoff outside of the facility; and a controller configured to cause movement of the staged one or more UAVs to the lift tube; and control the lift tube with the UAV air traffic control system to provide the one or more UAVs for takeoff. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system can be configured to provide logistics management to coordinate the staging, the moving, and the takeoff of the one or more UAVs via the controlled lift tube. The lift tube can be communicatively coupled to a controller which has a wireless network connection to the UAV air traffic control system for control thereof.

In a further embodiment, an Unmanned Aerial Vehicle (UAV) air traffic control system configured to control a lift tube system includes a network interface communicatively coupled to the lift tube system; a processor communicatively coupled to the network interface; and memory storing instructions that, when executed, cause the processor to, responsive to staging one or more UAVs and associated cargo for takeoff, cause movement of the staged one or more UAVs to a lift tube; and control the lift tube by the UAV air traffic control system to provide the one or more UAVs for takeoff, wherein the lift tube is a vertical structure disposed in a facility to raise the one or more UAVs from an interior position in the facility for takeoff outside of the facility. The lift tube can include an elevator lift tube with a lift and a plurality of supports disposed thereto, each of the supports comprising a vertical structure supporting a UAV with associated cargo, and the lift is configured to raise the plurality of supports along the elevator lift tube. The lift tube can include a pneumatic lift tube with compressed air therein causing a vacuum extending upwards in the vertical structure for lifting the one or more UAVs. The facility can include one of a factory, a warehouse, and a distribution center. The UAV air traffic control system can be configured to provide logistics management to coordinate the staging, the moving, and the takeoff of the one or more UAVs via the controlled lift tube. The lift tube can be communicatively coupled to a controller which has a wireless network connection to the UAV air traffic control system for control thereof.

There can be one or more lift tubes 1700 in the location 1704. In an embodiment, the lift tube 1700 can be used solely for cargo, i.e., to lift the cargo up to a roof and then the cargo is attached to the UAV 50. Here, the cargo can be connected to the UAV 50 on the roof, and the UAV 50 can then take off. Here, there can be a takeoff point 1750 where UAVs 50 are staged, and the cargo is added from the lift tube 1700. The lift tube 1700 can be either the pneumatic lift tube 1700A, the elevator lift tube 1700B, or the like, and the cargo can be lifted on the supports 1732 or in a capsule which slides in the pneumatic lift tube 1700A. The air traffic control system 300 can control the takeoff of the various UAVs 50 at the takeoff point 1750.

Modified Inevitable Collision State (ICS)

Figure 31:
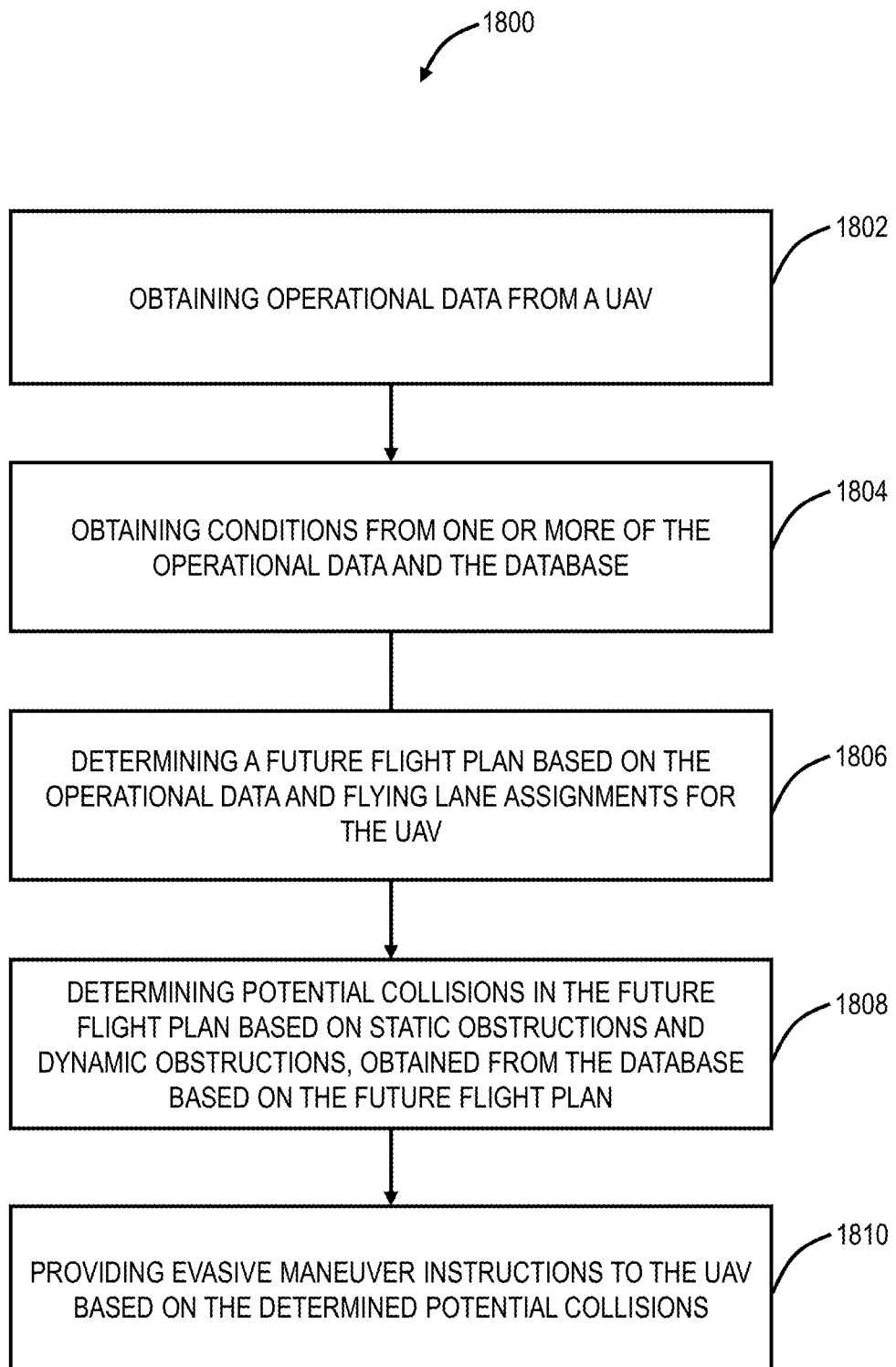
FIG. 31 is a flowchart of a modified inevitable collision state method for collision avoidance of drones.

FIG. 31 is a flowchart of a modified inevitable collision state method 1800 for collision avoidance of drones. The method 1800 is implemented through the UAV air traffic control system 300 described herein. The method 1800 can be performed in one or more servers each including a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which includes a cellular network.

The method 1800 includes obtaining operational data from a UAV (step 1802), obtaining conditions from one or more of the operational data and the database (step 1804), determining a future flight plan based on the operational data and a flying lane assignment for the UAV (step 1806), determining potential collisions in the future flight plan based on static obstructions and dynamic obstructions, obtained from the database based on the future flight plan (step 1808), and providing evasive maneuver instructions to the UAV based on the determined potential collisions (step 1810).

The objective of the method 1800 is up to 100% collision avoidance by modeling potential collisions based on algorithms taking into account drone size; drone speed, direction, and wind load; and wind speed and direction. The operational data can include speed, direction, altitude, heading, and location of the UAV, and wherein the future flight plan can be determined based on a size of the UAV and the UAV speed, direction, and wind load.

The method 1800 can further include providing the flying lane assignment to the UAV, wherein the flying lane assignment is selected from a plurality of flying lane assignments to maximize collision-free trajectories based on the static obstructions. The method 1800 can further include managing ground hold time for a plurality of UAVs to manage airspace, i.e., minimize ground hold time for drones, safely maximize drone flight time for all airspace users. The evasive maneuver instructions utilize six degrees of freedom in movement of the UAV. The method 1800 can further include storing the future flight plan in the database along with future flight plans for a plurality of UAVs, for a determination of the dynamic obstructions.

The method 1800 can include algorithms to predict finally resting locations for falling drones from various altitudes and under a variety of conditions (velocity, wind speed, drone size/wind load, etc.). Advantageously, the method 1800 can move all drone traffic safely through U.S. airspace—recognizing it is a dynamic environment. This may encourage the use of flying lanes that are located away from or above potential consumer drone traffic. The method 1800 can also minimize and attempt to eliminate all unauthorized drone flights.

In another embodiment, an ATC system 300 includes one or more servers each including a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which includes a cellular network; wherein the one or more servers are configured to obtain operational data from a UAV, obtain conditions from one or more of the operational data and the database, determine a future flight plan based on the operational data and a flying lane assignment for the UAV, determine potential collisions in the future flight plan based on static obstructions and dynamic obstructions, obtained from the database based on the future flight plan, and provide evasive maneuver instructions to the UAV based on the determined potential collisions.

In a further embodiment, an Unmanned Aerial Vehicle (UAV) includes one or more rotors disposed to a body and configured for flight; wireless interfaces including hardware and antennas adapted to communicate with a plurality of wireless networks at least one of which includes a cellular network; a processor coupled to the wireless interfaces and the one or more rotors; and memory storing instructions that, when executed, cause the processor to monitor operational data during the flight, provide the operational data to an air traffic control system via the wireless networks, wherein the air traffic control system obtains conditions from one or more of the operational data and a database, determines a future flight plan based on the operational data and a flying lane assignment for the UAV, and determines potential collisions in the future flight plan based on static obstructions and dynamic obstructions, obtained from the database based on the future flight plan, and receive evasive maneuver instructions from the air traffic control system based on the determined potential collisions.

Flying Lane Management with Lateral Separation

Figure 32:
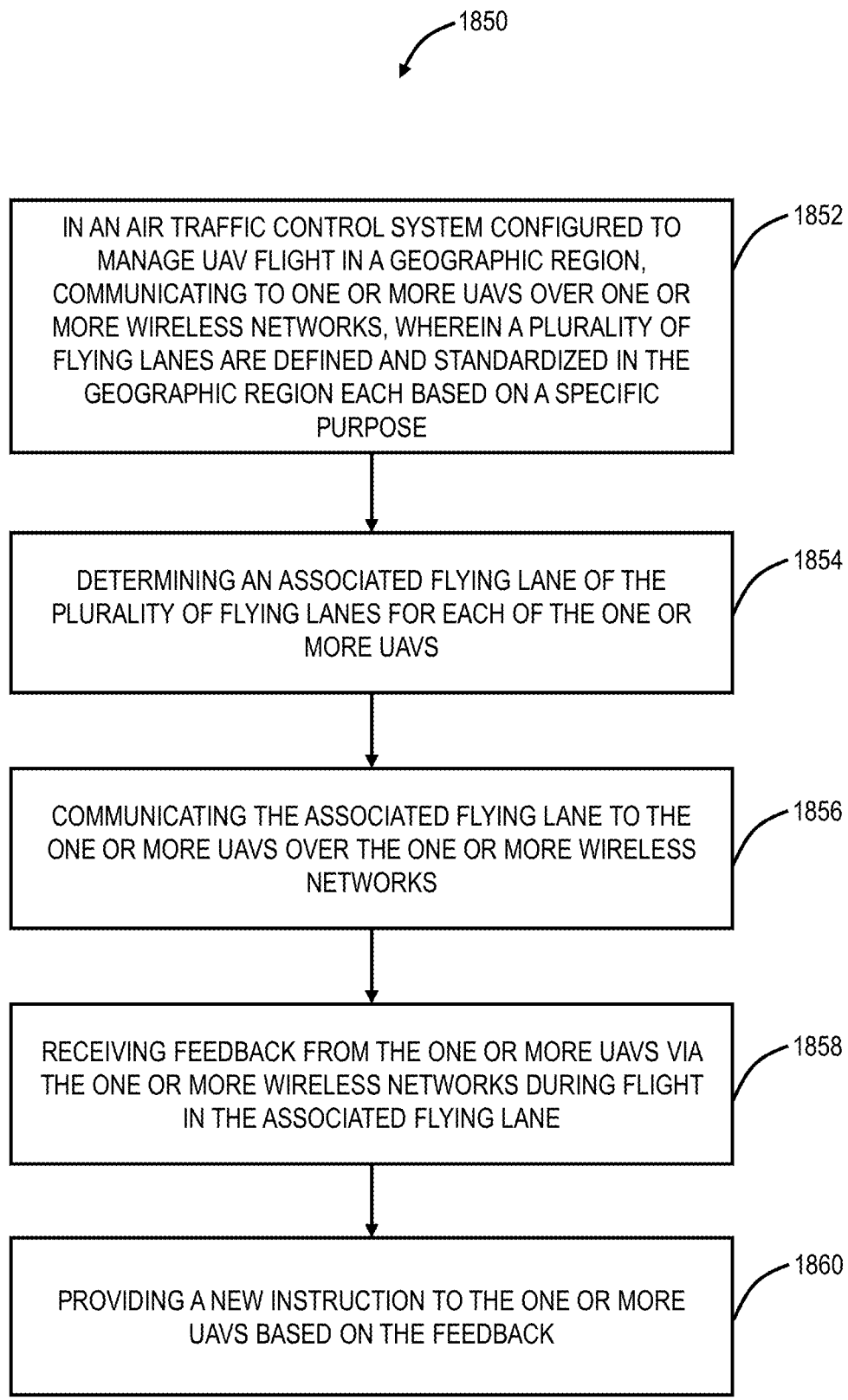
FIG. 32 is a flowchart of a flying lane management method.

FIG. 32 is a flowchart of a flying lane management method 1850. Again, the flying lane management method 1850 relates to lateral separations between drones (UAV's) operating in the same flying lane or at the same altitude and in the same proximity or geography. The distance between UAVs 50 is standardized and set based on the purpose of the particular flying lane 700 by the ATC system 300. For example, the flying lane 700 is an entry and exit lane allowing for UAVs 50 taking off to enter the ATC system 300, an intermediate flying lane that allows for some speed but also puts UAVs 50 in a position to move into an entry/exit lane, a high-speed lane (express) at a higher altitude allowing for UAVs 50 to quickly reach their destination, and the like.

In an embodiment, standard distances between UAVs 50 may be closer in lower altitude/entry and exit lanes where UAV 50 speeds may be lower than higher altitude lanes. Standard distances between UAVs 50 may be further in high altitude lanes due to the increased speed of the UAVs 50 and allow for more time for speed and course corrections and to avoid collisions.

The distance between UAVs 50 can be changed at any time and new instructions sent to UAVs 50, from the ATC system 300 via the wireless networks 302, 304, to require speed changes or to hold the position. The new instructions can be based on changes in weather and more specifically storms and rain, changes in wind speed and dealing with imprecise wind speed forecasts that impact drone speed and fuel usage (battery, gas), obstructions entering or expected to enter the flying lane(s) 700, a UAV 50 experiencing a problem such as limited battery power or fuel left, temporary flight restrictions that may include restricted airspace, and the like.

The lateral separation accounts for UAVs 50 entering and leaving flying lanes 700 to account for the required takeoff, landing, and possible hovering or delivery of products by UAVs 50 that must exit flying lanes to achieve their objectives. All communications to and from UAVs 50 occur over the wireless networks 302, 304 to and from the ATC system 300 and/or backup Air Traffic Control centers. The airspeed for UAVs 50 can be measured and/or authorized in knots and/or miles per hour (mph) within and outside of the flying lanes 700 to achieve appropriate lateral separations within the flying lanes. The objective of these procedures is to ensure safe and efficient drone flights in the United States airspace.

The flying lane management method 1850 includes, in an air traffic control system configured to manage UAV flight in a geographic region, communicating to one or more UAVs over one or more wireless networks, wherein a plurality of flying lanes are defined and standardized in the geographic region each based on a specific purpose (step 1852); determining an associated flying lane of the plurality of flying lanes for each of the one or more UAVs (step 1854); communicating the associated flying lane to the one or more UAVs over the one or more wireless networks (step 1856); receiving feedback from the one or more UAVs via the one or more wireless networks during flight in the associated flying lane (step 1858); and providing a new instruction to the one or more UAVs based on the feedback (step 1860).

The plurality of flying lanes can include lanes for entry and exit allowing the one or more UAVs to take off or land, lanes for the intermediate flight which are positioned adjacent to the lanes for entry and exit, and lanes for high speed at a higher altitude than the lanes for intermediate flight. Distances between UAVs can be set closer in the lanes for entry and exit than in the lanes for intermediate flight than in the lanes for high speed. The new instruction can be based on a change in weather comprising storms or rain. The new instruction can be based on a change in wind speed and based on wind speed forecasts and associated impact on the one or more UAVs and their fuel usage. The new instruction can be based on obstructions entering or expected to enter the flying lane.

In another embodiment, an air traffic control system includes one or more servers each comprising a network interface, a processor, and memory; and a database communicatively coupled to the one or more servers, wherein the network interface in each of the one or more servers is communicatively coupled to one or more Unmanned Aerial Vehicles (UAVs) via a plurality of wireless networks at least one of which comprises a cellular network, wherein a plurality of flying lanes are defined and standardized in the geographic region each based on a specific purpose, and wherein the one or more servers are configured to communicate to the one or more UAVs over the one or more wireless networks; determine an associated flying lane of the plurality of flying lanes for each of the one or more UAVs; communicate the associated flying lane to the one or more UAVs over the one or more wireless networks; receive feedback from the one or more UAVs via the one or more wireless networks during flight in the associated flying lane; and provide a new instruction to the one or more UAVs based on the feedback.

In a further embodiment, an Unmanned Aerial Vehicle (UAV) includes one or more rotors disposed to a body and configured for flight; wireless interfaces including hardware and antennas adapted to communicate with one or more wireless networks at least one of which includes a cellular network; a processor coupled to the wireless interfaces and the one or more rotors; and memory storing instructions that, when executed, cause the processor to communicate over the one or more wireless networks with an air traffic control system configured to manage UAV flight in a geographic region, wherein a plurality of flying lanes are defined and standardized in the geographic region each based on a specific purpose; receive an associated flying lane of the plurality of flying lanes from the air traffic control system over the one or more wireless networks; provide feedback to the air traffic control system via the one or more wireless networks during flight in the associated flying lane; receive a new instruction from the air traffic control system based on the feedback; and implement the new instruction.

Drone Service for Package Pickup and Delivery

Figure 33:
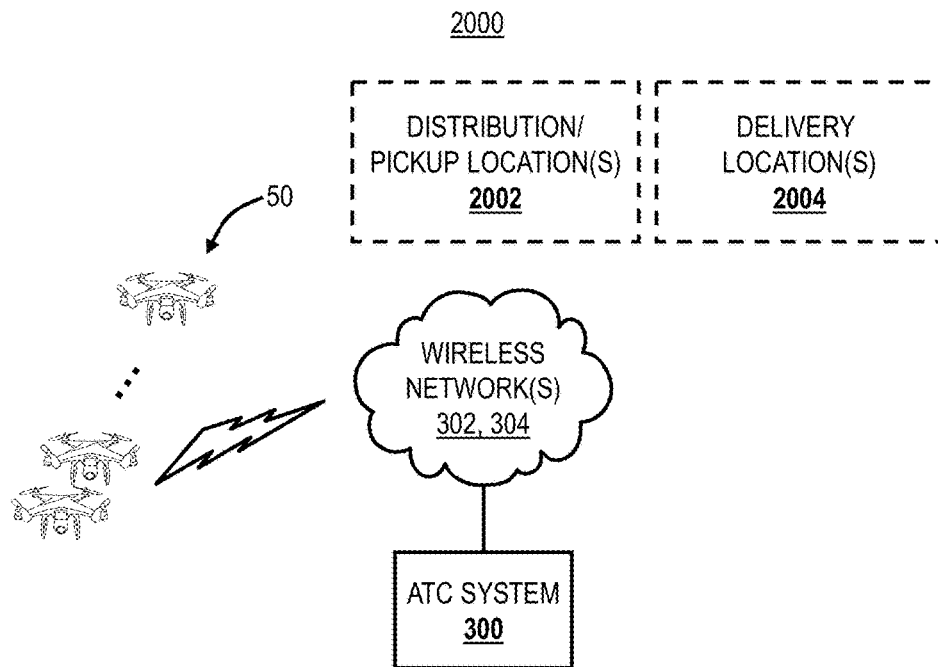
FIG. 33 is a diagram of a drone delivery system using the ATC system.

FIG. 33 is a diagram of a drone delivery system 2000 using the ATC system 300. Again, the UAVs 50 can be used to pick up and deliver goods such as, for example, groceries, packages, mail, takeout, etc. The drone delivery system 2000 contemplates the operation of a service where the operator utilizes the UAVs 50 and communication thereto via the wireless networks 302, 304. For example, a UAV 50 from the delivery operator can fly to various distribution/pickup locations 2002 systems and methods for Drone Air Traffic Control (ATC) over wireless networks for package pickup and delivery to various delivery locations 2004, e.g., homes, offices, etc.

The delivery operator can provide a delivery service which supports multiple different distribution/pickup locations 2002, such as for different companies. That is, the delivery service can support various companies in a geographic region, supported by the ATC system 300. The delivery service can be for smaller companies who cannot build their own drone fleet. For example, the delivery service can be similar to parcel delivery services, albeit via the UAVs 50. Of course, other embodiments are contemplated. Also, it is contemplated that the UAV 50 can handle multiple packages at the same time, including from different distribution/pickup locations 2002 and with different delivery locations 2004. The ATC system 300 can perform the various functions described herein. Further, the UAVs 50 for the drone delivery system 2000 can also be configured as described herein, such as to constrain flight to where there is coverage in the wireless networks 302, 304.

Figure 34:
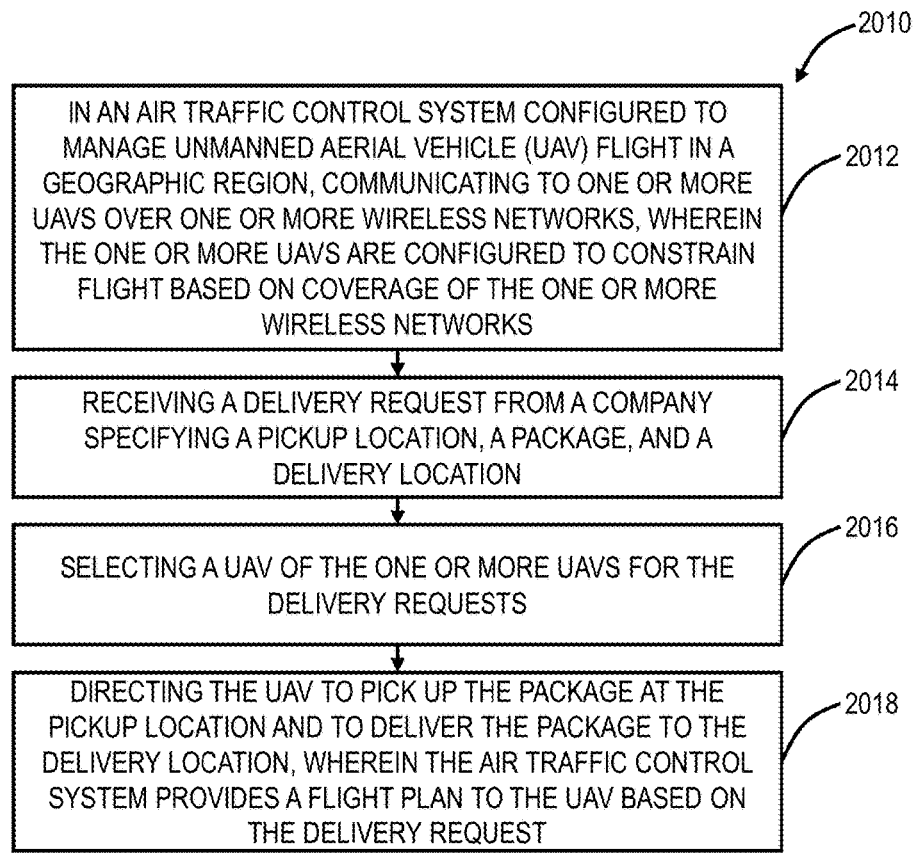
FIG. 34 is a flowchart of Drone Air Traffic Control (ATC) method over wireless networks for package pickup and delivery.

FIG. 34 is a flowchart of Drone Air Traffic Control (ATC) method 2010 over wireless networks for package pickup and delivery. The method 2100 includes, in an air traffic control system configured to manage Unmanned Aerial Vehicle (UAV) flight in a geographic region, communicating to one or more UAVs over one or more wireless networks, wherein the one or more UAVs are configured to constrain flight based on coverage of the one or more wireless networks (step 2012); receiving a delivery request from a company specifying a pickup location, a package, and a delivery location (step 2014); selecting a UAV of the one or more UAVs for the delivery requests (step 2016); and directing the UAV to pick up the package at the pickup location and to deliver the package to the delivery location, wherein the air traffic control system provides a flight plan to the UAV based on the delivery request (step 2018).

The drone method 2010 can further include receiving a second delivery request from a second company specifying a second pickup location, a second package, and a second delivery location; selecting a second UAV of the one or more UAVs for the delivery requests; and directing the second UAV to pick up the second package at the second pickup location and to deliver the second package to the second delivery location, wherein the air traffic control system provides a second flight plan to the second UAV based on the second delivery request.

The UAV 50 can include an antenna communicatively coupled to the one or more wireless networks, and wherein the flight is constrained based on the antenna monitoring cell signal strength during the flight and adjusting the flight based therein whenever the cell signal strength is lost or degraded. The drone method 2010 can further include receiving flight information from the UAV during the flight; and providing updates to the flight plan based on the flight information. The air traffic control system can maintain location information for the UAV based on the communicating. The location information can be determined based on a combination of triangulation by the plurality of cell towers and a determination by the UAV based on a location identification network.

The drone method 2010 can further include assigning the UAV a specified flying lane and ensuring the UAV is within the specified flying lane based on the communicating. The drone method 2010 can further include receiving photographs and/or video of the delivery location subsequent to the delivery of the package; and providing the photographs and/or video as a response to the delivery request. The directing can include providing a delivery technique comprising one of landing, dropping via a tether, dropping to a doorstep, dropping to a mailbox, dropping to a porch, and dropping to a garage.

In another embodiment, a drone air traffic control system includes a processor and a network interface communicatively coupled to one another; and memory storing instructions that, when executed, cause the processor to: communicate to one or more Unmanned Aerial Vehicles (UAVs) over one or more wireless networks, wherein the one or more UAVs are configured to constrain flight based on coverage of the one or more wireless networks; receive a delivery request from a company specifying a pickup location, a package, and a delivery location; select a UAV of the one or more UAVs for the delivery requests; and direct the UAV to pick up the package at the pickup location and to deliver the package to the delivery location, wherein the air traffic control system provides a flight plan to the UAV based on the delivery request.

Weather Information Based Flight Updates

Again, flying lanes can be used by the ATC system 300 to manage flight of various UAVs 50 in a geographic region. Additionally, a high percentage of problems in flight are caused by weather-related incidents, e.g., wind shear, crosswinds, fuel mismanagement caused by unexpected or unplanned winds, ice, freezing rain, icing, thunderstorms, etc. Accordingly, in an embodiment, the ATC system 300 is configured to learn about weather-related incidents and incorporate this information into flight plans, flying lanes, etc. for a safer, more efficient flight of the UAVs 50.

Figure 35:
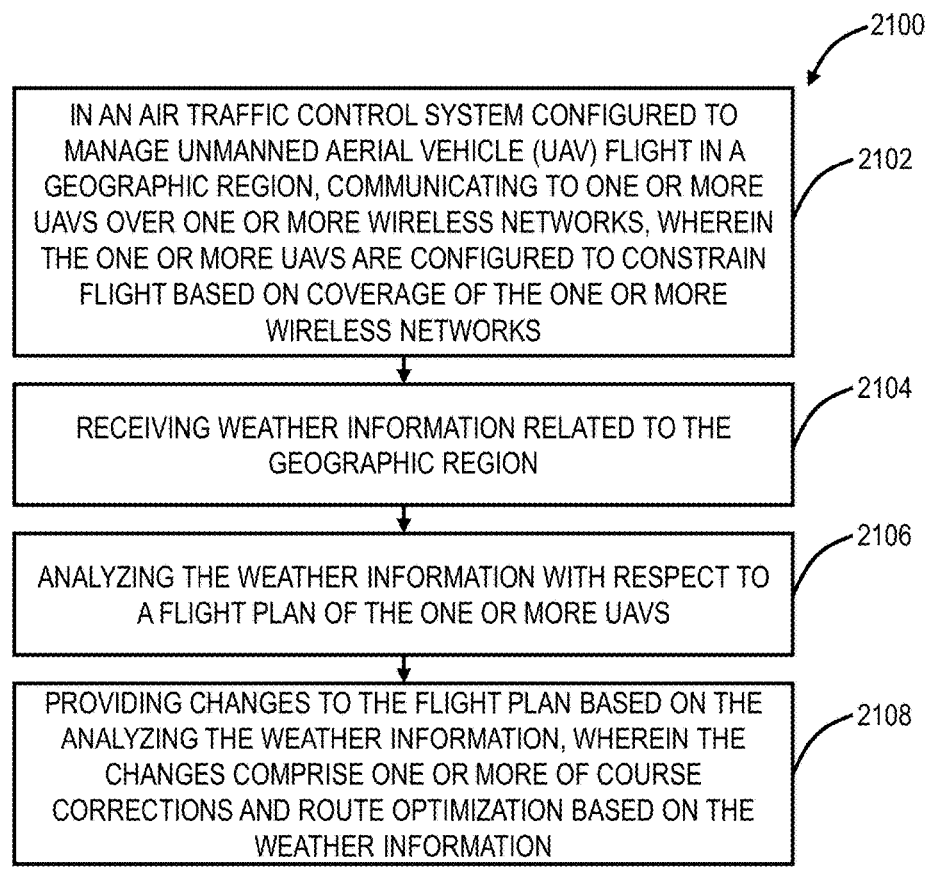
FIG. 35 is a flowchart of a UAV air traffic control management method which provides real-time course corrections and route optimizations based on weather information.

FIG. 35 is a flowchart of a UAV air traffic control management method 2100 which provides real-time course corrections and route optimizations based on weather information. Again, the ATC system 300 operates to manage UAVs 50 in a geographic region. In an embodiment, the ATC system 300 can receive real-time weather updates. The UAV air traffic control management method 2100 incorporates weather updates for real-time course corrections and route optimization (over the wireless networks 302, 304). The real-time course corrections and route optimization can include, for example: instructions to change direction, instructions to change flying lane(s), instruction to land and where the drone should target for landing, full route modification with an emphasis on route optimization while avoiding the negative impact of the weather event, instructions to speed up or slow down, instructions to change altitude, instructions to hold position for a specific or indefinite time period, instructions to move to a safe position away from the weather event and either hold in the air or on the ground for a specific or indefinite time period, instructions to land very quickly, instructions to land very slowly, instructions to circle, and the like.

The UAV air traffic control management method 2100 includes, in an air traffic control system configured to manage Unmanned Aerial Vehicle (UAV) flight in a geographic region, communicating to one or more UAVs over one or more wireless networks, wherein the one or more UAVs are configured to constrain flight based on coverage of the one or more wireless networks (step 2102); receiving weather information related to the geographic region (step 2104); analyzing the weather information with respect to a flight plan of the one or more UAVs (step 2106); and providing changes to the flight plan based on the analyzing the weather information, wherein the changes comprise one or more, of course, corrections and route optimization based on the weather information (step 2108).

The UAV can include an antenna communicatively coupled to the one or more wireless networks, and wherein the flight is constrained based on the antenna monitoring cell signal strength during the flight and adjusting the flight based therein whenever the cell signal strength is lost or degraded.

The changes can include instructions to change direction, instructions to change flying lane(s), instruction to land and where the drone should target for landing, full route modification with an emphasis on route optimization while avoiding the negative impact of the weather event, instructions to speed up or slow down, instructions to change altitude, instructions to hold position for a specific or indefinite time period, instructions to move to a safe position away from the weather event and either hold in the air or on the ground for a specific or indefinite time period, instructions to land very quickly, instructions to land very slowly, instructions to circle, and the like.

Dynamic Flying Lane Management

Figure 36:
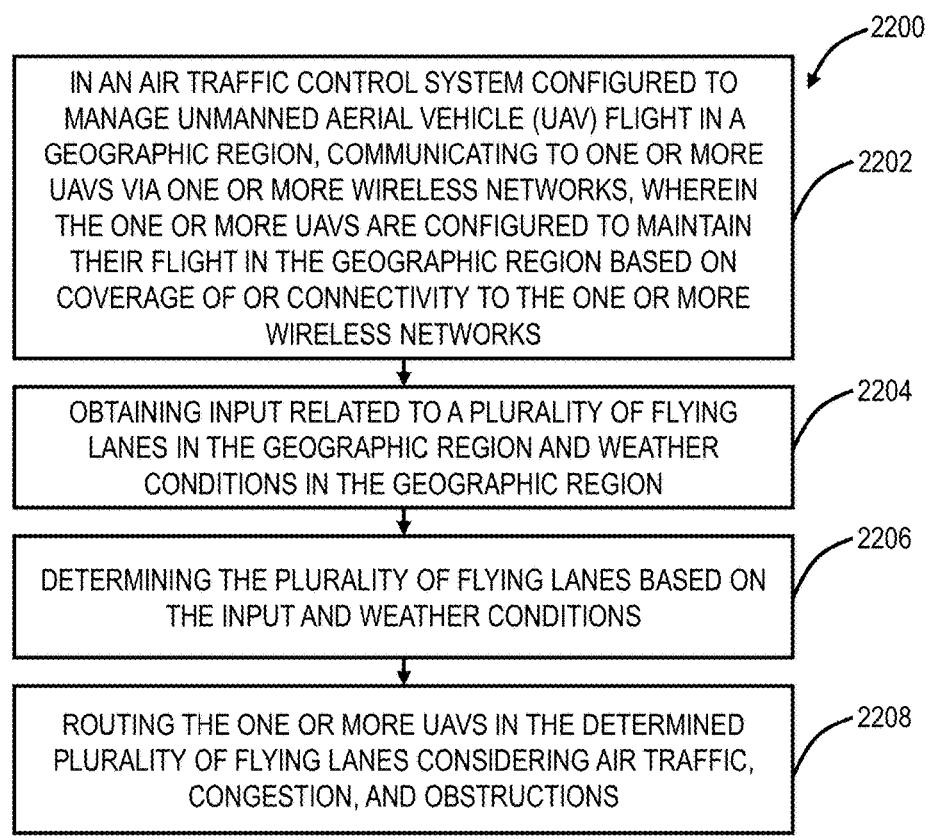
FIG. 36 is a flowchart of a process for dynamic flying lane management, such as based in part on FAA input, policies, and standards.

FIG. 36 is a flowchart of a process 2200 for dynamic flying lane management, such as based in part on FAA input, policies, and standards. Various aspects of flying lanes have been described herein. The process 2200 includes, in an air traffic control system configured to manage Unmanned Aerial Vehicle (UAV) flight in a geographic region, communicating to one or more UAVs via one or more wireless networks, wherein the one or more UAVs are configured to maintain their flight in the geographic region based on coverage of or connectivity to the one or more wireless networks (step 2202); obtaining input related to a plurality of flying lanes in the geographic region and weather conditions in the geographic region (step 2204); determining the plurality of flying lanes based on the input and weather conditions (step 2206); and routing the one or more UAVs in the determined plurality of flying lanes considering air traffic, congestion, and obstructions (step 2208).

The process 2200 can further include obtaining updated input related to a plurality of flying lanes in the geographic region and updated weather conditions in the geographic region; updating the determined plurality of flying lanes based on the updated input and the updated weather conditions; and managing the one or more UAVs based on the updated determined plurality of flying lanes. The input can be obtained via a connection to a database of Federal Aviation Administration (FAA) data. The input can include restrictions for the plurality of flying lanes based on other aircraft flight, airport locations, FAA policies, and FAA standards. The process 2200 can further include receiving flight data from the one or more UAVs; and updating the air traffic, the congestion, and the obstructions based on the flight data.

The process 2200 can further include obtaining information related to ground and air-based obstructions, and updating the determined plurality of flying lanes based on the information related to ground and air-based obstructions. The determined plurality of flying lanes can be further determined based on UAV flight restrictions and coverage of the one or more wireless networks. The one or more UAVs can be routed to corresponding flying lanes to maximize collision-free trajectories based on static obstructions, minimize travel time, and manage congestion in the geographic region. The plurality of flying lanes can include a variety of different types of lanes at different altitudes. The one or more UAVs each can include an antenna communicatively coupled to the one or more wireless networks, and wherein the flight is constrained based on the antenna monitoring cell signal strength during the flight and adjusting the flight based therein whenever the cell signal strength is lost or degraded.

In another embodiment, a drone air traffic control system includes a processor and a network interface communicatively coupled to one another; and memory storing instructions that, when executed, cause the processor to: communicate to one or more Unmanned Aerial Vehicles (UAVs) via one or more wireless networks to manage UAV flight in a geographic region, wherein the one or more UAVs are configured to maintain their flight in the geographic region based on coverage of or connectivity to the one or more wireless networks; obtain input related to a plurality of flying lanes in the geographic region and weather conditions in the geographic region; determine the plurality of flying lanes based on the input and weather conditions; and route the one or more UAVs in the determined plurality of flying lanes considering air traffic, congestion, and obstructions.

ATC Zones/Boundaries

FIG. 37 is a map of north Charlotte illustrating zip codes. In an embodiment, drone air traffic control is performed by multiple ATC systems 300 each handling a specific geographic region which is defined by boundaries such as zip codes. In another embodiment, the ATC system 300 is a single system with multiple servers 200, which are distributed and handle the specific geographic region, which is defined by boundaries such as zip codes. Different components can communicate and coordinate with one another for unified management of a larger geographic region, including hand-off of drone traffic between regions, congestion offloading between regions, and redundant monitoring of adjacent regions.

FIG. 38 is a flowchart of a process 2300 for drone air traffic control via multiple ATC system utilizing zip codes or the like as geographic boundaries. The process 2300 includes, in an air traffic control system configured to manage Unmanned Aerial Vehicle (UAV) flight in a plurality of geographic regions, wherein the air traffic control system has one or more servers configured to manage each geographic region which is predetermined based on a geographic boundary, communicating to one or more UAVs via one or more wireless networks, wherein the one or more UAVs are configured to maintain their flight in the plurality of geographic regions based on coverage of or connectivity to the one or more wireless networks (step 2302); obtaining data related to the one or more UAVs, wherein the data includes flight operational data, flight plan data, and sensor data related to obstructions and other UAVs (step 2304); analyzing and storing the data for each geographic region (step 2306); and managing flight of the one or more UAVs in corresponding geographic regions based on the data (step 2308).

The geographic boundary can be based on zip codes, county or township boundaries, geometric shapes, etc. The process 2300 can include coordinating the data and the analyzing between servers which manage adjacent regions. The process 2300 can include determining a plurality of flying lanes including lanes which are fully within a single geographic region and lanes which traverse a plurality of geographic regions and routing the one or more UAVs in corresponding flying lanes. The process 2300 can include handing off control of specific UAVs between servers based on transit in the lanes which traverse a plurality of geographic regions. The one or more UAVs are routed to corresponding flying lanes to maximize collision-free trajectories based on static obstructions, minimize travel time, and manage congestion in the geographic region. The process 2300 can include receiving flight data from the one or more UAVs; and updating air traffic, congestion, and obstructions based on the flight data. The one or more UAVs each can include an antenna communicatively coupled to the one or more wireless networks, and wherein the flight is constrained based on the antenna monitoring cell signal strength during the flight and adjusting the flight based therein whenever the cell signal strength is lost or degraded.

In a further embodiment, a drone air traffic control system includes a processor and a network interface communicatively coupled to one another; and memory storing instructions that, when executed, cause the processor to: communicate to one or more Unmanned Aerial Vehicles (UAVs) via one or more wireless networks to manage UAV flight in a geographic region of a plurality of geographic regions, wherein the air traffic control system has one or more servers configured to manage each geographic region which is predetermined based on a geographic boundary, wherein the one or more UAVs are configured to maintain their flight in the plurality of geographic regions based on coverage of or connectivity to the one or more wireless networks; obtain data related to the one or more UAVs, wherein the data includes flight operational data, flight plan data, and sensor data related to obstructions and other UAVs; analyze and storing the data for each geographic region; and manage flight of the one or more UAVs in corresponding geographic regions based on the data.

Passenger Drones

The foregoing description describes the ATC system 300 with respect to UAVs 50. In addition to the UAV 50, which is unmanned, passenger drones 50A also operate similar to UAVs 50. Passenger drones 50A are similar to the UAV 50 except include one or more passengers, i.e., the passenger drones are not unmanned. Passenger drones are Manned Aerial Vehicles (MAV). These vehicles may be piloted by a person or more likely are automatically flown based on instructions from the ATC system 300. In an embodiment, a passenger drone is a single person, commuter vehicle. For example, a passenger drone may have an electric, gasoline, or hybrid engine, multiple rotors, e.g., 4, 6, or 8, a carbon fiber body, etc. Also, a passenger drone may fold, roll in/out of a garage, take off/land substantially vertical, etc. As described herein, the UAVs 50 and the passenger drones 50A may be collectively referred to as "flying vehicles," each of which is configured for control by the ATC system 300.

Air traffic control of such passenger drones is similar to the air traffic control systems and methods described herein relative to UAVs 50. That is, it is expected that there will be orders of magnitude more passenger drones than aircraft. Further, it is expected the passenger drones will have automated flight plans to manage the volume, enable humans to fly without having pilot licenses, provide a safer environment, etc. Passenger drones fly at similar levels as the UAVs 50, such as in Class E airspace, up to 1200'.

In various embodiments, the ATC system 300 can be configured to perform the various aspects described herein with respect to passenger drones, as well as with UAVs 50, or solely for passenger drones. That is, in one embodiment, the ATC system 300 operates for passenger drones. In another embodiment, the ATC system 300 operates for the UAVs 50. In a further embodiment, the ATC system 300 operates for both passenger drones and UAVs 50.

Figure 39:
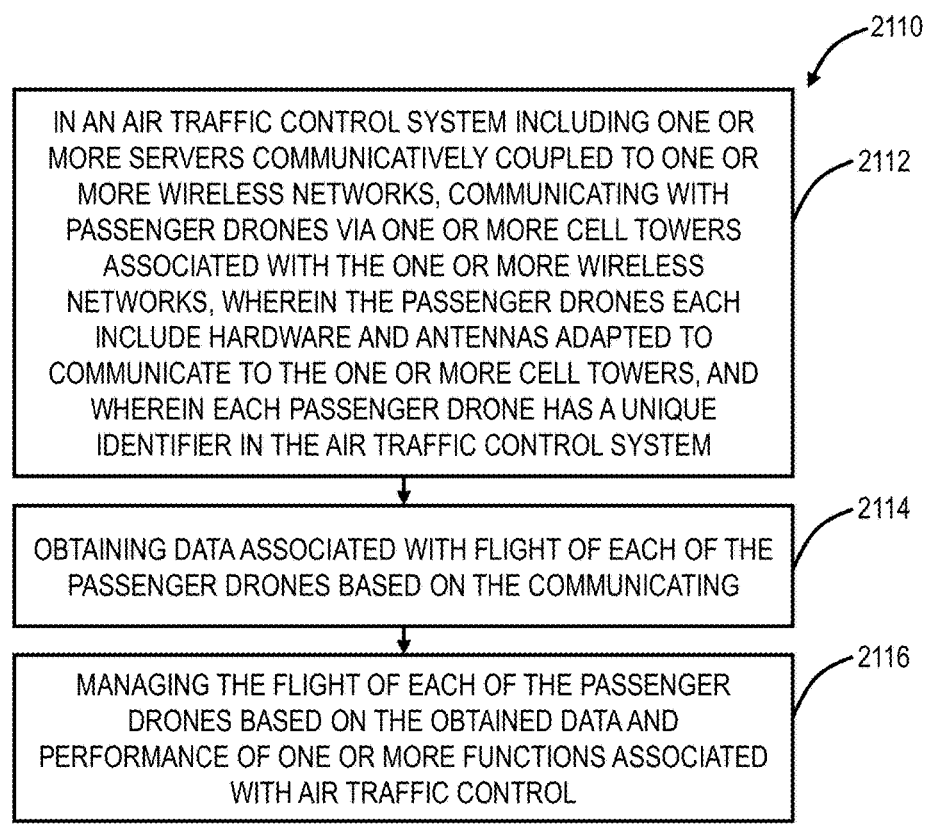
FIG. 39 is a flowchart of an air traffic control method for passenger drones.

FIG. 39 is a flowchart of an air traffic control method 2110 for passenger drones. The air traffic control method 2110 includes, in an air traffic control system including one or more servers communicatively coupled to one or more wireless networks, communicating with passenger drones via one or more cell towers associated with the one or more wireless networks, wherein the passenger drones each include hardware and antennas adapted to communicate to the one or more cell towers, and wherein each passenger drone has a unique identifier in the air traffic control system (step 2112); obtaining data associated with the flight of each of the passenger drones based on the communicating (step 2114); and managing the flight of each of the passenger drones based on the obtained data and performance of one or more functions associated with air traffic control (step 2116), wherein each passenger drone is configured to constrain flight based on coverage of the one or more cell towers such that each passenger drone maintains communication on the one or more wireless networks, wherein the control flight includes one or more of pre-configuring the passenger drone to operate only where the coverage exists, monitoring cell signal strength by the passenger drone and adjusting flight based therein, and a combination thereof.

The data associated with the flight of each of the passenger drones can include location, speed, direction, and altitude. The location can be determined based on a combination of triangulation by the one or more cell towers and a determination by the passenger drone based on a location identification network. The plurality of functions can include any of separation assurance between passenger drones, navigation, weather and obstacle reporting, monitoring, traffic management, landing services, and real-time control. One or more of the passenger drones can be configured for autonomous operations based on control by the air traffic control system. The hardware and antennas for each of the passenger drones can be configured to operate on a plurality of different cell networks. The air traffic control method 2110 can further include communicating with a one or more Unmanned Aerial Vehicles (UAVs) in addition to the passenger drones; and managing flight of the one or more UAVs in addition to managing flight of the passenger drones.

The one or more wireless networks can include a first wireless network for bidirectional communication between a passenger drone and the air traffic control system and a second wireless network for unidirectional communication to the passenger drone for status indications. The one or more wireless networks can include a first wireless network and a second wireless network each for bidirectional communication between a passenger drone and the air traffic control system for redundancy with one of the first wireless network and the second wireless network operating as primary and another as a backup. The air traffic control method 2110 can further include providing a visualization via a Graphical User Interface (GUI); and performing one or more operations via the GUI for air traffic control and monitoring at any of a high-level and an individual drone level.

In another embodiment, an air traffic control system includes one or more servers each including a processor, a network interface communicatively coupled to one or more wireless networks, and memory storing instructions that, when executed, cause the processor to communicate with passenger drones via one or more cell towers associated with the one or more wireless networks, wherein the passenger drones each include hardware and antennas adapted to communicate to the one or more cell towers, and wherein each passenger drone has a unique identifier in the air traffic control system; obtain data associated with flight of each of the passenger drones based on communication with each of the passenger drones; and manage the flight of each of the passenger drones based on the obtained data and performance of one or more functions associated with air traffic control, wherein each passenger drone is configured to constrain flight based on coverage of the one or more cell towers such that each passenger drone maintains communication on the one or more wireless networks, wherein the control flight includes one or more of pre-configuring the passenger drone to operate only where the coverage exists, monitoring cell signal strength by the passenger drone and adjusting flight based therein, and a combination thereof.

Figure 40:
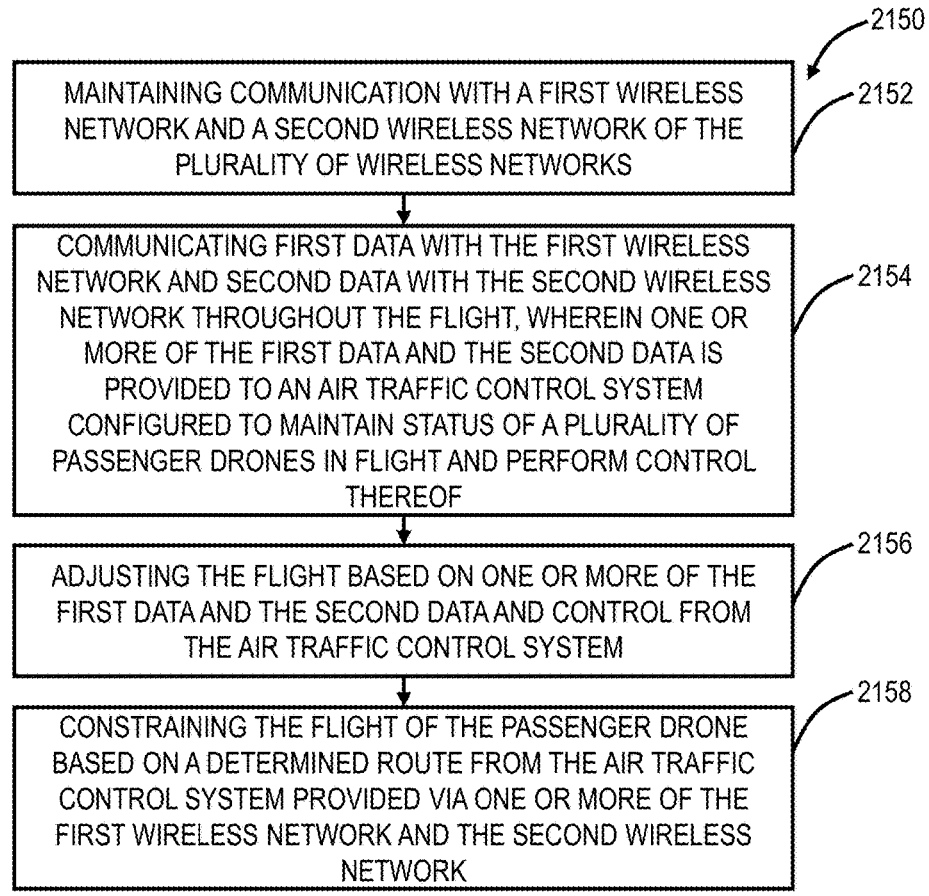
FIG. 40 is a flowchart of an air traffic control method, implemented in a passenger drone during a flight, for concurrently utilizing a plurality wireless networks for air traffic control.

Air Traffic Control Process for Passenger Drones Via a Plurality of Wireless Networks FIG. 40 is a flowchart of an air traffic control method 2150, implemented in a passenger drone during a flight, for concurrently utilizing a plurality wireless networks for air traffic control. The method 2150 includes maintaining communication with a first wireless network and a second wireless network of the plurality of wireless networks (step 2152); communicating first data with the first wireless network and second data with the second wireless network throughout the flight, wherein one or more of the first data and the second data is provided to an air traffic control system configured to maintain status of a plurality of passenger drones in flight and perform control thereof (step 2154); adjusting the flight based on one or more of the first data and the second data and control from the air traffic control system (step 2156); and constraining the flight of the passenger drone based on a determined route from the air traffic control system provided via one or more of the first wireless network and the second wireless network, wherein the constrained flight comprises maintaining the determined route, adjusting the determined route based on feedback from the air traffic control system, proceeding on a last determined route responsive to losing communication with the air traffic control system, and utilizing an alternate wireless network responsive to losing the communication (step 2158).

The first wireless network can provide bidirectional communication between the passenger drone and the air traffic control system and the second wireless network can support unidirectional communication to the passenger drone for status indications. The first wireless network can include one or more cellular networks, and the second wireless network can include a location identification network. Both the first wireless network and the second wireless network can provide bidirectional communication between the passenger drone and the air traffic control system for redundancy with one of the first wireless network and the second wireless network operating as primary and another as a backup. The first wireless network can provide bidirectional communication between the passenger drone and the air traffic control system and the second wireless network can support unidirectional communication from the passenger drone for status indications.

The first data can include location, speed, direction, and altitude for reporting to the air traffic control system. The control from the air traffic control system can include a plurality of functions comprising one or more of separation assurance between passenger drones; navigation assistance; weather and obstacle reporting; monitoring of speed, altitude, location, and direction; traffic management; landing services; and real-time control. The passenger drone can be configured for autonomous operation through the air traffic control system. The air traffic control system can be further configured to communicate and control a plurality of Unmanned Aerial Vehicles (UAVs).

In another embodiment, a passenger drone configured for air traffic control via an air traffic control system and via communication with a plurality of wireless networks includes a plurality of rotors disposed to a body; wireless interfaces comprising hardware and antennas adapted to communicate with a first wireless network and a second wireless network of the plurality of wireless networks, and wherein the passenger drone comprises a unique identifier; a processor coupled to the wireless interfaces and the one or more rotors; and memory storing instructions that, when executed, cause the processor to maintain communication with the first wireless network and the second wireless network via the wireless interfaces; communicate first data with the first wireless network and second data with the second wireless network throughout the flight, wherein one or more of the first data and the second data is provided to an air traffic control system configured to maintain the status of a plurality of passenger drones in flight and perform control thereof; and adjust the flight based on one or more of the first data and the second data and control from the air traffic control system, wherein the passenger drone is configured to constrain the flight based on a determined route from the air traffic control system provided via one or more of the first wireless network and the second wireless network, and wherein the constrained flight comprises maintaining the determined route, adjusting the determined route based on feedback from the air traffic control system, proceeding on a last determined route responsive to losing communication with the air traffic control system, and utilizing an alternate wireless network responsive to losing the communication.

In a further embodiment, a non-transitory computer-readable medium includes instructions that, when executed, cause air traffic control of a passenger drone during a flight to perform the steps of maintaining communication with a first wireless network and a second wireless network of a plurality of wireless networks; communicating first data with the first wireless network and second data with the second wireless network throughout the flight, wherein one or more of the first data and the second data is provided to an air traffic control system configured to maintain status of a plurality of passenger drones in flight and perform control thereof; adjusting the flight based on one or more of the first data and the second data and control from the air traffic control system; and constraining the flight of the passenger drone based on coverage of one or more of the first wireless network and the second wireless network, wherein the constrained flight comprises one or more of pre-configuring the passenger drone to operate only where the coverage exists, monitoring cell signal strength by the passenger drone and adjusting flight based therein, and a combination thereof.

Coverage

With the UAVs 50 and the passenger drones 50A utilizing autonomous flight via the ATC system 300, there is a need to maintain connectivity therebetween. In an embodiment, the UAVs 50 and the passenger drones can be configured to constrain flight such that there is always connectivity to the cell network 302. This can include one or more of pre-configuring the passenger drone and/or UAV 50 to operate only where the coverage exists, monitoring cell signal strength by the passenger drone and/or UAV 50 and adjusting flight based therein, and a combination thereof.

However, practically, there still may be cases where coverage is lost such that the passenger drone and/or UAV 50 cannot communicate to the ATC system 300. In an embodiment, the passenger drone and/or UAV 50 may use a secondary wireless network such as satellite. For example, satellite communications cost more than cellular as the frequency is limited. Thus, the passenger drone and/or UAV 50 may primarily use the cellular network with the satellite network as a backup when coverage is lost on the cellular network.

In another embodiment, the ATC system 300 can provide a determined route, and the passenger drone and/or UAV 50 can maintain the last determined route responsive to losing communication with the ATC system 300, and utilize an alternate wireless network responsive to losing the communication. That is, operate autonomously with communicate maintained between the passenger drone and/or UAV 50 and the ATC system 300. Responsive to losing communication and being unable to communicate on a secondary network, continue based on the last determined route.

Here, the ATC system 300 can expect that the passenger drone and/or UAV 50 will continue to proceed as last instructed when the communication is lost. Further, the ATC system 300 can estimate the passenger drone and/or UAV 50 based on wind speed and other factors at the time of the last instructions.

Apparatus for Control of UAVs and/or Passenger Drones

Figure 41:
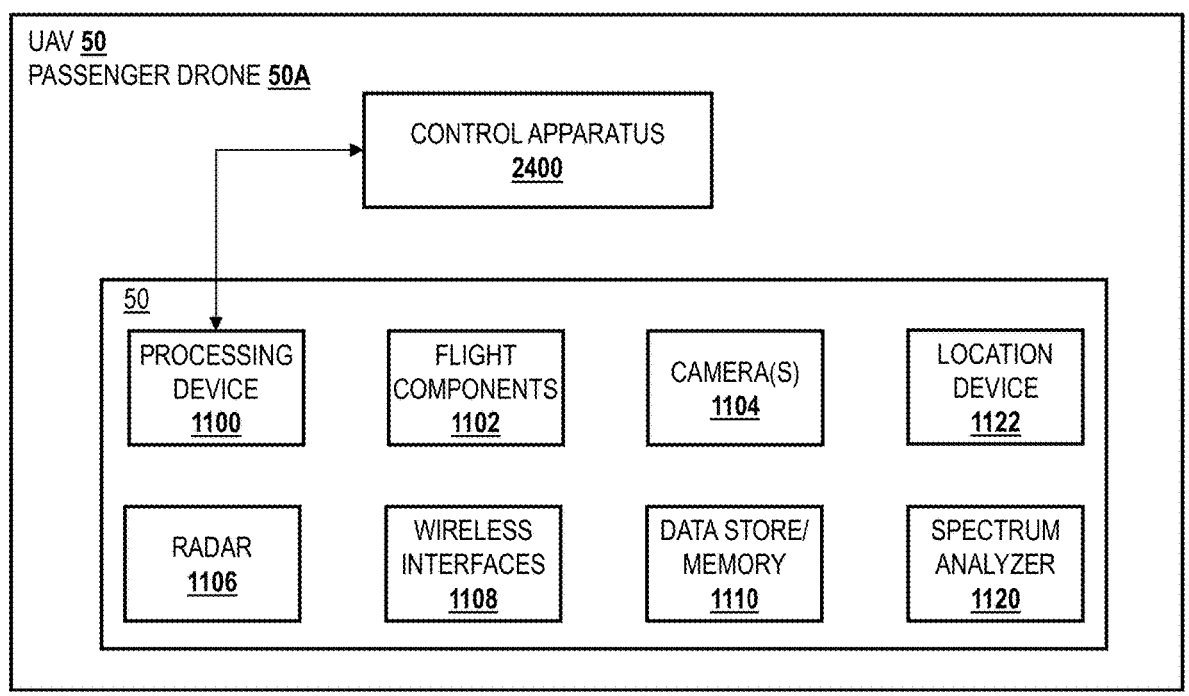
FIG. 41 is a block diagram of a UAV or a passenger drone with a control apparatus installed therein.

FIG. 41 is a block diagram of a UAV 50 or a passenger drone 50A with a control apparatus 2400 installed therein. Again, the UAV 50 and the passenger drone 50A may include the various components described in FIG. 23 including the processing device 1100. Of note, the UAV 50 or the passenger drone 50 may be provided by various different manufacturers. The air traffic control systems and methods described herein require various configurations on the UAV 50 and the passenger drone 50A to communicate with the air traffic control system 300 and to provide a control interface. It is likely that existing UAVs 50 and passenger drones 50A, while having the processing device 1100, may not have the software, hardware, firmware, etc. to communicate, authenticate, and work with the air traffic control system 300. The control apparatus 2400 is an add-on hardware device with software and firmware to provide an interface between the UAV 50 or passenger drone 50A and the air traffic control system 300.

In an embodiment, the control apparatus 2400 can include a dongle or the like that plugs or connects to a port in the UAV 50 or the passenger device 50A. For example, the processing device 1100 may include a USB or the like interface. Here, the control apparatus 2400 is configured to be added on "in the field" after manufacturing or purchase. That is, the control apparatus 2400 is add on hardware. In another embodiment, the control apparatus 2400 can include a daughterboard that is added during manufacturing, such as to the processing device 1100. Here, the control apparatus 2400 may include a circuit board or the like. However, the control apparatus 2400 may also include firmware and/or software that is loaded on the processing device 1100.

Generally, the control apparatus 2400 includes software, hardware, firmware, etc. configured to allow and authorize the UAV 50 or the passenger device 50A to communicate with and be authenticated by the air traffic control system 300. As described herein, the control apparatus 2400 can be configured for control of the UAV 50 or the passenger device 50A. This control may include enabling interaction between the UAV 50 or the passenger device 50A and the air traffic control system 300. Also, control may simply include authentication to allow communication between the UAV 50 or the passenger device 50A and the air traffic control system 300.

In an embodiment, a flying vehicle that is one of a passenger drone and an Unmanned Aerial Vehicle (UAV) includes a plurality of rotors disposed to a body and configured for flight; a processing device any of integrated with, disposed on, and associated with the body; wireless interfaces including hardware and antennas any of integrated with, disposed on, and associated with the body; and a control apparatus communicatively coupled to the processing device, wherein the control apparatus is configured to provide an interface between the wireless interfaces and an air traffic control system for control and monitoring of the flying vehicle by the air traffic control system.

The control apparatus can be a dongle that connects to an interface associated with the processing device. The dongle can be added after manufacturing or purchase of the flying vehicle. The control apparatus can be a daughterboard that is added to the processing device during manufacturing of the flying vehicle. The control apparatus can include instructions stored on a non-transitory computer-readable medium associated with the processing device. The control apparatus can be configured to allow and authenticate the flying vehicle on the air traffic control system. The air traffic control system can communicate with the flying vehicle over one or more cellular networks via the wireless interfaces, and wherein the control apparatus is configured to implement the communications between the air traffic control system is and the flying vehicle.

In another embodiment, a control apparatus includes an interface configured to connect to a processing device associated with a flying vehicle that is one of a passenger drone and an Unmanned Aerial Vehicle (UAV), wherein the flying vehicle includes a processing device and wireless interfaces; a processor communicatively coupled to the interface; and memory storing instructions that, when executed, cause the processor to configure the wireless interfaces to communicate on one or more wireless networks; interface between the wireless interfaces and an air traffic control system; and enable control and monitoring of the flying vehicle by the air traffic control system.

In a further embodiment, a method includes obtaining a flying vehicle that is one of a passenger drone and an Unmanned Aerial Vehicle (UAV), wherein the flying vehicle includes i) a processing device any of integrated with, disposed on, and associated with a body of the flying vehicle and ii) wireless interfaces including hardware and antennas any of integrated with, disposed on, and associated with the body; installing a control apparatus that is connected to the processing device, wherein the control apparatus is configured to provide an interface between the wireless interfaces and an air traffic control system; and monitoring and controlling the flying device via the air traffic control system.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method configured for implementation by a passenger drone, the method comprising:
   communicating with an Air Traffic Control (ATC) system via a primary wireless network, the primary wireless network being associated with a first cell tower;
   receiving emergency instructions from the ATC system;
   storing the emergency instructions in memory, the emergency instructions configured to be implemented during an emergency situation;
   detecting when communication with the ATC system via the primary wireless network is disrupted;
   responsive to detecting when the communication with the ATC system via the primary wireless network is disrupted, implementing a network switchover procedure to attempt to reestablish communication to the ATC system via a backup wireless network; and
   responsive to a failed attempt to reestablish communication to the ATC system via the backup wireless network, implementing the emergency instructions.

2. The method of claim 1, further comprising:
   during the process of implementing the emergency instructions, attempting to reestablish communication to the ATC system via one of the primary wireless network and the backup wireless network; and
   receiving instructions from the ATC system.

3. The method of claim 1, wherein the communication is disrupted due to one of a network disturbance and an outage.

4. The method of claim 1, wherein the emergency instructions comprise an altitude to maintain and a flight plan to maintain until communication is reestablished.

5. The method of claim 1, wherein the emergency instructions comprise nearby landing zones to proceed to.

6. The method of claim 1, wherein the emergency instructions comprise continuing to a destination as planned.

7. The method of claim 1, wherein the emergency instructions comprise immediate landing at one of a plurality of designated locations.

8. The method of claim 1, wherein the emergency instructions comprise flying lane information.

9. The method of claim 1, wherein the primary wireless network comprises a first wireless provider network and the backup wireless network comprises a second wireless provider network.

10. The method of claim 9, wherein the first wireless provider network and the second wireless provider network comprise cellular networks.

11. The method of claim 9, wherein the UAV comprises a wireless interface configured to communicate with the first wireless provider network via a first cell tower and with the second wireless provider network via a second cell tower.

12. The method of claim 1, wherein the communicating with the ATC system comprises:
    providing flight information to the ATC system; and
    receiving instructions and updates from the ATC system for real-time control.

13. The method of claim 12, wherein the flight information comprises weather and obstacle reporting, speed, altitude, location, and direction, and wherein the instructions and updates relate to separation assurance, traffic management, landing, and flight plan.

14. A passenger drone configured for network switchover to communicate with an Air Traffic Control (ATC) system, the passenger drone comprising:
    one or more rotors disposed to a body and configured for flight;
    wireless interfaces including hardware and antennas configured to communicate with a primary wireless network and a backup wireless network of a plurality of wireless networks;
    a processor coupled to the wireless interfaces and the one or more rotors; and
    memory configured to store network switchover instructions that, when executed, cause the processor to:
      communicate with the ATC system via the primary wireless network;
      receive emergency instructions from the ATC system, the emergency instructions configured to be implemented during an emergency situation;
      store the emergency instructions in the memory for use during the emergency situation;
      detect a communication disruption with the ATC system via the primary wireless network;

responsive to detection of the communication disruption, implement a network switchover procedure to attempt to reestablish communication to the ATC system via the backup wireless network; and responsive to a failure to reestablish communication to the ATC system via the backup wireless network, implement the emergency instructions.

15. The passenger drone of claim 14, wherein the primary wireless network comprises a first wireless provider network and the backup wireless network comprises a second wireless provider network.

16. The passenger drone of claim 15, wherein the first wireless provider network and the second wireless provider network comprise cellular networks.

17. The passenger drone of claim 14, wherein, to communicate with the ATC system, the wireless interfaces are configured to:

provide flight information to the ATC system; and receive flight instructions and updates from the ATC system for real-time control.

18. The passenger drone of claim 17, wherein the flight information comprises weather and obstacle reporting, speed, altitude, location, and direction, and wherein the flight instructions and updates relate to separation assurance, traffic management, landing, and flight plan.

19. The passenger drone of claim 14, wherein the ATC system is configured to monitor or control the flights of multiple UAVs.

20. A non-transitory computer readable medium comprising instructions that, when executed, cause a processor in a passenger drone to perform steps of:

communicating with an Air Traffic Control (ATC) system via a primary wireless network, the primary wireless network being associated with a first cell tower;

receiving emergency instructions from the ATC system;

storing the emergency instructions in memory, the emergency instructions configured to be implemented during an emergency situation;

detecting when communication with the ATC system via the primary wireless network is disrupted;

responsive to detecting when the communication with the ATC system via the primary wireless network is disrupted, implementing a network switchover procedure to attempt to reestablish communication to the ATC system via a backup wireless network; and responsive to a failed attempt to reestablish communication to the ATC system via the backup wireless network, implementing the emergency instructions.

* * * * *